(12) United States Patent
Payyoor et al.

(10) Patent No.: US 12,140,081 B2
(45) Date of Patent: *Nov. 12, 2024

(54) MIDSHAFT RATING FOR TURBOMACHINE ENGINES

(71) Applicants: General Electric Company, Schenectady, NY (US); GE Avio S.r.l., Rivalta di Torino (IT)

(72) Inventors: Narayanan Payyoor, Thrissur (IN); Weize Kang, Mason, OH (US); Brandon W. Miller, Middletown, OH (US); Bugra H. Ertas, Niskayuna, NY (US); Andrea Piazza, Turin (IT)

(73) Assignees: GENERAL ELECTRIC COMPANY, Evendale, OH (US); GE AVIO S.R.L., Rivalta di Torino (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,597

(22) Filed: Oct. 5, 2023

(65) Prior Publication Data

US 2024/0117769 A1    Apr. 11, 2024

Related U.S. Application Data

(63) Continuation of application No. 18/058,034, filed on Nov. 22, 2022, now Pat. No. 11,808,214, which is a
(Continued)

(51) Int. Cl.
*F02C 7/36*     (2006.01)
*F02C 7/06*     (2006.01)

(52) U.S. Cl.
CPC .................. *F02C 7/36* (2013.01); *F02C 7/06* (2013.01); *F05D 2220/32* (2013.01);
(Continued)

(58) Field of Classification Search
CPC .......... F02C 7/36; F02C 7/06; F05D 2240/54; F05D 2240/61; F05D 2250/711; F05D 2300/603; F05D 2240/60; F16H 57/0006
See application file for complete search history.

(56) References Cited

U.S. PATENT DOCUMENTS 6,174,130 B1    1/2001  King et al.
6,749,518 B2    6/2004  Carrier et al.
(Continued)

FOREIGN PATENT DOCUMENTS

CN        105822366 A        8/2016
DE      102020131553 A1      6/2022
(Continued)

OTHER PUBLICATIONS

Jane's Aero-Engines, Issue Seven, Edited by Bill Gunston, Jane's Information Group Inc., Alexandria, Virginia, 2000, pp. 1-47, 61, 465-512. (Year: 2000).*
(Continued)

*Primary Examiner* — Topaz L. Elliott
(74) *Attorney, Agent, or Firm* — Venable LLP; Peter T. Hrubiec; Michele V. Frank

(57) ABSTRACT

A turbomachine engine includes a fan section having a fan shaft, and a core engine having one or more compressor sections, one or more turbine sections that includes a power turbine, and a combustion chamber in flow communication with the compressor sections and turbine sections. The turbomachine engine includes a low-speed shaft coupled to the power turbine and having a midshaft that extends from a forward bearing to an aft bearing. The low-speed shaft is characterized by a midshaft rating (MSR) between two hundred (ft/sec)$^{1/2}$ and three hundred (ft/sec)$^{1/2}$. The low-speed shaft has a redline speed between fifty and two hundred fifty feet per second (ft/sec). The turbomachine engine includes a gearbox assembly that couples the fan
(Continued)

shaft to the low-speed shaft and characterized by a gearbox assembly mode less than 95% of a midshaft mode of the midshaft or greater than 105% of the midshaft mode.

20 Claims, 25 Drawing Sheets

Related U.S. Application Data continuation-in-part of application No. 17/328,795, filed on May 24, 2021, now Pat. No. 11,603,801.

(52) U.S. Cl.
CPC ...... *F05D 2240/50* (2013.01); *F05D 2240/60* (2013.01); *F05D 2260/40* (2013.01)

(56) References Cited

U.S. PATENT DOCUMENTS

| | | | |
|---|---|---|---|
| 7,217,099 | B2 | 5/2007 | Casanova et al. |
| 7,331,757 | B2 | 2/2008 | Janssen et al. |
| 8,511,987 | B2 | 8/2013 | Reinhardt et al. |
| 8,656,584 | B2 | 2/2014 | Gabriel et al. |
| 9,464,669 | B2 | 10/2016 | Kerr et al. |
| 10,738,648 | B2 | 8/2020 | Valencia |
| 11,047,338 | B2 | 6/2021 | Dievart et al. |
| 11,181,046 | B1 | 11/2021 | Brooks et al. |
| 11,203,971 | B2 | 12/2021 | Kannangara et al. |
| 2005/0239562 | A1 | 10/2005 | Lin et al. |
| 2006/0034693 | A1 | 2/2006 | Lardellier |
| 2008/0148708 | A1 | 6/2008 | Chou et al. |
| 2010/0113170 | A1 | 5/2010 | Schreiber et al. |
| 2012/0077607 | A1* | 3/2012 | Goujet ............... F16D 3/72 464/79 |
| 2012/0257960 | A1* | 10/2012 | Reinhardt ............... F02K 3/06 384/571 |
| 2013/0052053 | A1 | 2/2013 | Colson et al. |
| 2015/0345504 | A1 | 12/2015 | Kadau et al. |
| 2016/0097331 | A1* | 4/2016 | Venter .................. F02C 7/36 415/122.1 |
| 2016/0223011 | A1 | 8/2016 | Lee et al. |
| 2017/0096941 | A1* | 4/2017 | Antelo .................. F02C 7/36 |
| 2018/0003112 | A1 | 1/2018 | Kupratis et al. |
| 2019/0078609 | A1 | 3/2019 | Mori et al. |
| 2019/0153978 | A1 | 5/2019 | Dievart et al. |
| 2021/0108570 | A1 | 4/2021 | Bemment |
| 2021/0115811 | A1 | 4/2021 | Arakawa et al. |
| 2021/0189956 | A1 | 6/2021 | Kannangara et al. |
| 2021/0189971 | A1 | 6/2021 | Gaskell et al. |
| 2022/0136434 | A1 | 5/2022 | Kannangara et al. |
| 2022/0154597 | A1 | 5/2022 | Unton |

FOREIGN PATENT DOCUMENTS

| | | | |
|---|---|---|---|
| EP | 0742634 | A2 | 11/1996 |
| EP | 2842911 | A1 | 3/2015 |

OTHER PUBLICATIONS

TCDS No. E17NE retrieved from drs.faa.gov/search (Year: 2014).*
U.S. Appl. No. 17/328,800, filed May 24, 2021 [Cited in Parent].
Office Action issued in U.S. Appl. No. 17/328,800 dated Jun. 15, 2022 [Cited in Parent].
Rauch, D. Design Study of an Air Pump and Integral Lift Engine ALF-504 Using the Lycoming 502 Core. NASA CR-120,992 (Year: 1972) [Cited in Parent].
Rotating Equipment Solutions. Shaft Length to Diameter Ratio (L/D)—API 617 Centrifugal Compressor Selection. https://www.linkedin.com/pulse/shaft-length-diameter-ratio-ld-api-617-centrifugal-solutions/ Dec. 21, 2020 (Year: 2020) [Cited in Parent].

* cited by examiner

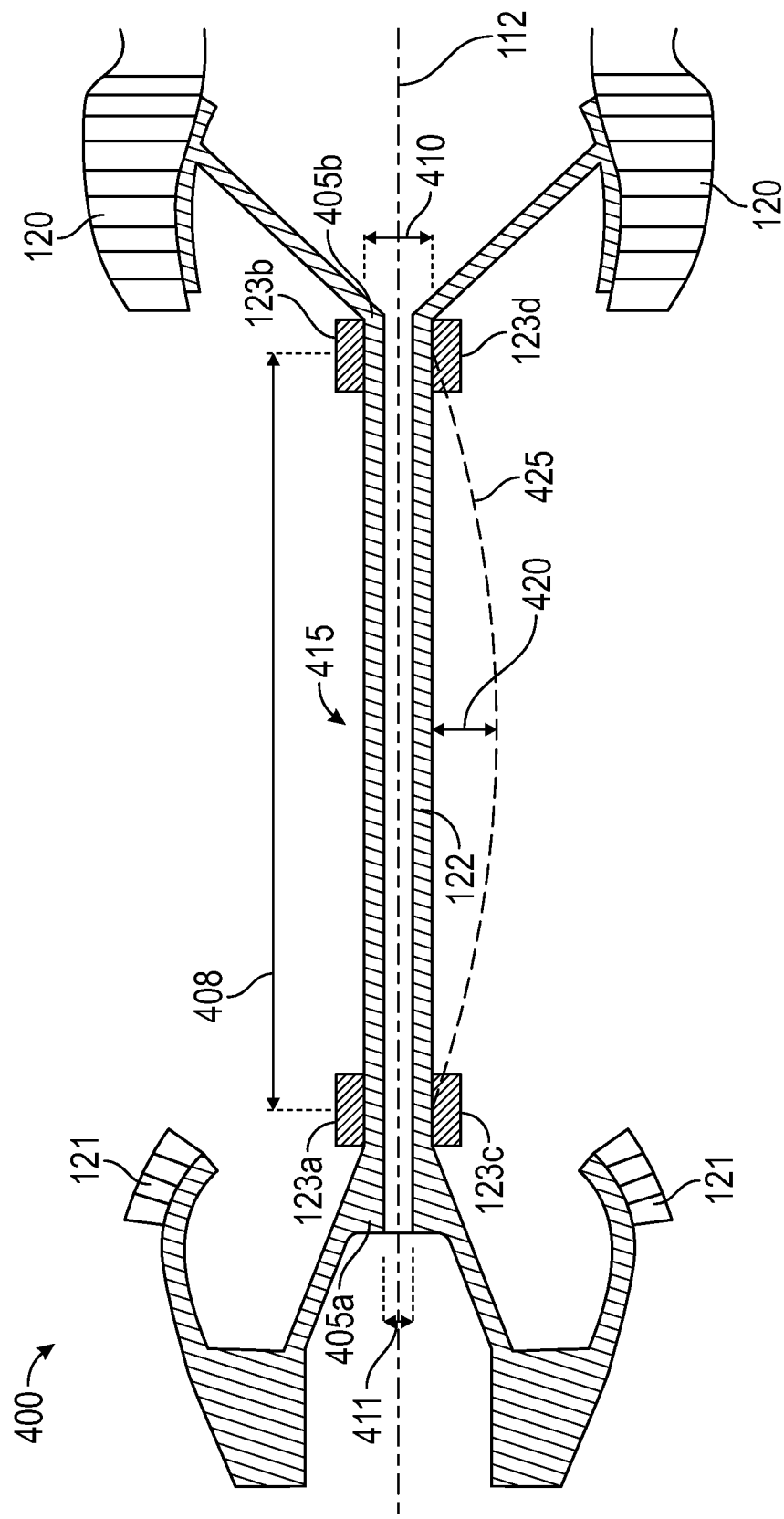

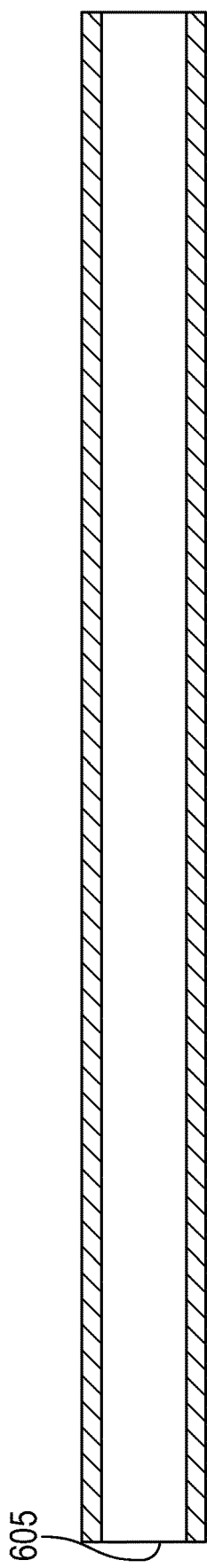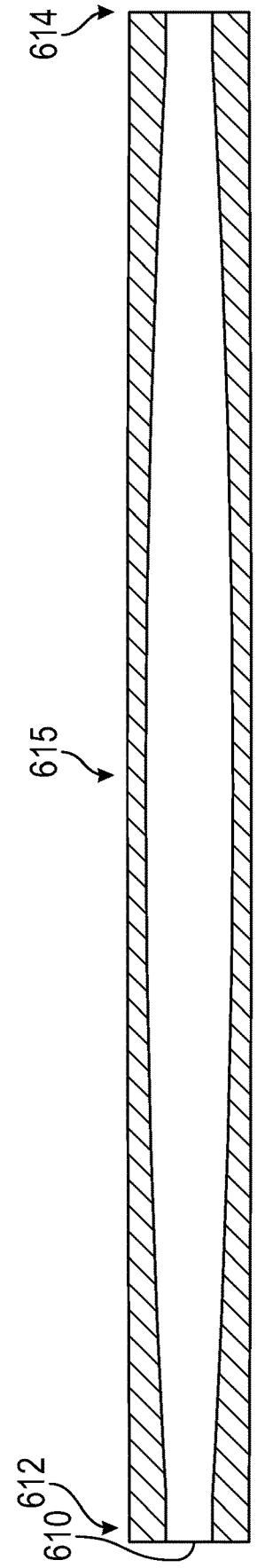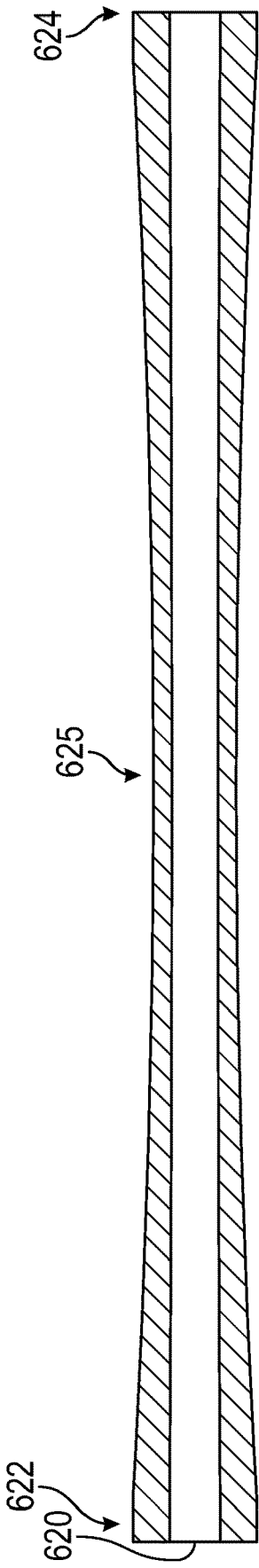

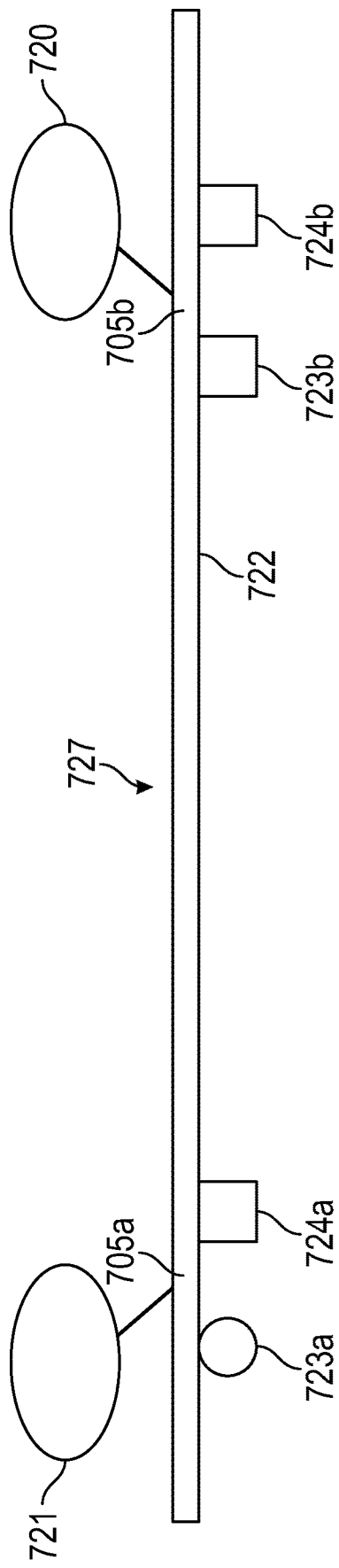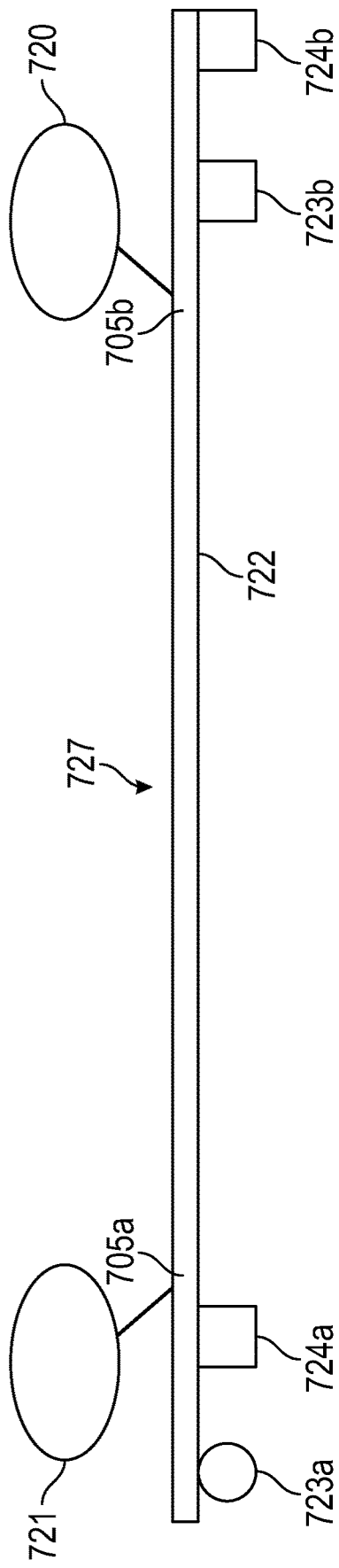

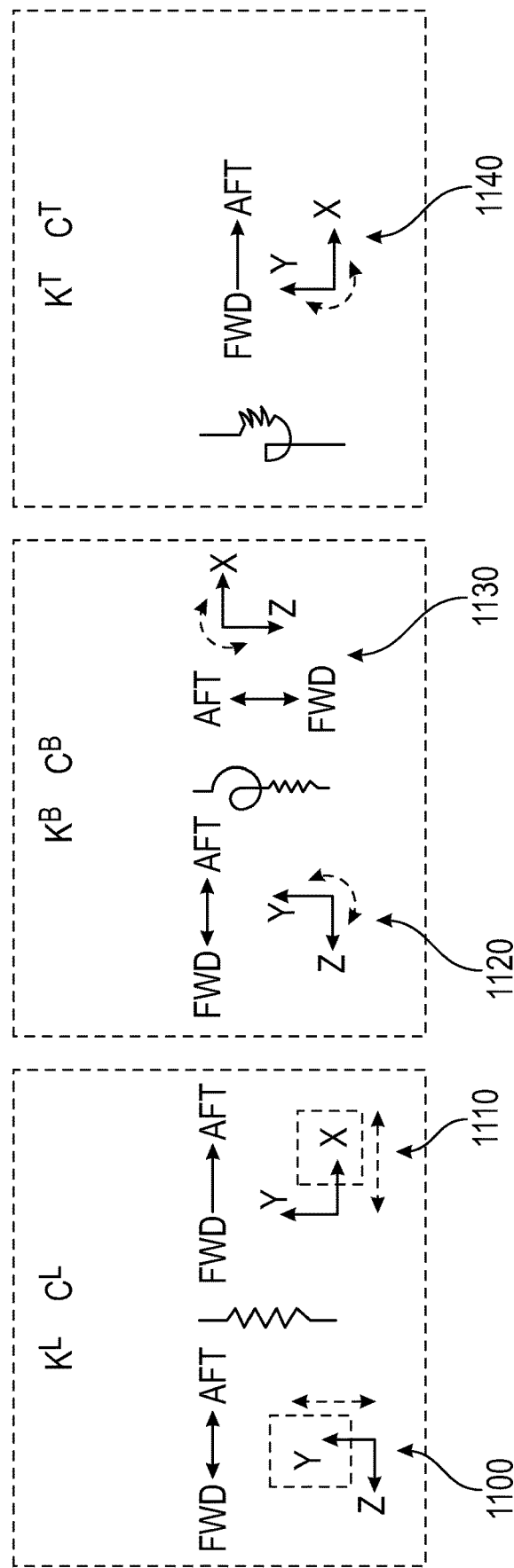

MIDSHAFT RATING FOR TURBOMACHINE ENGINES

CROSS REFERENCE TO RELATED APPLICATIONS

This application is a continuation of U.S. patent application Ser. No. 18/058,034, filed on Nov. 22, 2022, which continuation-in-part application of U.S. patent application Ser. No. 17/328,795, filed May 24, 2021, which issued as U.S. Pat. No. 11,603,801 on Mar. 14, 2023, the entire contents of which are hereby incorporated by reference in their entireties.

This application is related to U.S. patent application Ser. No. 17/328,800, filed May 24, 2021, U.S. patent application Ser. No. 18/058,040, filed Nov. 22, 2022, and U.S. patent application Ser. No. 18/058,036 filed Nov. 22, 2022. The entire contents of the aforementioned applications are incorporated by reference in their entireties.

TECHNICAL FIELD

This application is generally directed to turbomachine engines, including turbomachine shafts, and a method of driving such turbomachine shafts in such turbomachine engines.

BACKGROUND

A turbofan engine, or turbomachinery engine, includes one or more compressors, and a power turbine that drives a bypass fan. The bypass fan is coupled to the power turbine via a turbomachine shaft.

BRIEF DESCRIPTION OF THE DRAWINGS

The foregoing and other features and advantages will be apparent from the following, more particular, description of various embodiments, as illustrated in the accompanying drawings, wherein like reference numbers generally indicate identical, functionally similar, and/or structurally similar elements.

FIG. 4 shows an enlarged view of a portion of the cross-sectional view of FIG. 1.

FIG. 6A shows a cross-sectional view of a uniform shaft with a constant diameter and thickness.

FIG. 6B shows a cross-sectional view of a concave shaft with a constant diameter and a variable thickness.

FIG. 6C shows a cross-sectional view of a convex shaft with a variable diameter and a variable thickness.

FIG. 7A shows a schematic view of a shaft using a four-bearing straddle configuration.

FIG. 7B shows a schematic view of a shaft using a four-bearing outbound configuration.

FIG. 11A shows a schematic view of the degrees of freedom of lateral stiffness.

FIG. 11B shows a schematic view of the degrees of freedom of bending stiffness.

FIG. 11C shows a schematic view of the degrees of freedom of torsional stiffness.

DETAILED DESCRIPTION

Figure 1:
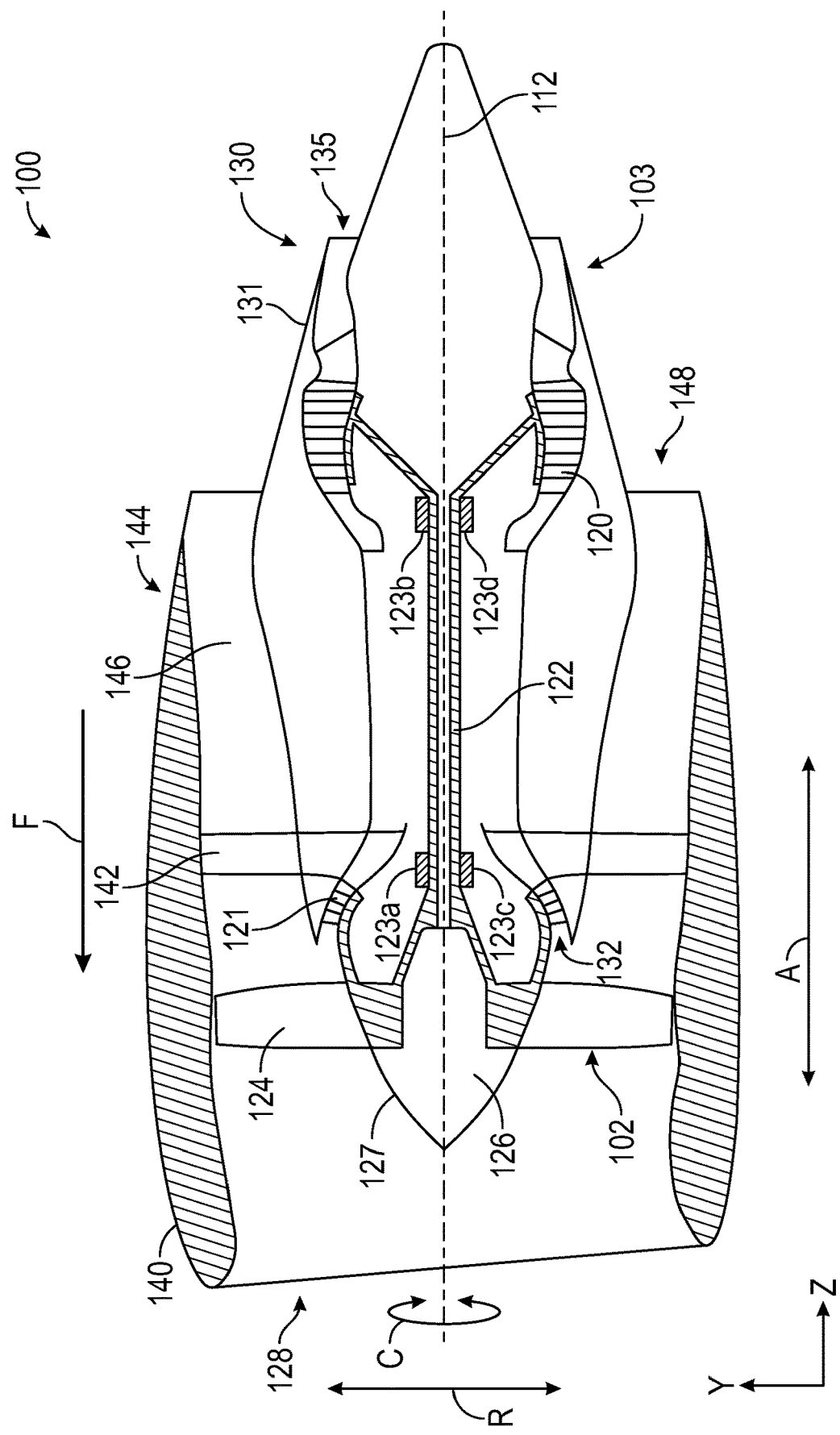
FIG. 1 shows a schematic, cross-sectional view of a ducted, direct-drive gas turbine engine.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like, refer to both direct coupling, fixing, or attaching, as well as indirect coupling, fixing, or attaching through one or more intermediate components or features, unless otherwise specified herein.

The term "propulsive system" refers generally to a thrust-producing system, which thrust is produced by a propulsor, and the propulsor provides the thrust using an electrically-powered motor(s), a heat engine such as a turbomachine, or a combination of electrical motor(s) and a turbomachine.

The singular forms "a", "an", and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, "redline speed" means the maximum expected rotational speed of a shaft during normal operation of an engine. The redline speed may be expressed in terms of rotations per second in Hertz (Hz), rotations per minute (RPM), or as a linear velocity of the outer diameter of the shaft in terms of feet per second. For a gas turbine engine that has a high-speed shaft and a low-speed shaft, both the high-speed shaft and the low-speed shaft have redline speeds.

As used herein, "critical speed" means a rotational speed of the shaft that is about the same as the fundamental, or natural frequency of a first-order bending mode of the shaft (e.g., the shaft rotates at eighty Hz and the first-order modal frequency is eighty Hertz). When the shaft rotates at the critical speed, the shaft is expected to have a maximum amount of deflection, hence instability, due to excitation of the first-order bending mode of the shaft. The critical speed may be expressed in terms of rotations per second in Hertz (Hz), rotations per minute (RPM), or as a linear velocity of the outer diameter of the shaft in terms of feet per second.

As used herein, "critical frequency" and "fundamental frequency" are referred to interchangeably and refer to the fundamental, or natural frequency, of the first-order bending mode of the shaft.

The term "subcritical speed" refers to a shaft redline speed that is less than the fundamental, or natural frequency of the first-order bending mode of the shaft (e.g., the shaft rotates at a redline speed of 70 Hz while the first-order modal frequency is about 80 Hertz). When the rotational speed is subcritical the shaft is more stable than when rotating at a critical speed. A "subcritical shaft" is a shaft that has a redline speed below the critical speed of the shaft.

The term "supercritical speed" refers to a shaft rotational speed that is above the fundamental, or natural frequency of the first-order bending mode of the shaft (e.g., the shaft rotates at eighty Hz while the first-order modal frequency is about seventy Hertz). A supercritical shaft is less stable than a subcritical shaft because the shaft speed can pass through the critical speed since its fundamental mode is below the redline speed. A "supercritical shaft" is a shaft that has a redline speed above the critical speed of the shaft.

The term "critical modal frequency" for a gearbox or $F_{GBX}$ is a natural frequency of vibration for a gearbox assembly, characterized by modal properties (mode shape, strain energy in various supporting structural, etc.) producing lateral inertial bending or displacement reaction forces through a gearbox sun-gear—midshaft coupling when the gearbox assembly. The gearbox assembly can produce a significant dynamic response characterized by these modal properties when there is an external force applied with an excitation frequency at or near $F_{GBX}$ through the sun gear—midshaft coupling (e.g. by motion of the midshaft) or when the gearbox assembly undergoes a periodic acceleration at or near $F_{GBX}$.

The terms "low" and "high," or their respective comparative degrees (e.g., "lower" and "higher", where applicable), when used with the compressor, turbine, shaft, or spool components, each refers to relative pressures and/or relative speeds within an engine unless otherwise specified. For example, a "low-speed shaft" defines a component configured to operate at a rotational speed, such as a maximum allowable rotational speed, which is lower than that of a "high-speed shaft" of the engine. Alternatively, unless otherwise specified, the aforementioned terms may be understood in their superlative degree. For example, a "low-pressure turbine" may refer to the lowest maximum pressure within a turbine section, and a "high-pressure turbine" may refer to the highest maximum pressure within the turbine section. The terms "low" or "high" in such aforementioned regards may additionally, or alternatively, be understood as relative to minimum allowable speeds and/or pressures, or minimum or maximum allowable speeds and/or pressures relative to normal, desired, steady state, etc., operation of the engine.

The terms "lateral stiffness" and "lateral structural stiffness" are used interchangeably and refer to the stiffness (force per unit length) of a component when the component is displaced, e.g., one inch, in the respective lateral direction. That is, the stiffness of a component in the radial direction (direction Y in FIGS. 1 to 3 and 11A) and the lateral direction (direction X in FIG. 11A; into and out of the page in FIGS. 1 to 3) would be, e.g., pounds per inch displacement in the Y and X directions. The lateral stiffness as defined as shown in FIG. 11A. The lateral stiffness is identified herein as $K^L$.

The terms "bending stiffness" and "bending structural stiffness" are used interchangeably and refer to the stiffness (force-length/radian) of a component when displaced by one radian in the pitch or yaw planes. That is, the stiffness of a component in the pitch direction (rotation within the Y and Z plane in FIGS. 1 to 3 and 111B) and the yaw direction (rotation within the Z and X plane in FIGS. 1 to 3 and 111B) would be e.g., pounds-inch per radian rotation. The bending stiffness as defined as shown in FIG. 111B. The bending stiffness is identified herein as $K^B$.

The term "casing" herein refers to the structure that defines an airflow path (e.g., wall of duct, or casing). A mounting to the casing may be a direct bolted connection or through a load bearing frame.

A "static structure" as herein referred means any structural part of an engine that is non-rotating.

The terms "torsional stiffness" and "torsional structural stiffness" are used interchangeably and refer to the stiffness (force-length/radian) of a component when displaced by one radian in the X-Y plane (within the X and Y plane in FIG. 11C, or about a plane parallel to the LP midshaft centerline). The torsional stiffness is defined as shown in FIG. 11C. The torsional stiffness herein is identified as $K^T$.

The term "lateral damping" refers to the structural damping of a component in the lateral direction at a frequency of vibration. The lateral damping is identified herein as $C^L$.

The term "bending damping" refers to the structural damping of a component in the bending direction at a frequency of vibration. The bending damping is identified herein as $C^B$.

The term "torsional damping" refers to the structural damping of a component in the torsional or rotational direction at a frequency of vibration. The torsional damping is identified herein as $C^T$.

Figure 8A:
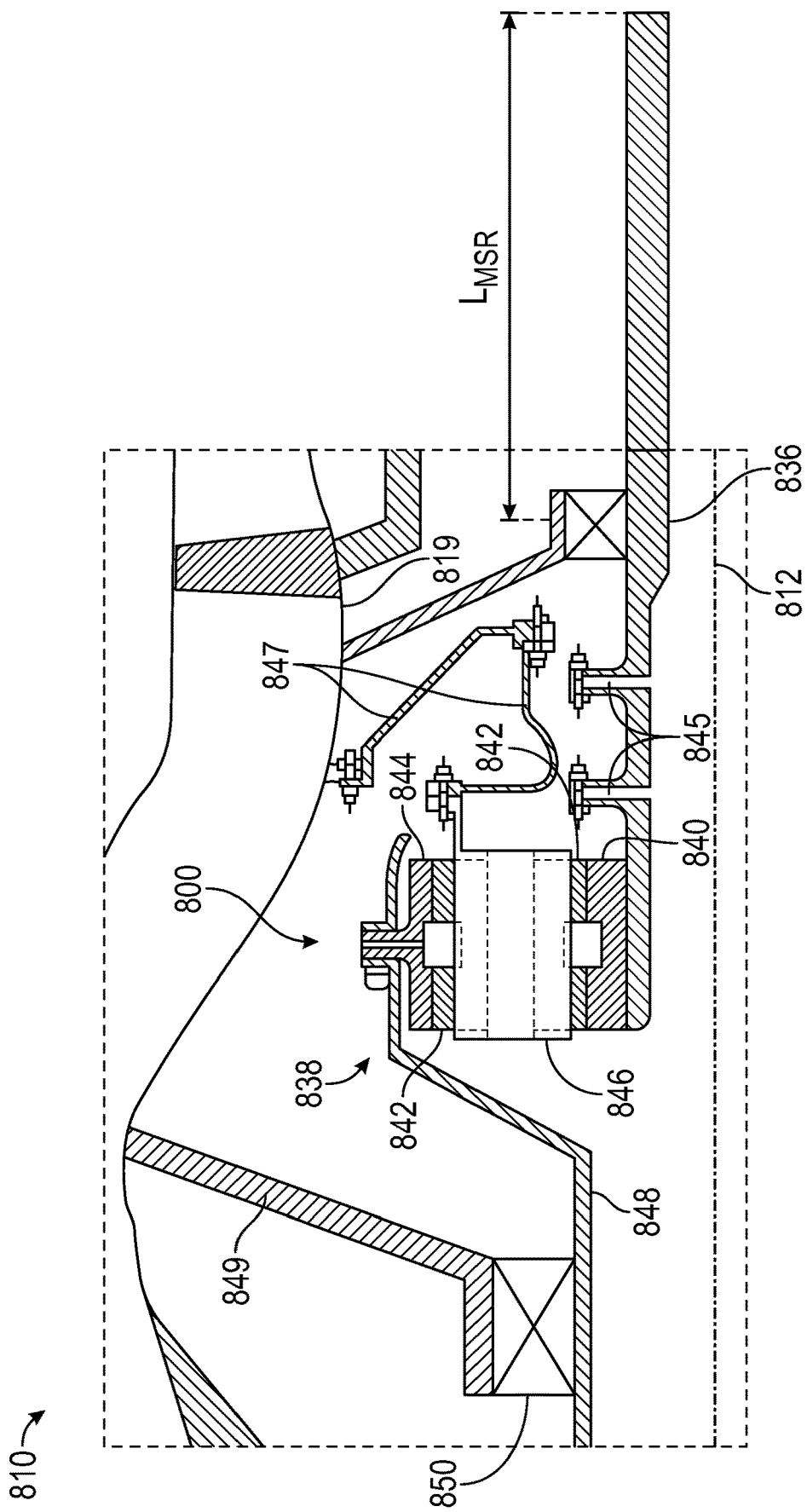
FIG. 8A shows an enlarged, schematic, cross-sectional view of a gearbox assembly of a gas turbine engine, taken along a centerline axis of the gas turbine engine.

As used herein, a "flex coupling" is a mounting structure, such as a shaft, that connects a gearbox assembly to a low-speed shaft of the gas turbine engine. A flex coupling allows displacement of the gearbox assembly with respect to the low-speed shaft in the axial direction, the radial direction, and/or the circumferential direction, and a stiffness and damping of the flex coupling can be tuned to achieve a desired vibrational response through the flex coupling. An example of a flex coupling 845 is shown in FIG. 8A and detailed further below.

As used herein, a "flex mount" is a mounting structure couples the gearbox assembly to an engine static structure of the turbomachine engine. A flex mount allows displacement of the gearbox assembly with respect to the engine static structure in the axial direction, the radial direction, and/or the circumferential direction, and a stiffness and damping of the flex coupling can be tuned to achieve a desired vibrational response through the flex coupling. An example of a flex mount 847 is shown in FIG. 8A and detailed further below.

As used herein, a "deflection limiter" is a component that is used to mechanically limit the maximum deflection of the gearbox assembly beyond a threshold level. A deflection limiter can limit deflections in the radial direction, in the axial direction, and/or in the circumferential direction. Examples of deflection limiters are provided in FIGS. 12B, 12E, 14, and 15, as detailed further below.

As used herein, a "damper" is a device or a component that absorbs vibrations emanating from the gearbox assembly and/or from the midshaft. A damper as used herein can include devices or components for lateral damping, bending damping, and/or torsional damping. Examples of dampers are provided in FIGS. 8B, 9B, 12B, 12D, 12E, 14, and 15.

As used herein, a "helical gear" is a cylindrical gear with gear teeth, also referred to as helical gear teeth, that extend at an angle (a helix angle) to an axis of rotation (e.g., in the axial direction) of the gear.

As used herein, a "bihelical gear" is a gear with two sets of helical gear teeth that oppositely disposed with respect to each other at a helix angle with respect to the axis of rotation.

As used herein, a "helix axis" is an axis along a length of a gear tooth. For example, the helix axis 1767 (FIG. 17) is normal to an end face of the gear tooth. The helix axis 1767 of a helical gear is disposed at a helix angle β with respect to the axis 1713 (FIG. 17) of the gear (e.g., the axis of rotation).

Here and throughout the specification and claims, range limitations are combined, and interchanged, such ranges are identified and include all the sub-ranges contained therein unless context or language indicates otherwise. For example, all ranges disclosed herein are inclusive of the endpoints, and the endpoints are independently combinable with each other.

One or more components of the turbomachine engine described herein below may be manufactured or formed using any suitable process, such as an additive manufacturing process, such as a three-dimensional (3D) printing process. The use of such a process may allow such a component to be formed integrally, as a single monolithic component, or as any suitable number of sub-components. In particular, the additive manufacturing process may allow such a component to be integrally formed and include a variety of features not possible when using prior manufacturing methods. For example, the additive manufacturing methods described herein enable the manufacture of shafts having unique features, configurations, thicknesses, materials, densities, passageways, headers, and mounting structures that may not have been possible or practical using prior manufacturing methods. Some of these features are described herein.

This disclosure and various embodiments relate to a turbomachinery engine, also referred to as a turbine engine, a gas turbine engine, a turboprop engine, or a turbomachine. These turbomachinery engines can be applied across various technologies and industries. Various embodiments may be described herein in the context of aeronautical engines and aircraft machinery.

In some instances, a turbomachinery engine is configured as a direct drive engine. In other instances, a turbomachinery engine can be configured as an indirect drive engine with a gearbox. In some instances, a propulsor of a turbomachinery engine can be a fan encased within a fan case and/or nacelle. This type of turbomachinery engine can be referred to as "a ducted engine." In other instances, a propulsor of a turbomachinery engine can be exposed (e.g., not within a fan case or a nacelle). This type of turbomachinery engine can be referred to as "an open rotor engine" or an "unducted engine."

A turbofan engine, or turbomachinery engine, includes a core engine and a power turbine that drives a bypass fan. The bypass fan is coupled to the core engine via a turbomachine shaft. The bypass fan generates the majority of the thrust of the turbofan engine. The generated thrust can be used to move a payload (e.g., an aircraft). A turbomachine shaft coupled to the power turbine and fan (either directly or through a gearbox) can experience vibrations during operation of the engine (e.g., during rotation of the shaft). For example, when the shaft rotates at its critical speed, the shaft will vibrate excessively. The excessive vibration is due primarily to excitation of a first-order beam bending mode of the shaft. Thus, the shaft may be characterized by its first-order bending mode, the fundamental resonance frequency (fundamental frequency) of this mode, and the shaft's critical speed of rotation. If the first-order bending mode may be excited by a low-speed shaft rate occurring during a standard operating range of the engine, undetected vibration as well as an increased risk of whirl instability, may result. There is a continuing need to address vibrations induced by rotating shafts in turbomachinery engines.

Newer engine architectures may be characterized by faster shaft speeds for the low-pressure turbine (LPT), and longer shafts to accommodate a longer engine core (e.g., the high-pressure compressor, the combustor, and the high-pressure turbine). Additionally, it is desirable to house the engine core within a smaller space. These trends can result in reductions in stiffness-to-weight ratio for the shaft and structure that influence dynamics of the LP shaft, which may have the effect of lowering the critical speed and/or limiting the available options for increasing the critical speed for the LPT's shaft (referred to as the low-speed shaft or the low-pressure (LP) shaft). Accordingly, different approaches for engine types, midshaft geometry, bearing support, and material compositions are required for next-generation turbomachine engines, to permit high-speed operation without resulting in an unstable bending mode during regular operation. The inventors, tasked with finding a suitable design to meet these requirements, conceived and tested a wide variety of shafts having different combinations of stiffness, material, bearing type and location, shaft length, and diameter in order to determine which embodiment(s) were most promising for a variety of contemplated engine designs. The various embodiments, as described herein and as shown in the figures, include turbomachine shafts that employ one or more of these techniques to increase the critical speed of the first-order bending mode.

FIG. 1 shows a schematic, cross-sectional view of a ducted, direct-drive, gas turbine engine 100 for an aircraft, that may incorporate one or more embodiments of the present disclosure. The gas turbine engine 100 includes a fan assembly 102 (e.g., a fixed-pitch fan assembly) and a turbomachine 103 (also referred to as a core engine). In this example, the turbomachine 103 is a two-spool turbomachine, which has a high-speed system and a low-speed system.

The high-speed system of the turbomachine 103, which is not shown in FIG. 1, includes a high-pressure compressor, a high-pressure turbine, a combustor, and a high-speed shaft (also referred to as a "high-pressure shaft") supported by bearings and connecting the high-pressure compressor and the high-pressure turbine. The high-speed shaft, components of the high-pressure compressor, and components of the high-pressure turbine all rotate around a centerline axis 112 of the gas turbine engine 100. The high-pressure compressor (or at least the rotating components thereof), the high-pressure turbine (or at least the rotating components thereof), and the high-speed shaft may be collectively referred to as a high-pressure spool of the gas turbine engine 100. The combustor is located between the high-pressure compressor and the high-pressure turbine. The combustor receives a mixture of fuel and air, and provides a flow of combustion gases through the high-pressure turbine for driving the high-pressure spool. The high-pressure compressor, the high-pressure turbine, and the combustor together define an engine core of the turbomachine 103.

The low-speed system of the turbomachine 103 includes a low-pressure turbine 120, a low-pressure compressor or booster 121, and a low-speed shaft 122 (also referred to as a "low-pressure shaft") extending between and connecting the booster 121 and the low-pressure turbine 120. In some embodiments, the low-speed shaft 122 may extend further along the centerline axis 112 than is shown in FIG. 1. The low-pressure turbine 120 is sometimes referred to as the engine's power turbine. The low-pressure turbine 120 converts kinetic energy contained in the hot gas exiting from the high-pressure turbine into mechanical shaft energy (e.g., of the low-speed shaft 122), which drives the booster 121 and the fan blades 124 either directly or through a gearbox (e.g., any of the gearboxes detailed herein).

As shown in FIG. 1, the gas turbine engine 100 defines an axial direction A (extending parallel to the centerline axis 112), a radial direction R that extends outward from, and inward to, the centerline axis 112 in a direction orthogonal to the axial direction A, and a circumferential direction C that extends three hundred sixty degrees (360°) around the centerline axis 112.

The low-speed shaft 122 is supported on bearings 123a, 123b, 123c, 123d, which are mounted to support structures (not shown) of the gas turbine engine 100. At each position, only two bearings are shown in FIG. 1 for clarity, though more than two bearings, e.g., 3 or 4 bearings forward and/or aft of the respective illustrated locations, may be arranged to support the low-speed shaft 122 at the respective positions, and may be evenly spaced or irregularly spaced depending on the geometry of the bearing supporting structure, and available space and clearances.

The low-speed shaft 122, components of the booster 121, and components of the low-pressure turbine 120 all rotate around the centerline axis 112 of the gas turbine engine 100, in either the same direction or a counter-rotating direction as that of the high-pressure spool. The booster 121 (or at least the rotating components thereof), the low-pressure turbine 120 (or at least the rotating components thereof), and the low-speed shaft 122 may collectively be referred to as a low-pressure spool 400 of the gas turbine engine 100, and is further described in FIG. 4.

The fan assembly 102 includes an array of fan blades 124 extending radially outward from a rotor disc 126. The rotor disc 126 is covered by a rotatable fan hub 127 aerodynamically contoured to promote an airflow through array of fan blades 124. The gas turbine engine 100 has an intake side 128 and an exhaust side 130.

The turbomachine 103 is generally encased in a cowl 131. Moreover, it will be appreciated that the cowl 131 defines at least in part an inlet 132 of the turbomachine 103 and an exhaust nozzle 135 of the turbomachine 103, and includes a turbomachinery flow path extending between the inlet 132 and the exhaust nozzle 135. For the embodiment shown in FIG. 1, the inlet 132 has an annular or an axisymmetric three hundred sixty-degree configuration, and provides a flow path for incoming atmospheric air to enter the turbomachine 103. Such a location may be advantageous for a variety of reasons, including management of icing performance as well as protecting the inlet 132 from various objects and materials as may be encountered in operation.

For a ducted turbofan engine (FIG. 1), a nacelle 140 or fan duct surrounds the array of fan blades 124. The nacelle 140 is supported relative to the turbomachine 103 by circumferentially spaced outlet guide vanes 142. The portion of air entering the nacelle 140 and bypassing the inlet 132 to the core engine is called the bypass airflow. In the embodiment of FIG. 1, the bypass airflow flows through a bypass airflow passage 146 defined at a downstream end 144 of the nacelle 140.

For reference purposes, FIG. 1 depicts a forward or thrust direction with arrow F, which in turn defines the forward and aft portions of the system. The fan assembly 102 is forward of the turbomachine 103, and the exhaust nozzle 135 is aft. The fan assembly 102 is driven by the turbomachine 103, and, more specifically, is driven by the low-pressure turbine 120.

In operation, a volume of air flows through fan assembly 102, and as the volume of air passes across the array of fan blades 124, a first portion of air is directed or routed into the bypass airflow passage 146, and a second portion of air is directed or routed into the inlet 132 and along the turbomachinery flow path. The ratio between the volume of the first portion of air and the volume of the second portion of air is commonly known as a bypass ratio.

After entering the inlet 132, the second portion of air enters the booster 121 and the high-pressure compressor (not shown in FIG. 1). The highly compressed air proceeds along the turbomachinery flow path and is delivered to the combustor (not shown in FIG. 1), where the compressed air is mixed with fuel and burned to provide combustion exhaust gases. The exhaust from the combustor drives the high-pressure turbine (not shown in FIG. 1) and the low-pressure turbine 120, and the low-pressure turbine 120 drives the fan assembly 102 via the low-speed shaft 122.

The combustion exhaust gases are subsequently routed through the exhaust nozzle 135 to provide propulsive thrust. Simultaneously, the pressure of the first portion of air is substantially increased as the first portion of air is routed through the bypass airflow passage 146 before being exhausted from a fan exhaust 148 at the downstream end 144, also providing propulsive thrust. In such a manner, the fan blades 124 of the fan assembly 102 are driven to rotate around the centerline axis 112 and generate thrust to propel the gas turbine engine 100, and, hence, an aircraft to which it is mounted, in the forward direction F. Other configurations are possible and contemplated within the scope of the present disclosure, such as what may be termed a "pusher" configuration embodiment in which the turbomachine 103 is located forward of the fan assembly 102.

As shown, the gas turbine engine 100 in the embodiment shown in FIG. 1 has a direct drive configuration in which the low-speed shaft 122 is directly coupled to the rotor disc 126 and thereby rotates the fan assembly 102 at the same rotational speed as the low-pressure spool. Alternatively, in some embodiments, the turbomachine 103 includes a power gearbox (not shown in FIG. 1), and the fan assembly 102 is indirectly driven by the low-pressure spool of the turbomachine 103 across the power gearbox. The power gearbox may include a gearset for decreasing a rotational speed of the low-pressure spool relative to the low-pressure turbine 120, such that the fan assembly 102 may rotate at a slower rotational speed than does the low-pressure spool.

Figure 2:
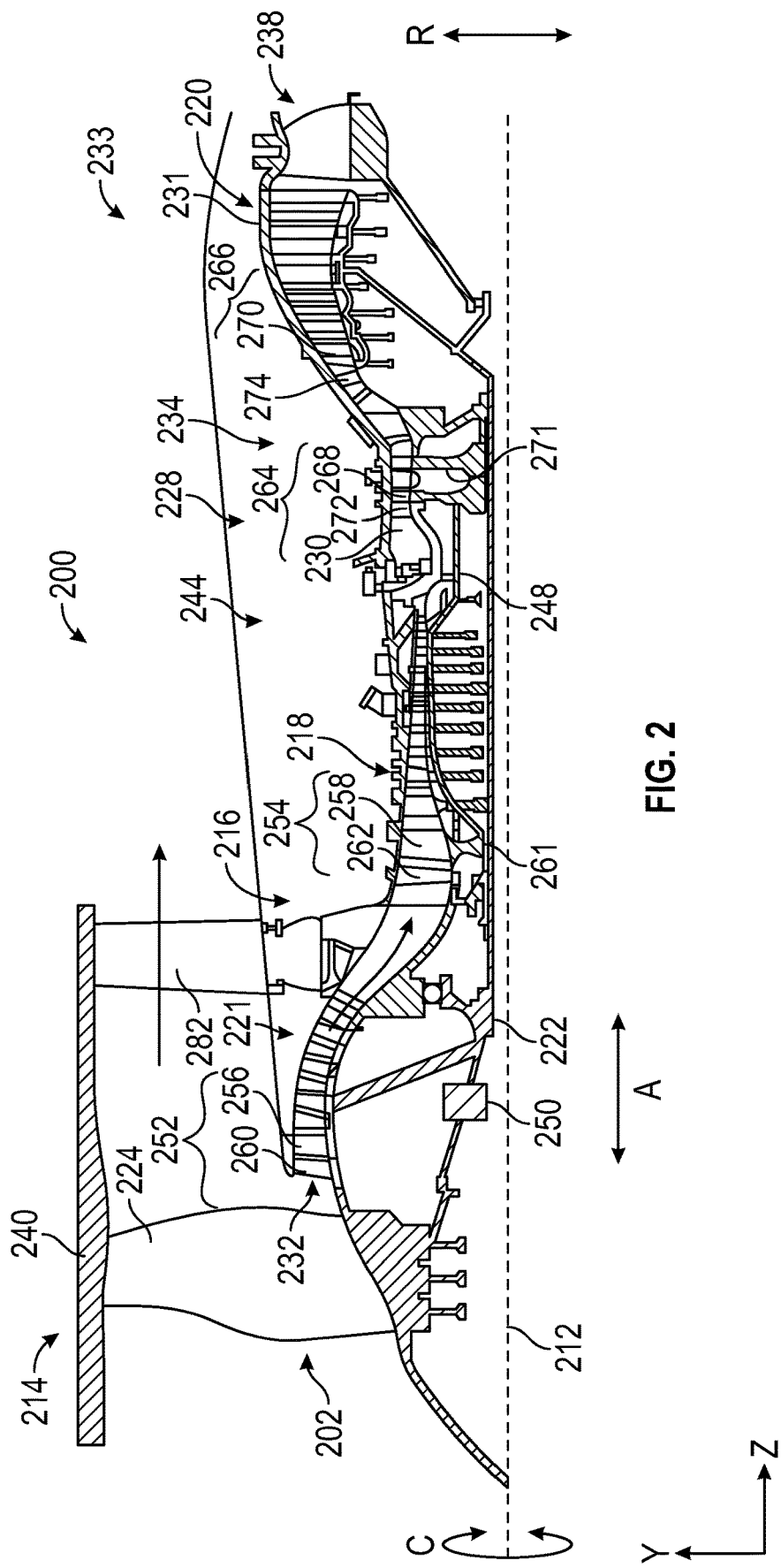
FIG. 2 shows a schematic, cross-sectional view of a ducted, indirect-drive gas turbine engine.

FIG. 2 shows a schematic, cross-sectional view of a ducted, indirect-drive, gas turbine engine 200, also referred to as turbine engine 200, taken along a centerline axis 212 of the gas turbine engine 200, according to an embodiment of the present disclosure. The gas turbine engine 200, also referred to herein as a turbine engine 200, is similar in some respects to the gas turbine engine 100 discussed above with respect to FIG. 1, and like reference numerals have been used to refer to the same or similar components. Parts omitted from FIG. 1 for clarity are shown and described with respect to FIG. 2 and, thus, the parts referenced, but not shown, in FIG. 1 may be the same or similar those shown and described with respect to FIG. 2. Likewise, parts omitted from the description of FIG. 2 for clarity are shown and described with respect to FIG. 1, and thus, the parts depicted but not described may be the same as, or similar to, the parts described with respect to FIG. 1.

As shown in FIG. 2, the turbine engine 200 includes, in downstream serial flow relationship, a fan section 214 including a fan 202, a compressor section 216 including a booster or low-pressure (LP) compressor 221 and a high-pressure (HP) compressor 218, a combustion section 228 including a combustor 230, a turbine section 233 including an HP turbine 234, and an LP turbine 220, and an exhaust section 238.

The fan section 214 includes a fan casing 240, which is secured to a nacelle (FIG. 1) surrounding the fan 202. The fan 202 includes a plurality of fan blades 224 disposed radially about the centerline axis 212. The HP compressor 218, the combustor 230, and the HP turbine 234 form an engine core 244 of the turbine engine 200, which generates combustion gases. The engine core 244 is surrounded by a core casing 231, which is coupled to the fan casing 240. The fan casing 240 is supported relative to the turbomachine by circumferentially spaced outlet guide vanes 282.

A high-speed shaft 248 is disposed coaxially about the centerline axis 212 of the turbine engine 200 and drivingly connects the HP turbine 234 to the HP compressor 218. A low-speed shaft 222, which is disposed coaxially about the centerline axis 212 of the turbine engine 200 and within the larger diameter annular high-speed shaft 248, drivingly connects the LP turbine 220 to the LP compressor 221 and the fan 202 (either directly or through a gearbox assembly 250). The high-speed shaft 248 and the low-speed shaft 222 are rotatable about the centerline axis 212.

The LP compressor 221 and the HP compressor 218, respectively, include a respective plurality of compressor stages 252, 254, in which a respective set of compressor blades 256, 258 rotate relative to a respective set of compressor vanes 260, 262 to compress or pressurize gas entering through the inlet 232. Referring now only to the HP compressor 218, a single compressor stage 254 includes multiple compressor blades 258 provided on a rotor disk 261 (or blades and disk are integrated together, referred to as a blisk). A compressor blade extends radially outwardly relative to the engine centerline 212, from a blade platform to a blade tip The compressor vanes 262 are positioned upstream/downstream of and adjacent to rotating compressor blades 258. The disk 261 for a stage of compressor blades 258 is mounted to the high-speed shaft 248 (HPC). A stage of the HPC refers to a single disk of rotor blades or both the rotor blades and adjacent stator vanes (it is understood that either meaning can apply within the context of this disclosure without loss of clarity).

The HP turbine 234 has one or two stages 264. In a single turbine stage 264 turbine blades 268 are provided on a rotor disk 271. A turbine blade extends radially outwardly relative to the centerline axis 212, from a blade platform to a blade tip. The HP turbine 234 can also include a stator vane 272. The HP turbine 234 may have both an upstream nozzle adjacent the combustor exit and an exit nozzle aft of the rotor, or a nozzle upstream of rotor blades or downstream of the rotor blades.

Air exiting the HP turbine 234 enters the LP turbine or power turbine 220, which has a plurality of stages of rotating blades 270. The LP turbine 220 can have three, four, five, or six stages. In a single LP turbine stage 266 (containing a plurality of blades coupled to the LP shaft 222), a turbine blade is provided on a rotor disk (connected to the LP shaft 222) and extends radially outwardly relative to the centerline axis 212, from a blade platform to a blade tip. The LP turbine 220 can also include a stator vane 274. The LP turbine 220 may have both an upstream nozzle and an exit nozzle aft of a stage, followed by the engine's exhaust nozzle 238.

The turbine engine 200 of FIG. 2 operates in a similar manner as the engine of FIG. 1. Airflow exiting the fan section 214 is split such that a portion of the airflow is channeled into an inlet 232 to the LP compressor 221, which then supplies pressurized airflow to the HP compressor 218, which further pressurizes the air. The pressurized airflow from the HP compressor 218 is mixed with fuel in the combustor 230 and ignited, thereby generating combustion gases. Some work is extracted from the combustion gases by the HP turbine 234, which drives the HP compressor 218 to produce a self-sustaining combustion. The combustion gases discharged from the HP turbine enter the LP turbine 220, which extracts additional work to drive the LP compressor 221 and the fan 202 (directly or through the gearbox assembly 250). The gas discharged from the LP turbine exits through the exhaust nozzle 238.

Some of the air supplied by the fan 202 bypasses the engine core 244 and is used for cooling of portions, especially hot portions, of the turbine engine 200, and/or used to cool or power other aspects of the aircraft. In the context of the turbine engine 200, the hot portions refer to a variety of portions of the turbine engine 200 downstream of the combustion section 228 (e.g., the turbine section 233). Other sources of cooling fluid include, but are not limited to, fluid discharged from the LP compressor 221 or the HP compressor 218.

The gas turbine engines 100 and 200 depicted in FIG. 1 and FIG. 2 are by way of example only. In other embodiments, the gas turbine engine may have any other suitable configuration, including, for example, any other suitable number or configurations of shafts or spools, fan blades, turbines, compressors, or combination thereof. The gearbox assembly may have any suitable configuration, including, for example, a star gear configuration, a planet gear configuration, a single-stage, a multi-stage, epicyclic, non-epicyclic, etc., as detailed further below. The gearbox may have a gear ratio of in a range of 3:1 to 4:1, 3:5 to 4:1, 3.25:1 to 3.5:1, or 4:1 to 5:1. The fan assembly may be any suitable fixed-pitched assembly or variable-pitched assembly. The gas turbine engine may include additional components not shown in FIG. 1, such as rotor blades, stator vanes, etc. The fan assembly may be configured in any other suitable manner (e.g., as a fixed pitch fan) and further may be supported using any other suitable fan frame configuration. Aspects of the present disclosure may be incorporated into any other suitable turbine engine, including, but not limited to, turbofan engines, propfan engines, turbojet engines, turboprop, and turboshaft engines.

Figure 3:
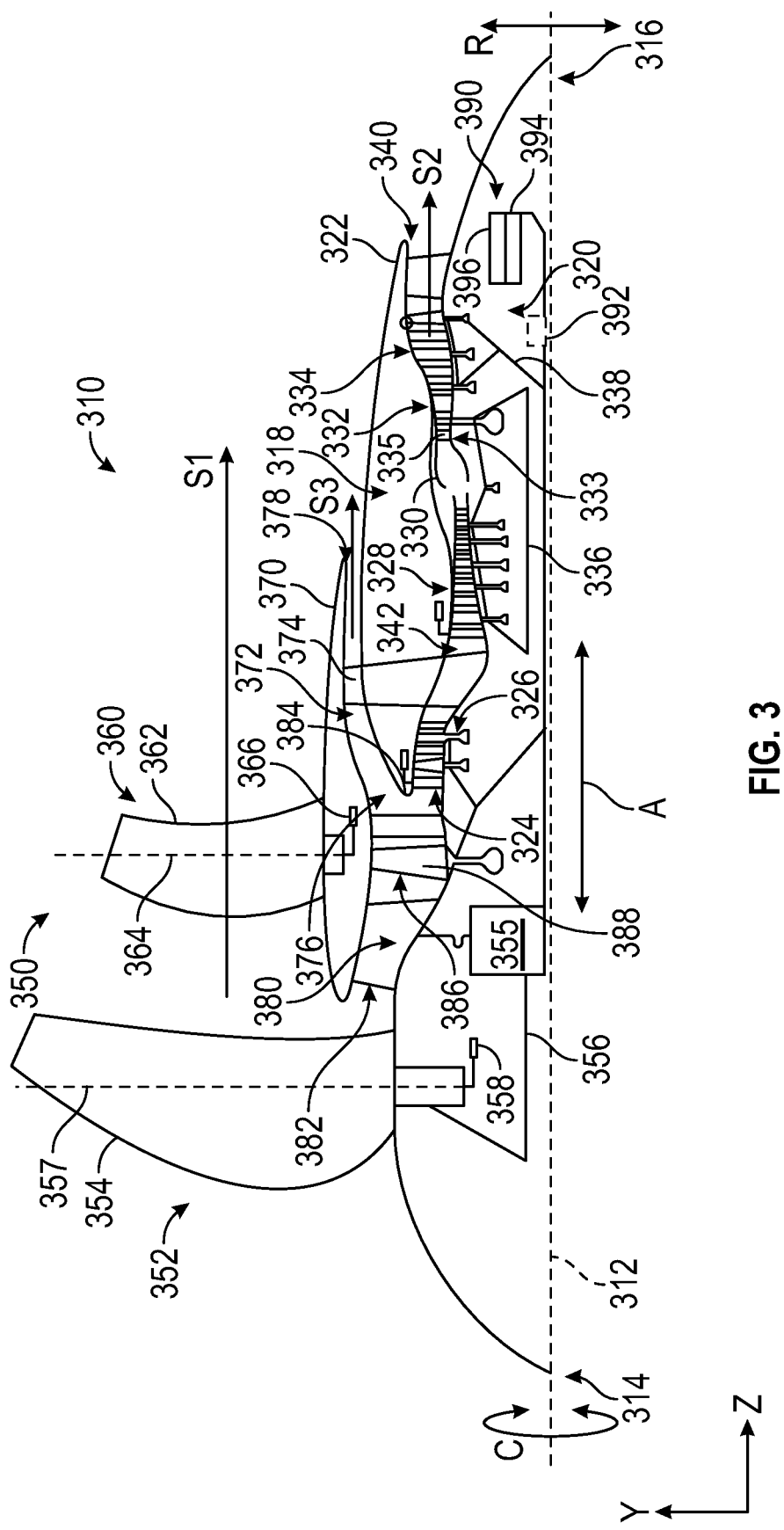
FIG. 3 shows a schematic view of an unducted, three-stream gas turbine engine.

FIG. 3 shows a schematic view of an unducted, three-stream, gas turbine engine 310 for an aircraft, that may incorporate one or more embodiments of the present disclosure. The gas turbine engine 310 is a "three-stream engine" in that its architecture provides three distinct streams (labeled S1, S2, and S3) of thrust-producing airflow during operation, as detailed further below.

As shown in FIG. 3, the gas turbine engine 310 defines an axial direction A, a radial direction R, and a circumferential direction C. Moreover, the gas turbine engine 310 defines a centerline axis 312 that extends along the axial direction A. In general, the axial direction A extends parallel to the centerline axis 312, the radial direction R extends outward from, and inward to, the centerline axis 312 in a direction orthogonal to the axial direction A, and the circumferential direction C extends three hundred sixty degrees (360°) around the centerline axis 312. The gas turbine engine 310 extends between a forward end 314 and an aft end 316, e.g., along the axial direction A.

The gas turbine engine 310 includes a core engine 320 and a fan assembly 350 positioned upstream thereof. Generally, the core engine 320 includes, in serial flow order, a compressor section, a combustion section, a turbine section, and an exhaust section. Particularly, as shown in FIG. 3, the core engine 320 includes an engine core 318 and a core cowl 322 that annularly surrounds the core engine 320. The core engine 320 and core cowl 322 define a core inlet 324 having an annular shape. The core cowl 322 further encloses and supports a low pressure (LP) compressor 326 (also referred to as a booster) for pressurizing the air that enters the core engine 320 through core inlet 324. A high pressure (HP) compressor 328 receives pressurized air from the LP compressor 326 and further increases the pressure of the air. The pressurized air flows downstream to a combustor 330 where fuel is injected into the pressurized air and ignited to raise the temperature and the energy level of the pressurized air, thereby generating combustion gases.

The combustion gases flow from the combustor 330 downstream to a high pressure (HP) turbine 332. The HP turbine 332 drives the HP compressor 328 through a first shaft, also referred to as a high pressure (HP) shaft 336 (also referred to as a "high-speed shaft"). In this regard, the HP turbine 332 is drivingly coupled with the HP compressor 328. Together, the HP compressor 328, the combustor 330, and the HP turbine 332 define the engine core 318. The combustion gases then flow to a power turbine or low pressure (LP) turbine 334. The LP turbine 334 drives the LP compressor 326 and components of the fan assembly 350 through a second shaft, also referred to as a low pressure (LP) shaft 338 (also referred to as a "low-speed shaft"). In this regard, the LP turbine 334 is drivingly coupled with the LP compressor 326 and components of the fan assembly 350. The low-speed shaft 338 is coaxial with the high-speed shaft 336 in the embodiment of FIG. 3. After driving each of the HP turbine 332 and the LP turbine 334, the combustion gases exit the core engine 320 through a core exhaust nozzle 340. The core engine 320 defines a core flowpath, also referred to as a core duct 342, that extends between the core inlet 324 and the core exhaust nozzle 340. The core duct 342 is an annular duct positioned generally inward of the core cowl 322 along the radial direction R.

The fan assembly 350 includes a primary fan 352. For the embodiment of FIG. 3, the primary fan 352 is an open rotor fan, also referred to as an unducted fan. However, in other embodiments, the primary fan 352 may be ducted, e.g., by a fan casing or a nacelle circumferentially surrounding the primary fan 352. The primary fan 352 includes an array of fan blades 354 (only one shown in FIG. 3). The fan blades 354 are rotatable about the centerline axis 312 via a fan shaft 356. As shown in FIG. 3, the fan shaft 356 is coupled with the low-speed shaft 338 via a speed reduction gearbox, also referred to as a gearbox assembly 355, e.g., in an indirect-drive configuration. The gearbox assembly 355 is shown schematically in FIG. 3. The gearbox assembly 355 includes a plurality of gears for adjusting the rotational speed of the fan shaft 356 and, thus, the primary fan 352 relative to the low-speed shaft 338 to a more efficient rotational fan speed. The gearbox assembly may have a gear ratio of 4:1 to 12:1, or 7:1 to 12:1, or 4:1 to 10:1, or 5:1 to 9:1, or 6:1 to 9:1, and may be configured in an epicyclic star or planet gear configuration. The gearbox may be a single stage or compound gearbox.

The fan blades 354 can be arranged in equal spacing around the centerline axis 312. Each fan blade 354 has a root and a tip and a span defined therebetween. Each fan blade 354 defines a central blade axis 357. For the embodiment of FIG. 3, each fan blade 354 of the primary fan 352 is rotatable about their respective central blade axis 357, e.g., in unison with one another. One or more actuators 358 are controlled to pitch the fan blades 354 about their respective central blade axis 357. In other embodiments, each fan blade 354 is fixed or is unable to be pitched about the central blade axis 357.

The fan assembly 350 further includes a fan guide vane array 360 that includes fan guide vanes 362 (only one shown in FIG. 3) disposed around the centerline axis 312. For the embodiment of FIG. 3, the fan guide vanes 362 are not rotatable about the centerline axis 312. Each fan guide vane 362 has a root and a tip and a span defined therebetween. The fan guide vanes 362 can be unshrouded as shown in FIG. 3 or can be shrouded, e.g., by an annular shroud spaced outward from the tips of the fan guide vanes 362 along the radial direction R. Each fan guide vane 362 defines a central vane axis 364. For the embodiment of FIG. 3, each fan guide vane 362 of the fan guide vane array 360 is rotatable about their respective central vane axis 364, e.g., in unison with one another. One or more actuators 366 are controlled to pitch the fan guide vanes 362 about their respective central vane axis 364. In other embodiments, each fan guide vane 362 is fixed or is unable to be pitched about the central vane axis 364. The fan guide vanes 362 are mounted to a fan cowl 370.

The fan cowl 370 annularly encases at least a portion of the core cowl 322 and is generally positioned outward of the core cowl 322 along the radial direction R. Particularly, a downstream section of the fan cowl 370 extends over a forward portion of the core cowl 322 to define a fan flowpath, also referred to as a fan duct 372. Incoming air enters through the fan duct 372 through a fan duct inlet 376 and exits through a fan exhaust nozzle 378 to produce propulsive thrust. The fan duct 372 is an annular duct positioned generally outward of the core duct 342 along the radial direction R. The fan cowl 370 and the core cowl 322 are connected together and supported by a plurality of struts 374 (only one shown in FIG. 3) that extend substantially radially and are circumferentially spaced about the centerline axis 312. The plurality of struts 374 are each aerodynamically contoured to direct air flowing thereby. Other struts in addition to the plurality of struts 374 can be used to connect and support the fan cowl 370 and/or the core cowl 322.

The gas turbine engine 310 also defines or includes an inlet duct 380. The inlet duct 380 extends between an engine inlet 382 and the core inlet 324 and the fan duct inlet 376. The engine inlet 382 is defined generally at the forward end of the fan cowl 370 and is positioned between the primary fan 352 and the fan guide vane array 360 along the axial direction A. The inlet duct 380 is an annular duct that is positioned inward of the fan cowl 370 along the radial direction R. Air flowing downstream along the inlet duct 380 is split, not necessarily evenly, into the core duct 342 and the fan duct 372 by a splitter 384 of the core cowl 322. The inlet duct 380 is wider than the core duct 342 along the radial direction R. The inlet duct 380 is also wider than the fan duct 372 along the radial direction R.

The fan assembly 350 also includes a mid-fan 386. The mid-fan 386 includes a plurality of mid-fan blades 388 (only one shown in FIG. 3). The plurality of mid-fan blades 388 are rotatable, e.g., about the centerline axis 312. The mid-fan 386 is drivingly coupled with the LP turbine 334 via the low-speed shaft 338. The plurality of mid-fan blades 388 can be arranged in equal circumferential spacing about the centerline axis 312. The plurality of mid-fan blades 388 are annularly surrounded (e.g., ducted) by the fan cowl 370. In this regard, the mid-fan 386 is positioned inward of the fan cowl 370 along the radial direction R. The mid-fan 386 is positioned within the inlet duct 380 upstream of both the core duct 342 and the fan duct 372. A ratio of a span of a blade 354 to that of a mid-fan blade 388 (a span is measured from a root to tip of the respective blade) is greater than 2 and less than 10, to achieve the desired benefits of the third stream (S3), particularly the additional thrust it offers to the engine, which can enable a smaller diameter blade 354 (benefits engine installation).

Accordingly, air flowing through the inlet duct 380 flows across the plurality of mid-fan blades 388 and is accelerated downstream thereof. At least a portion of the air accelerated by the mid-fan blades 388 flows into the fan duct 372 and is ultimately exhausted through the fan exhaust nozzle 378 to produce propulsive thrust. Also, at least a portion of the air accelerated by the plurality of mid-fan blades 388 flows into the core duct 342 and is ultimately exhausted through the core exhaust nozzle 340 to produce propulsive thrust. Generally, the mid-fan 386 is a compression device positioned downstream of the engine inlet 382. The mid-fan 386 is operable to accelerate air into the fan duct 372, also referred to as a secondary bypass passage.

During operation of the gas turbine engine 310, an initial or incoming airflow passes through the fan blades 354 of the primary fan 352 and splits into a first airflow and a second airflow. The first airflow bypasses the engine inlet 382 and flows generally along the axial direction A outward of the fan cowl 370 along the radial direction R. The first airflow accelerated by the fan blades 354 passes through the fan guide vanes 362 and continues downstream thereafter to produce a primary propulsion stream or first thrust stream S1. A majority of the net thrust produced by the gas turbine engine 310 is produced by the first thrust stream S1. The second airflow enters the inlet duct 380 through the engine inlet 382.

The second airflow flowing downstream through the inlet duct 380 flows through the plurality of mid-fan blades 388 of the mid-fan 386 and is consequently compressed. The second airflow flowing downstream of the mid-fan blades 388 is split by the splitter 384 located at the forward end of the core cowl 322. Particularly, a portion of the second airflow flowing downstream of the mid-fan 386 flows into the core duct 342 through the core inlet 324. The portion of the second airflow that flows into the core duct 342 is progressively compressed by the LP compressor 326 and the HP compressor 328 and is ultimately discharged into the combustion section. The discharged pressurized air stream flows downstream to the combustor 330 where fuel is introduced to generate combustion gases or products.

The combustor 330 defines an annular combustion chamber that is generally coaxial with the centerline axis 312. The combustor 330 receives pressurized air from the HP compressor 328 via a pressure compressor discharge outlet. A portion of the pressurized air flows into a mixer. Fuel is injected by a fuel nozzle (omitted for clarity) to mix with the pressurized air thereby forming a fuel-air mixture that is provided to the combustion chamber for combustion. Ignition of the fuel-air mixture is accomplished by one or more igniters (omitted for clarity), and the resulting combustion gases flow along the axial direction A toward, and into, a first stage turbine nozzle of the HP turbine 332. The first stage turbine nozzle 333 is defined by an annular flow channel that includes a plurality of radially extending, circumferentially spaced nozzle vanes 335 that turn the combustion gases so that they flow angularly and impinge upon first stage turbine blades of the HP turbine 332. The combustion gases exit the HP turbine 332 and flow through the LP turbine 334 and exit the core duct 342 through the core exhaust nozzle 340 to produce a core air stream, also referred to as a second thrust stream S2. As noted above, the HP turbine 332 drives the HP compressor 328 via the high-speed shaft 336, and the LP turbine 334 drives the LP compressor 326, the primary fan 352, and the mid-fan 386 via the low-speed shaft 338.

The other portion of the second airflow flowing downstream of the mid-fan 386 is split by the splitter 384 into the fan duct 372. The air enters the fan duct 372 through the fan duct inlet 376. The air flows generally along the axial direction A through the fan duct 372 and is ultimately exhausted from the fan duct 372 through the fan exhaust nozzle 378 to produce a third stream, also referred to as a third thrust stream S3.

The third thrust stream S3 is a secondary air stream that increases fluid energy to produce a minority of total propulsion system thrust. In some embodiments, a pressure ratio of the third stream is higher than that of the primary propulsion stream (e.g., a bypass or a propeller driven propulsion stream). The thrust may be produced through a dedicated nozzle or through mixing of the secondary air stream with the primary propulsion stream or a core air stream, e.g., into a common nozzle. In certain embodiments, an operating temperature of the secondary air stream is less than a maximum compressor discharge temperature for the engine. Furthermore in certain embodiments, aspects of the third stream (e.g., airstream properties, mixing properties, or exhaust properties), and thereby a percent contribution to total thrust, are passively adjusted during engine operation or can be modified purposefully through use of engine control features (such as fuel flow, electric machine power, variable stators, variable inlet guide vanes, valves, variable exhaust geometry, or fluidic features) to adjust or to improve overall system performance across a broad range of potential operating conditions.

The gas turbine engine 310 depicted in FIG. 3 is by way of example only. In other embodiments, the gas turbine engine 310 may have any other suitable configuration. For example, in other embodiments, the primary fan 352 may be configured in any other suitable manner (e.g., as a fixed pitch fan) and further may be supported using any other suitable fan frame configuration. In other embodiments, the primary fan 352 can be ducted by a fan casing or a nacelle such that a bypass passage is defined between the fan casing and the fan cowl 370. Moreover, in other embodiments, any other suitable number or configuration of compressors, turbines, shafts, or a combination thereof may be provided. In still other embodiments, aspects of the present disclosure may be incorporated into any other suitable turbine engine, such as, for example, turbofan engines, propfan engines, turbojet engines, turboprop, turboshaft engines, and/or turbine engines defining two streams (e.g., a bypass stream and a core air stream).

Further, for the depicted embodiment of FIG. 3, the gas turbine engine 310 includes an electric machine 390 (motor-generator) operably coupled with a rotating component thereof. In this regard, the gas turbine engine 310 is a hybrid-electric propulsion machine. Particularly, as shown in FIG. 3, the electric machine 390 is operatively coupled with the low-speed shaft 338. The electric machine 390 can be mechanically connected to the low-speed shaft 338, either directly, or indirectly, e.g., by way of a gearbox assembly 392 (shown schematically in FIG. 3). Further, although in this embodiment the electric machine 390 is operatively coupled with the low-speed shaft 338 at an aft end of the low-speed shaft 338, the electric machine 390 can be coupled with the low-speed shaft 338 at any suitable location or can be coupled to other rotating components of the gas turbine engine 310, such as the high-speed shaft 336 or the low-speed shaft 338. For instance, in some embodiments, the electric machine 390 can be coupled with the low-speed shaft 338 and positioned forward of the mid-fan 386 along the axial direction. In some embodiments, the engine of FIG. 2 also includes an electric machine coupled to the LP shaft and located in the engine's tail cone.

In some embodiments, the electric machine 390 can be an electric motor operable to drive or motor the low-speed shaft 338, e.g., during an engine burst. In other embodiments, the electric machine 390 can be an electric generator operable to convert mechanical energy into electrical energy. In this way, electrical power generated by the electric machine 390 can be directed to various engine and/or aircraft systems. In some embodiments, the electric machine 390 can be a motor/generator with dual functionality. The electric machine 390 includes a rotor 394 and a stator 396. The rotor 394 is coupled to the low-speed shaft 338 and rotates with rotation of the low-speed shaft 338. In this way, the rotor 394 rotates with respect to the stator 396, thereby generating electrical power. Although the electric machine 390 has been described and illustrated in FIG. 3 as having a particular configuration, the present disclosure may apply to electric machines having alternative configurations. For instance, the rotor 394 and/or the stator 396 may have different configurations or may be arranged in a different manner than illustrated in FIG. 3.

FIG. 4 shows an enlarged view of a portion of the cross-sectional view of FIG. 1, that includes the low-pressure spool 400 according to some embodiments of the present disclosure. For example, a portion of the booster 121 and a portion of the low-pressure turbine 120 are shown mounted to the low-speed shaft 122 of the turbomachine 103, which in this example is a two-spool turbomachine. Alternatively, the low-speed shaft 122 may be an intermediate shaft in a three-spool turbomachine (not shown). The low-speed shaft 122 is supported by at least bearings 123a to 123d, which are located at mounting points 405a, 405b associated with a booster 121 location and a low-pressure turbine 120 location, respectively, for providing shaft rotational support at these locations. In the example of FIG. 4, bearings 123a, 123b, 123c, and 123d are all positioned inside of the mounting points 405a and 405b, which is referred to as an inbound bearing layout, or alternatively referred to as an overhung configuration for the booster 121 and low-pressure turbine 120. If the bearings were positioned outside of the mounting point 405b, then that would be referred to as an outbound layout. The bearings 123a to 123d can, however, be positioned at any point along the low-speed shaft 122, and may both be inbound, both be outbound, or one inbound and the other outbound.

The low-speed shaft 122 has a length "L" (indicated by arrow 408) and an outer diameter "D" (indicated by arrow 410). The length L is also referred to as $L_{MSR}$ and the outer diameter D is also referred to $D_{MSR}$, as detailed further below. The low-speed shaft 122 can be hollow, with an inner diameter "d" indicated by arrow 411). In cases when the diameter of the low-speed shaft 122 varies along the length L, the outer diameter "D" and the inner diameter "d" may be defined at a midpoint of the low-speed shaft 122 (also referred to as the midshaft 415). The thickness may be defined as the thickness of the walls of the low-speed shaft 122 in embodiments in which the low-speed shaft 122 is hollow. A difference between a stated outer diameter D and inner diameter d of the low-speed shaft 122 may be understood as the shaft's wall thickness. In cases when the wall thickness varies along the length of the low-speed shaft 122, the thickness may be defined as the difference between the inner diameter and the outer diameter at the midshaft 415.

In some embodiments, the length L can be understood as the portion of the low-speed shaft 122 between the bearings 123a to 123d and/or the mounting points 405a, 405b of engine components such as the booster 121 and the low-pressure turbine 120. For example, in the two-bearing arrangement of FIG. 4, the length L may be measured as the distance between midpoints of the bearings 123a to 123b, as indicated by the dashed vertical lines and arrow 408. For a four-bearing arrangement, there may be additional bearings along the shaft, in which case the length L may be measured as the distance between the midpoints of an innermost pair of bearings, or the distance between pairs or other groupings of bearings. In some embodiments, the length may be measured relative to specific bearings associated with specific engine components such as the booster 121 and the low-pressure turbine 120.

During operation, the low-speed shaft 122 rotates with a rotational speed that can be expressed in either rotations per minute (RPM), or as an outer diameter (OD) speed expressed in units of linear velocity, such as feet per second (ft/sec). The rotational stability of the low-speed shaft 122 relative to its operational range may be characterized by the resonance frequency of the fundamental or first order bending mode. When an operational speed is the same as this resonance frequency, the shaft is operating at its critical speed. The low-speed shaft 122, when supported by bearings 123a to 123d, has a mode shape for this first-order bending mode that may be generally described as a half-sinusoid, with a midshaft 415 location undergoing maximum displacement (indicated by arrow 420, which is exaggerated for clarity and is not to scale) and, therefore, having a maximum kinetic energy of displacement relative to other portions of the low-speed shaft 122. The fundamental mode shape is illustrated by dashed line 425 extending from bearing 123c to bearing 123d in FIG. 4, though this is only half of the amplitude of oscillation. This unstable mode is a standing wave across the length L of the low-speed shaft 122. The maximum deflection occurs when the excitation source has a periodicity or cyclic component near to the fundamental frequency. Since the bending mode is not active at the location of the innermost bearings 123a to 123d for the low-speed shaft 122, the instability cannot be mitigated with the use of bearing dampers. When an engine is designed, the shaft speed expected to produce the highest deflection or instability at the midshaft is the shaft speed that equals the critical speed.

If the critical speed of the shaft critical speed falls within the standard operational range, i.e., if the critical speed is below the redline speed or the low-speed shaft 122 is a supercritical shaft, then during routine operation, the low-speed shaft 122 may at times operate at or pass through the critical speed, which induces an unstable condition. Even if the engine is operated at the critical speed temporarily, there is a possibility of undetected vibration, whirl instability, and some likelihood of damage. For low vibration and stability, it is preferable to have an operating range free of any intervening critical speeds.

There is a desire to pursue engines capable of operating at higher redline speeds. This pursuit of higher operating speeds requires that the low-speed shaft 122 have a higher strength to weight characteristic if it is also desired that the shaft remain subcritical. The inventors sought this end result—higher speed shafts while remaining subcritical. To this end, a large number of engine designs were evaluated. Depending on the architecture, the positions and numbers of bearings relative to mounting points 405a, 405b were varied, and the resulting impact, not only on the critical speed but also the feasibility of such configurations given competing requirements (clearance, spacing, sump locations, oil supply lines), were taken into consideration, as will be readily apparent in view of the disclosure. A discussion of these embodiments follows. In the following discussion, strength to weight ratio is represented as E/rho, calculated as the ratio of Young's modulus E for the material (expressed, for example, in pounds per square foot) divided by the density rho (expressed, for example, in pounds per cubic inch). The shaft bending mode is represented as the critical rotational speed expressed in rotations per minute (RPM), though it could alternatively be expressed as the fundamental frequency of the bending mode in Hertz.

In some embodiments, high strength steel alloys, advanced materials, composite materials, and combinations thereof, were contemplated. For example, high strength-to-weight ratio materials such as titanium boride (TiB), a titanium metal matrix composite (TiMMC), provided 30% to 50% increased strength-to-weight ratio relative to steel or titanium alloys. In addition, coatings with materials such as graphene were found to improve strength by a factor of two in lab tests, without impacting weight. These types of changes in material composition may be characterized in some embodiments by the ratio of E/rho.

Figure 5B:
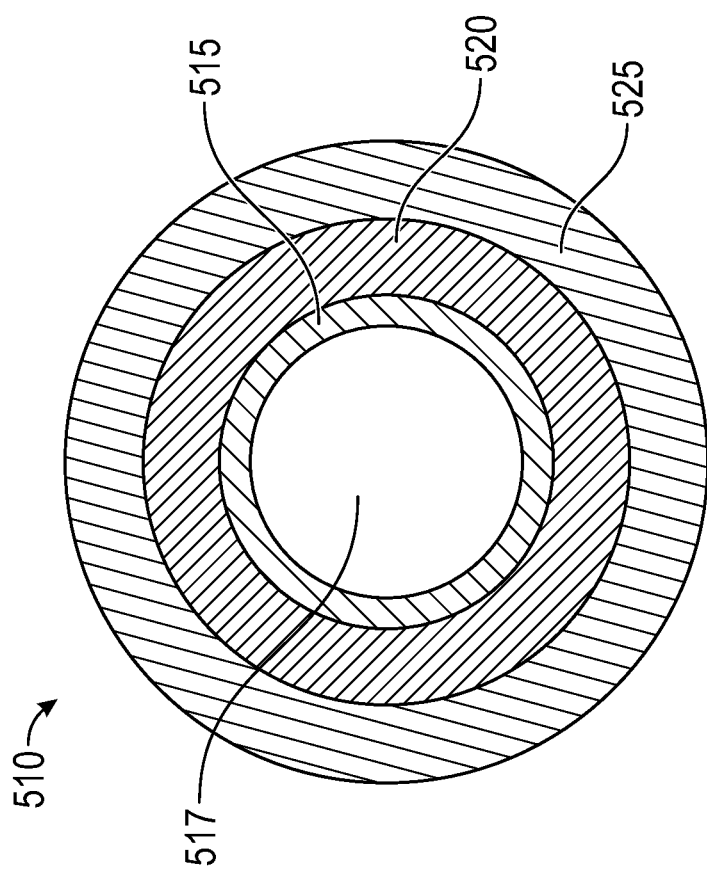
FIG. 5B shows a cross-sectional view of a composite shaft.
Figure 5A:
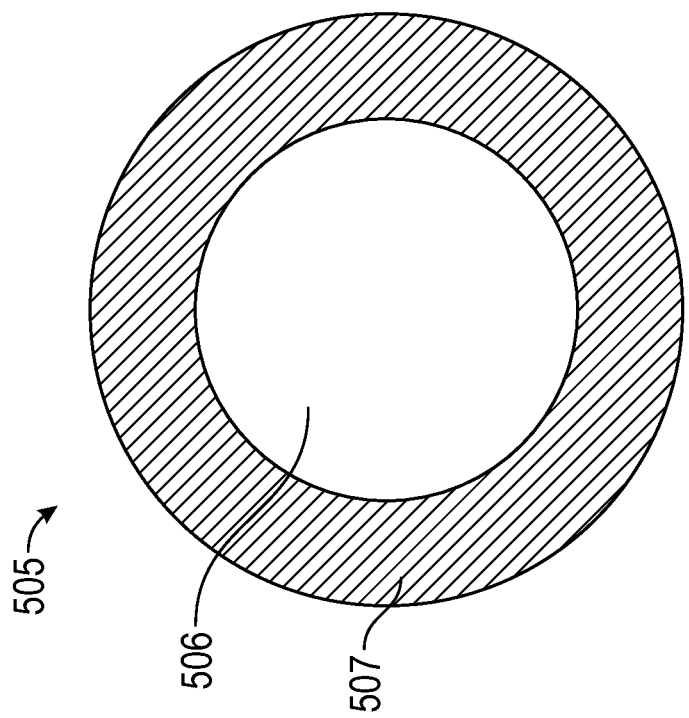
FIG. 5A shows a cross-sectional view of a steel shaft.

FIG. 5A shows a cross-sectional view of a steel shaft 505, with a standard hollow interior 506 surrounded by a steel layer 507, and geometry defined by a length L, outer diameter D, inner diameter d, etc.

FIG. 5B shows a cross-sectional view of an example of a composite shaft 510, with identical geometry to the steel shaft 505. Rather than being composed entirely of steel, the composite shaft 510 has an inner layer 515 surrounding a hollow interior 517, a middle layer 520, and an outer coating 525, all of different materials. The middle layer 520 in this example is also steel, though in other embodiments the composite shaft could use no steel at all, or have a different layer be steel.

For example, both the steel shaft 505 and the composite shaft 510 have length L of seventy-six inches and outer diameter of three inches, along with a standard inbound two-bearings configuration as depicted in FIG. 4. The fundamental frequency of the unstable mode for the steel shaft 505 is eighty Hertz (Hz), whereas the fundamental frequency for the composite shaft 510 is ninety Hz.

In other embodiments, more layers or fewer layers may be used. Some or all of these layers and coatings may be of numerous alternative materials to steel, including but not limited to TiB, TiMMC, other metals and metal matrix composites, silicon carbide (SiC), silicon carbide reinforced metals or alloys (e.g., SiC-MMC), aluminum alloys, graphene, or combinations thereof. The concepts of the present disclosure are not limited by the particular materials used for the layers and coatings. For the composite shaft 510, the critical speed corresponding to the unstable mode is increased relative to the (otherwise identical) steel shaft 505, which means that relative to the steel shaft 505, the composite shaft 510 can attain a higher rotational speed before reaching the critical speed.

Depending on the type of composite materials chosen and the relative thickness and arrangement of the layers, the ratio of stiffness to weight can be modified, and, therefore the critical speed can be increased. The inventors conceived of a variety of embodiments resulting from the selection of different composite materials, thicknesses, and bearings configurations to allow for operation at higher speed. Two such embodiments are listed in TABLE 1. These embodiments were considered as possible designs that could increase the shaft stiffness to weight ratio in such a way to be compatible with engine architecture and without requiring modifications or limitations on the targeted operating range for a subcritical shaft.

TABLE 1

| Embodi-ment | L (in) | D (in) | Bearing type | E/rho ($in^{-1}$) | Teff (in) | Mode (RPM) |
|---|---|---|---|---|---|---|
| 1 | 82.2 | 2.74 | 2-bearing outbound | 1.00E+08 | 0.35 | 4181 |
| 2 | 60.6 | 2.75 | inbound OTM | 1.27E+08 | 0.35 | 10263 |
| 3 | 82.2 | 2.74 | outbound OTM | 1.27E+08 | 0.35 | 6915 |

Embodiment 1 was evaluated using a high strength steel alloy and an outbound bearing layout. Embodiments 2 and 3 were evaluated with a composite material instead of steel alloy. Embodiment 2 uses overturning moment (OTM) bearings with an inbound bearing layout that is different from the layout used by Embodiment 1. Embodiment 3 uses OTM bearings with an outbound bearing layout that is similar to that used by Embodiment 1. These bearing types and layouts are described in further detail below with reference to FIG. 7A, FIG. 20B, and TABLE 3. The values shown in TABLE 1 illustrate that Embodiments 2 and 3 achieve a higher strength-to-weight ratio (E/rho) when using a composite material, instead of the steel alloy used in Embodiment 1. As a result of these differences, the shaft mode critical speed occurs at 4181 RPM for Embodiment 1, at 10263 RPM for Embodiment 2 and at 6915 for Embodiment 3.

The inventors also modified the shaft thickness along its length, to evaluate the effect on critical speed for a strength to weight ratio of E/rho that is not constant along the length L, and for different suitable materials. An example of a shaft with a uniform E/rho along its length L is shown in FIG. 6A, and examples of shafts having variable E/rho are shown in FIG. 6B and FIG. 6C.

FIG. 6A conceptually shows a cross-sectional view of a uniform shaft 605 with a constant diameter and thickness. In this example, the uniform shaft 605 has a length L of seventy-six inches. The outer diameter D of the uniform shaft 605 is 3.0 inches. The uniform shaft 605 is hollow, with a constant wall thickness of 0.2 inch and corresponding constant inner radius of 1.3 inches along its length. For this example of a uniform shaft 605, and a two-bearing outbound configuration such as in FIG. 4, the fundamental frequency of the unstable mode is eighty Hz.

FIG. 6B conceptually shows a cross-sectional view of a concave shaft 610 with a constant outer diameter D and a variable thickness. For comparison, the uniform shaft 605 and the concave shaft 610 have the same material (e.g., hollow steel), bearings (outbound), and length (seventy-six inches), with a constant outer radius of 1.5 inches along its length. The outer diameter D of the concave shaft 610 is, therefore, 3.0 inches. Unlike the uniform shaft 605, however, the concave shaft 610 has a wall thickness of 0.3 inch at the ends 612, 614 (e.g., at the bearings, which are not shown in FIGS. 6A to 6C), and a thinner wall thickness of 0.15 inches in the midshaft region 615. This results in an inner radius of 1.35 inches in the midshaft region 615 and a smaller inner radius of 1.2 inches at the ends 612, 614. The concave shaft 610 therefore has a reduced mass density in the midshaft region 615. To achieve the resulting concave profile, various methods may be used to manufacture the concave shaft 610, such as a bottle boring technique.

FIG. 6C conceptually shows a cross-sectional of a convex shaft 620 with a variable outer diameter D and a variable thickness. For comparison, the uniform shaft 605 and the convex shaft 620 have the same material (e.g., hollow steel), bearings (outbound), and length (seventy-six inches), with a constant inner radius of 1.2 inches along its length. Unlike the uniform shaft 605, the convex shaft 620 has a wall thickness of 0.3 inch at the ends 622, 624, and a thinner wall thickness of 0.15 inches in the midshaft region 625, just like the concave shaft 610. Unlike the concave shaft 610, the convex shaft 620 has an outer radius of 1.5 inches at the ends 622, 624, and a smaller outer radius of 1.35 inches in the midshaft region 625. The convex shaft 620 also has a reduced mass density in the midshaft region 625.

Since the radius (and, therefore, the diameter) are variable over the length of the convex shaft 620, the diameter D is defined in some embodiments as the diameter at the midshaft region 625, since this has the most relevance to the bending mode and undergoes maximum deflection. In the example of the convex shaft 620, the shaft outer diameter D is 2.7 inches in the midshaft region 625. In other embodiments, for example, embodiments when the radius has multiple minima and/or maxima, the diameter D may be defined at any of those minima or maxima. To achieve the resulting convex profile, various methods may be used to manufacture the convex shaft 620, such as external machining.

For both convex and concave thickness profiles, as well as types of variable thickness profiles, the thickness may be described using an effective thickness value, Teff. For a uniform shaft the thickness would simply be the difference between the outer diameter and the inner diameter. When these values are variable over the length of the shaft, the effective thickness can be calculated as the difference between the effective outer diameter and effective inner diameter. For example, the effective thickness may be defined at the midshaft in some embodiments.

With variable thickness, in some embodiments the concave shaft 610 and the convex shaft 620 can have twenty-five to thirty percent less weight than the uniform shaft 605 in the midshaft region 615 and 625, respectively. Note that the variation in thickness need not be continuous, for example a stepped change in geometry could also be used. As a result, the fundamental frequency of the unstable mode for both the concave shaft 610 and the convex shaft 620 is increased to ninety Hz, which is higher than the eighty Hz fundamental frequency for the uniform shaft 605. In other words, the concave shaft 610 and the convex shaft 620 can both attain a higher rotational speed than that of uniform shaft 605, before reaching subcritical speeds.

The concave shaft 610 and the convex shaft 620 are examples of different thickness profiles that may be used in some embodiments. Other thickness profiles are also contemplated, which reduce or increase the mass density of the shaft in the midshaft region. The concepts of the current disclosure are not limited by the particular thickness profile used.

Depending on the thickness profile, the ratio of stiffness to weight can be modified to produce significant changes in the critical speed. embodiments are listed in TABLE 2. These embodiments were considered as possible designs that could modify the effective thickness in such a way to be compatible with engine architecture and without requiring modifications or limitations on the targeted operating range for a subcritical shaft.

TABLE 2

| Embodiment | L (in) | D (in) | Bearing type | E/rho (in$^{-1}$) | Teff (in) | Mode (RPM) |
|---|---|---|---|---|---|---|
| 4 | 60.6 | 2.75 | inbound OTM | 1.00E+08 | 0.35 | 9001 |
| 5 | 82.2 | 2.74 | outbound OTM | 1.00E+08 | 0.35 | 6065 |
| 6 | 60.6 | 2.75 | inbound OTM | 1.00E+08 | 0.32 | 10039 |
| 7 | 82.2 | 2.74 | outbound OTM | 1.00E+08 | 0.32 | 6942 |

Embodiments 4, 5, 6, and 7 all use a steel alloy material composition. Embodiments 4 and 6 use an inbound bearing layout with OTM bearings, and Embodiments 5 and 7 use an outbound bearing layout with OTM bearings. Embodiments 4 and 5 are uniform shafts similar to the Example of FIG. 6A. Embodiments 6 and 7, however, have a convex thickness profile similar to the example of FIG. 6C, having been manufactured with a bottle boring manufacturing technique. The values shown in TABLE 2 illustrate that Embodiments 6 and 7 achieve a lower effective thickness Teff due to their convex profile, instead of the uniform profile for Embodiments 4 and 5. As a result of these differences, the shaft mode critical speed occurs at 9001 RPM for Embodiment 4, and at 10039 RPM for Embodiment 6. The shaft mode critical speed occurs at 6065 RPM for Embodiment 5, and at 6942 RPM for Embodiment 7.

The inventors also conceived of a variety of shafts with modified bearing configurations. Bearings are used to provide transverse support to the shaft along its length. Bearings may be ball-type bearings, which have a very small contact area with the shaft to provide less friction, or roller-type bearings, which have a large contact area with the shaft to provide increased rigidity and load bearing. Different types of bearings may be mixed in various bearing layouts. According to additional embodiments, different bearing layouts were considered, for different combinations of uniform, convex, and concave shafts, or varying shaft thickness profiles and material composition in order to determine which combination would work best for a given architecture and need, as well as taking into account competing engineering requirements.

A variety of combinations of bearing configurations were contemplated, such as embodiments when the number of bearings in duplex and/or straddling position relative to engine components (e.g., a booster 721 or a low-pressure turbine 720) were changed. Either or both of the engine components mounted to the shaft 722 may be straddled or overhung. It was found that these variations can improve the critical speed and/or be more suitable to accommodate space limitations, lubrication resources or other architecture-imposed limitations. The embodiments included locating bearings at different inbound or outbound positions relative to the mounting points 705a, 705b.

Specific bearing layouts were preferentially used in various embodiments. These are now described in more detail, though the concepts of the present disclosure are not limited by the particular number or arrangement of bearings described herein.

For example, FIG. 7A conceptually shows a low-pressure turbine 720 and a booster 721 mounted on a shaft 722 (e.g., a low-speed shaft) supported by a four-bearing straddle configuration. Additional bearings located around the circumference of the shaft 722 are omitted from FIG. 7A for clarity. In this system, one pair of bearings 723a, 724a straddle (i.e., placed forward and aft of) a mounting point 705a of the booster 721, and a second pair of bearings 723b, 724b straddle a mounting point 705b of the low-pressure turbine 720. In this example, bearings 724a, 723b, and 724b are roller bearings, and bearing 723a is a ball bearing, though these bearing types may vary in other embodiments. The length L for shaft 722 is represented in some embodiments as the distance between the midpoints or centers of the innermost bearings 724a, 723b. The four-bearing straddle layout is used in several embodiments described with reference to TABLE 3.

As another example, FIG. 7B conceptually shows a low-pressure turbine 720 and a booster 721 mounted on a shaft 722 supported by a four-bearing outbound configuration. Additional bearings located around the circumference of the shaft 722 are omitted from FIG. 7B for clarity. This system is similar to that of the straddle system shown in FIG. 7A, but differs in that bearings 723a, 724a are both placed forward of mounting point 705a of the booster 721, and bearings 723b, 724b are placed aft of mounting point 705b of the low-pressure turbine 720. The shaft 722 may extend beyond bearings 723b, 724b. As in the example of FIG. 7A, bearings 724a, 723b, and 724b are roller bearings, and bearing 723a is a ball bearing, though these bearing types may vary. The length L for shaft 722 is represented in some embodiments as the distance between the midpoints or centers of the innermost bearings 724a, 723b.

Figure 7C:
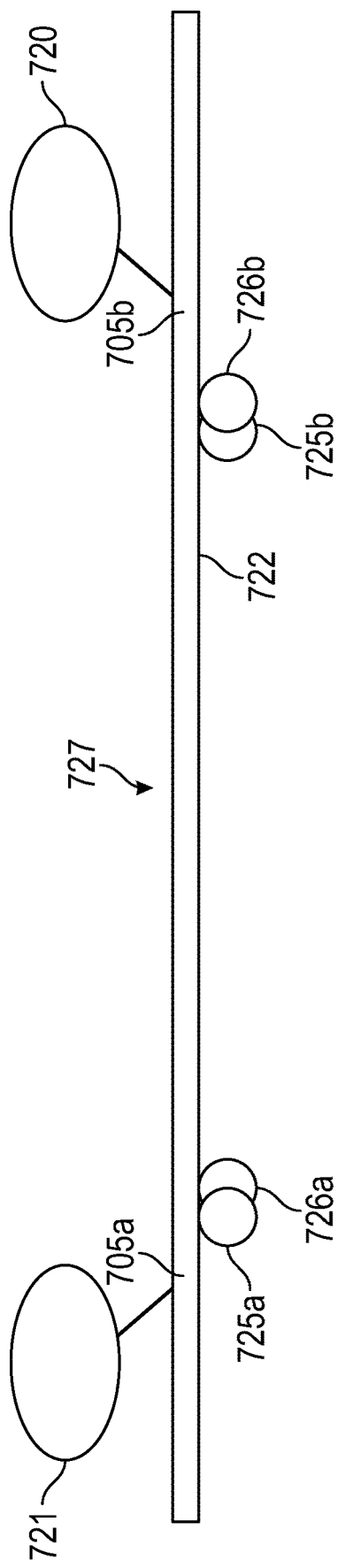
FIG. 7C shows a schematic view of a shaft using an inbound duplex configuration.

As yet another example, FIG. 7C conceptually shows a shaft 722 with an inbound duplex bearing configuration. Additional bearings located around the circumference of the shaft 722 are omitted from FIG. 7C for clarity. According to some embodiments, a first pair of ball bearings 725a, 726a is arranged in a duplex configuration aft of the mounting point 705a for the booster 721. A second pair of ball bearings 725b, 726b is arranged in a duplex configuration forward of the mounting point 705b for the low-pressure turbine 720. Duplex bearing arrangements may also be referred to as double-row bearings, or overturning moment (OTM) bearings, since they provide moment stiffness to the shaft, i.e., provide resistance to rotation across the bearing locations. In some embodiments duplex bearing types may include tandem bearings, back-to-back bearings, face-to-face bearings, and/or tapered roller bearings.

In the example shown in FIG. 7C, both the first pair of ball bearings 725a, 726a and the second pair of ball bearings 725b, 726b are in an inbound position, i.e., located closer towards the midshaft 727 than the respective mounting points 705a, 705b. In this position, the booster 721 and the low-pressure turbine 720 are referred to as overhung. This inbound OTM layout is used in Embodiments 2, 4, and 6, for example, described above with reference to TABLES 1 and 2.

Figure 7D:
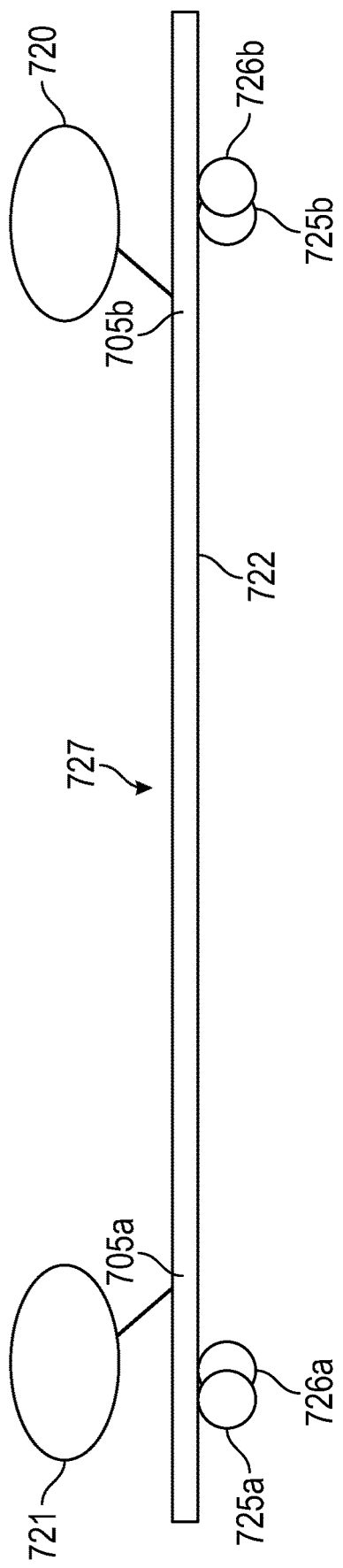
FIG. 7D shows a schematic view of a shaft using an outbound duplex configuration.

Alternatively, the first pair of ball bearings 725a, 726a and/or the second pair of ball bearings 725b, 726b may be in an outbound position, as shown in FIG. 7D, i.e., located farther from the midshaft 727 than the respective mounting points 705a, 705b of the booster 721 and the low-pressure turbine 720. The length L for the duplex bearing configurations shown in FIG. 7C and FIG. 7D may be represented in some embodiments as the distance between the midpoints or centers of the innermost ball bearings 726a and 725b, or alternatively, as the distance between the center of the first pair of ball bearings 725a, 726a and the center of the second pair of ball bearings 725b, 726b. The outbound OTM layout is used in Embodiments 3, 5, and 7, for example, described above with reference to TABLES 1 and 2.

Figure 7E:
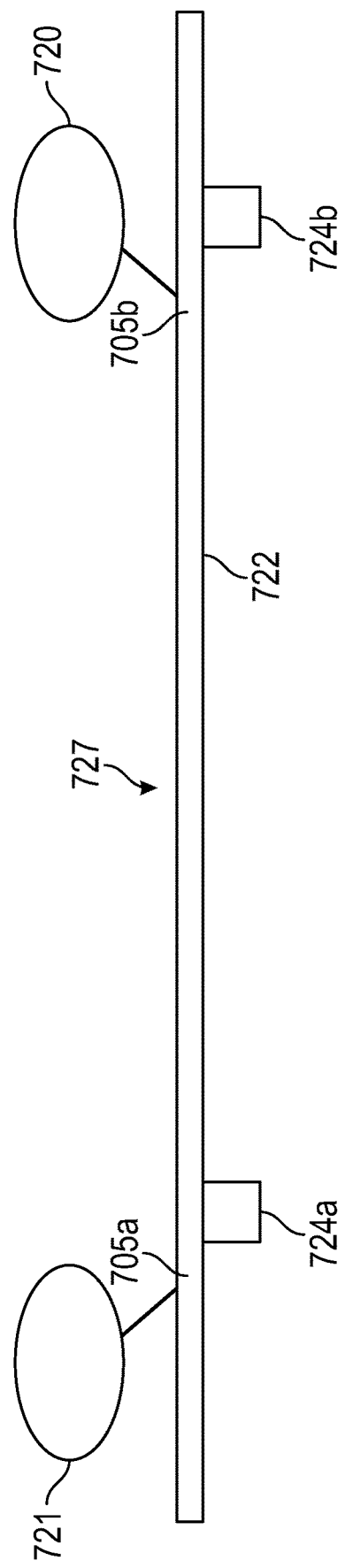
FIG. 7E shows a schematic view of a shaft using a two-bearing configuration.

As a further example, FIG. 7E conceptually shows a shaft 722 with a two-bearing configuration. This configuration employs a first bearing 724a positioned aft of the mounting point 705a for the booster 721, and a second bearing 724b positioned aft of the mounting point 705b for the low-pressure turbine 720. The length L for this two-bearing configuration is represented in some embodiments as the distance between the midpoints or centers of the bearings 724a, 724b. Alternative two-bearing configurations may position the two bearings in either an outbound configuration or an inbound configuration. An example of a two-bearing layout in an inbound configuration is shown in FIG. 1, that shows bearings 123a, 123b, 123c, and 123d are all located inbound of the mounting points for the booster 121 and the low-pressure turbine 120. Note that in this context, two is the number of bearings along the shaft 722, and does not include additional bearings along the circumference of the shaft 722. Embodiment 1, described above with reference to TABLE 1, uses a two-bearing layout in an outbound configuration (not shown).

In FIGS. 7A to 7E, the lines connecting the booster 721 to mounting point 705a and low-pressure turbine 720 to mounting point 705b are intended only to indicate schematically the general location of a net force of the core engine components (e.g., booster 721 or low-pressure turbine 720) acting on the shaft 722 relative to the bearings, and is illustrated in this fashion only for purposes of illustrating a relationship between the nearest engine component relative to the bearing(s). It will be understood that the actual loading on a shaft is distributed and comes from not only the engine components represented by booster 721 and low-pressure turbine 720, but other nearby structures as well. In these embodiments, the primary loading for purposes of this disclosure may, however, be thought of simply in terms of engine components attached to the shaft 722 (e.g., low-pressure turbine 720 and booster 721). It will be understood that the representation shown in FIGS. 7A to 7E is sufficient in defining the parts of the turbomachine that mostly influence the shaft 722 behavior.

As discussed, at least one bearing may have an overturning moment (OTM) capability, which can resist relative rotation across the bearing in at least a lateral plane or a vertical plane. These relative rotations may occur during bending of the shaft. The position along the shaft of such bearings with OTM capabilities may directly affect the critical speed, by providing constraints to the relative rotations of the shaft, in addition to the transverse support function of the bearings.

Examples of embodiments with different bearing arrangements are summarized in TABLE 3. Generally, the inventors found that the number of bearings, the position of the bearings and the OTM capability of the bearings can be selected to make a full range of operations subcritical for an engine. In other words, the selection of bearing layout can affect (either increase or decrease) the shaft's critical speed.

TABLE 3

| Embodiment | L (in) | D (in) | Bearing type | E/rho (in$^{-1}$) | Teff (in) | Mode (RPM) |
|---|---|---|---|---|---|---|
| 8 | 60.6 | 2.75 | 4-bearing straddle | 1.00E+08 | 0.35 | 7746 |
| 9 | 60.6 | 2.75 | 4-bearing straddle | 1.00E+08 | 0.32 | 8555 |
| 10 | 60.6 | 2.75 | 4-bearing straddle | 1.27E+08 | 0.35 | 8832 |
| 11 | 82.2 | 2.74 | 4-bearing straddle | 1.27E+08 | 0.32 | 9703 |
| 12 | 60.6 | 2.75 | inbound OTM | 1.27E+08 | 0.32 | 11386 |
| 13 | 82.2 | 2.74 | outbound OTM | 1.27E+08 | 0.32 | 7873 |

Embodiments 8, 9, 10, and 11 use a four-bearing straddle layout. Embodiments 8 and 9 use steel alloy, while Embodiments 10 and 11 use composite materials. Embodiments 8 and 10 have a uniform thickness profile, while Embodiments 9 and 11 have a concave thickness profile, manufactured using a bottle boring method. As a result of these differences, the shaft mode critical speed occurs at 7746 RPM for Embodiment 8, 8555 RPM for Embodiment 9, 8832 RPM for Embodiment 10, and 9703 RPM for Embodiment 11.

Embodiments 11, 12, and 13 all use composite material and concave thickness profile via bottle boring. However, Embodiment 11 uses a four-bearing straddle layout, Embodiment 12 uses an inbound OTM bearing layout, and Embodiment 13 uses an outbound OTM bearing layout. As a result of these differences, the shaft mode critical speed occurs at 9703 RPM for Embodiment 11, 11386 RPM for Embodiment 12, and 7873 RPM for Embodiment 13.

Embodiment 11 can also be compared to Embodiments 8, 9, and 10 as described with reference to TABLE 3. This allows a comparison of the impact on critical speed of using composite material, variable thickness profile, and both, on a shaft with a four-bearing straddle layout.

Embodiment 12 can be compared to Embodiments 2, 4, and 6 described with reference to TABLE 2. This allows a comparison of the impact on critical speed of using composite material, variable thickness profile, and both, on a shaft with an inbound OTM layout.

Embodiment 13 can be compared to Embodiments 3, 5, and 7 described with reference to TABLE 2. This allows a comparison of the impact on critical speed of using composite material, variable thickness profile, and both, on a shaft with an outbound OTM layout.

Additionally, Embodiments 2 and 3 (in TABLE 1), and 10 (in TABLE 3) can be compared, to evaluate the impact on critical speed of using different bearing layouts on shafts using composite material. Embodiments 6 and 7 (in TABLE 2) and 9 (in TABLE 3) can be compared, to evaluate the impact on critical speed of using different bearing layouts on shafts using concave thickness profiles.

The embodiments of turbomachine engines, and in particular the shafts associated with a power turbine described with reference to FIGS. 5A, 5B, 6A to 6C, 7A, and 7B, were found to provide an improvement in the performance of a shaft vis-à-vis its operating range. In addition to the mentioned embodiments and those provided in TABLES 1 to 3, the types of improvements to the critical speed of the shaft when these features were combined, taking into consideration the various benefits, as well as down-sides, to selecting a particular configuration for a turbomachine architecture.

Examples of a subcritical shaft with a high redline speed include a shaft with a redline speed of, e.g., 70 ft/sec and adapted for a shaft mode of 5293 RPM, a shaft with a redline speed of, e.g., 75 ft/sec and adapted for a shaft mode of 6380 RPM, and a shaft with a redline speed of, e.g., 181 ft/sec and adapted for a shaft mode of 11410 RPM.

As mentioned earlier, the inventors sought to improve upon the operating speed of a low-speed shaft. With regard to the speed of the low-speed shaft, consideration was given not simply to those factors affecting the core size, but also the stiffness-to-weight ratio and the critical speed of the low-speed shaft. In contrast to existing gas turbine engines requiring lower speeds, embodiments considered presented challenges in determining how the low-speed shaft speed could be increased without resulting in an unstable bending mode during regular operation.

Further, a selection of power turbine shaft and bearing arrangement, and location of those bearings for a turbomachine takes into consideration other factors, some of which can limit the selection of a shaft. The inventors however realized during the course of making the several embodiments referred to in the foregoing that there is a particular range of designs, constraints on feasible designs that provided an unexpected benefit. The interplay between components can make it particularly difficult to select or develop one component during engine design and prototype testing, especially when some components are at different stages of completion. For example, one or more components may be nearly complete, yet one or more other components may be in an initial or preliminary phase where only one (or a few) design parameters are known. It is desired to arrive at what is possible at an early stage of design, so that the down selection of candidate optimal designs, given the tradeoffs, become more possible. Heretofore the process has sometimes been more ad hoc, selecting one design or another without knowing the impact when a concept is first taken into consideration.

Even taken separately from the integration of a shaft design with the rest of an engine, modifying an existing shaft to increase its critical speed is challenging, and the impact of the different types of improvements and configurations on critical speed is not easily predictable without empirical experimentation and simulation, which can be enormously expensive and time-consuming. In some cases, a modification may even result in lowering the critical speed.

It is desirable to narrow the range of configurations or combination of features that can yield favorable results given the constraints of the design, feasibility, manufacturing, certification requirements, etc. early in the design selection process to avoid wasted time and effort. During the course of the evaluation of different embodiments as set forth above, the inventors discovered, unexpectedly, that there exists a relationship between the critical speed of the shaft and the ratio L/D, which uniquely identifies a finite and readily ascertainable (in view of this disclosure) number of embodiments suitable for a particular architecture that can avoid a supercritical or critical shaft situation during normal operation of an engine. This relationship is referred to by the inventors as the midshaft rating (MSR), and is calculated according to the following relationship (1) between length, diameter and a redline speed (ft/sec) measured at the outer diameter of the shaft:

$$\text{Midshaft Rating MSR} = (L_{MSR}/D_{MSR})(\text{Shaft } OD \text{ Speed at redline})^{1/2} \quad (1)$$

$L_{MSR}/D_{MSR}$ is shaft length divided by effective shaft outer diameter, $L_{MSR}/D_{MSR}$. The ratio $L_{MSR}/D_{MSR}$ is multiplied with the square root of the outer diameter (OD) rotation speed (OD Speed) at the redline speed for the engine architecture. Generally, the length $L_{MSR}$ and diameter $D_{MSR}$ are expressed in inches, and the shaft OD redline speed is the linear speed of the shaft surface. The shaft redline speed in feet per second is calculated as the shaft mode speed (in RPM) multiplied by the outer circumference of the shaft (the outer diameter of the shaft multiplied by pi), and with additional corrections to convert from inches to feet and from minutes to seconds. Accordingly, the midshaft rating has units of $(\text{velocity})^{1/2}$.

The midshaft rating identifies embodiments for a turbomachine's power turbine that allow subcritical operation of the engine for a rated redline speed. TABLE 4 lists embodiments of the turbine shaft along with its associated MSR value. The embodiments can inform one of the dimensions or qualities of the shaft that are believed reasonable and practical for a shaft according to its basic features and the intended, rated critical speed. In other words, the midshaft rating, and, optionally, the $L_{MSR}/D_{MSR}$ ratio and/or the OD speed at redline, indicates the operating ranges of interest, taking into account the constraints within which a turbomachine operates, e.g., size, dimensions, cost, mission requirements, airframe type, etc.

In other embodiments, the midshaft rating may also, or alternatively, be used to define the propulsive system operating at a relatively high redline speed. Such things as the requirements of a propulsive system, the requirements of its subsystem(s), airframe integration needs and limitations, and performance capabilities may, therefore, be summarized or defined by the midshaft rating.

In still other embodiments, the midshaft rating may additionally provide a particularly useful indication of the efficiency and effectiveness of the engine during initial development, e.g., as a tool to accept or reject a particular configuration. Thus, the midshaft rating can be used, for example, to guide low-speed shaft development. Therefore, the midshaft rating can also improve the process of developing a turbomachine engine.

Table 4 lists the bearing layout, the strength-to-weight ratio E/rho in inches$^{-1}$, the effective thickness Teff in inches, the critical speed corresponding to the shaft's fundamental mode in RPM, the OD linear speed at redline in ft/sec, the length-to-diameter ratio L/D, also referred to as $L_{MSR}/D_{MSR}$ (dimensionless), and MSR in $(\text{ft/sec})^{1/2}$ for all the embodiments (1 to 13) of Tables 1 to 13, as well as a number of additional embodiments (14 to 32). As noted above, L/D represents the ratio of the length over the outer diameter. When the shaft has a variable diameter over its length, the outer diameter may be the diameter at the midshaft. E/rho represents the material composition of the shaft, and Teff represents an effective wall thickness of the shaft. For shafts with variable thickness over their length, the wall thickness may be the thickness at the midshaft.

TABLE 4

| Embodiment | Bearing Layout | E/rho in$^{-1}$ | Teff in | Mode RPM | L/D | OD Speed ft/sec | MSR (ft/sec)$^{1/2}$ |
|---|---|---|---|---|---|---|---|
| 1 | 2-bearing outbound | 1.00E+8 | 0.35 | 4181 | 30 | 50 | 214 |
| 2 | inbound OTM | 1.27E+8 | 0.35 | 10263 | 22 | 123 | 247 |
| 3 | outbound OTM | 1.27E+8 | 0.35 | 691 | 30 | 83 | 275 |
| 4 | inbound OTM | 1.00E+8 | 0.35 | 9001 | 22 | 108 | 231 |
| 5 | outbound OTM | 1.00E+8 | 0.35 | 6065 | 30 | 73 | 257 |
| 6 | inbound OTM | 1.00E+8 | 0.32 | 10039 | 22 | 121 | 242 |
| 7 | outbound OTM | 1.00E+8 | 0.32 | 6942 | 30 | 83 | 272 |
| 8 | 4-bearing straddle | 1.00E+8 | 0.35 | 7746 | 22 | 93 | 214 |
| 9 | 4-bearing straddle | 1.00E+8 | 0.32 | 8555 | 22 | 103 | 223 |
| 10 | 4-bearing straddle | 1.27E+8 | 0.35 | 8832 | 22 | 106 | 229 |
| 11 | 4-bearing straddle | 1.27E+8 | 0.32 | 9703 | 30 | 116 | 322 |

TABLE 4-continued

| Embodiment | Bearing Layout | E/rho in$^{-1}$ | Teff in | Mode RPM | L/D | OD Speed ft/sec | MSR (ft/sec)$^{1/2}$ |
|---|---|---|---|---|---|---|---|
| 12 | inbound OTM | 1.27E+8 | 0.32 | 11386 | 22 | 137 | 257 |
| 13 | outbound OTM | 1.27E+8 | 0.32 | 7873 | 30 | 94 | 290 |
| 14 | 4-bearing outbound | 1.00E+8 | 0.35 | 6262 | 26 | 72 | 219 |
| 15 | 2-bearing aft | 1.27E+8 | 0.29 | 8255 | 21 | 109 | 215 |
| 16 | 2-bearing aft | 1.27E+8 | 0.31 | 13323 | 14 | 233 | 216 |
| 17 | 2-bearing aft | 1.27E+8 | 0.47 | 5667 | 23 | 83 | 210 |
| 18 | 2-bearing aft | 1.27E+8 | 0.29 | 6380 | 24 | 83 | 215 |
| 19 | 2-bearing aft | 1.27E+8 | 0.31 | 9821 | 17 | 154 | 216 |
| 20 | 2-bearing aft | 1.27E+8 | 0.47 | 4586 | 26 | 67 | 211 |
| 21 | 2-bearing aft | 1.00E+8 | 0.23 | 6380 | 24 | 84 | 217 |
| 22 | 2-bearing aft | 1.00E+8 | 0.25 | 13493 | 14 | 235 | 218 |
| 23 | 2-bearing aft | 1.00E+8 | 0.38 | 4586 | 27 | 62 | 210 |
| 24 | 2-bearing aft | 1.27E+8 | 0.29 | 6619 | 25 | 87 | 231 |
| 25 | 2-bearing aft | 1.27E+8 | 0.31 | 11065 | 17 | 176 | 232 |
| 26 | 2-bearing aft | 1.27E+8 | 0.47 | 4852 | 28 | 64 | 224 |
| 27 | 4-bearing straddle | 1.00E+8 | 0.29 | 6380 | 28 | 75 | 245 |
| 28 | inbound OTM | 1.00E+8 | 0.31 | 10666 | 19 | 165 | 247 |
| 29 | outbound OTM | 1.00E+8 | 0.47 | 4586 | 31 | 59 | 239 |
| 30 | 4-bearing straddle | 1.27E+8 | 0.23 | 6380 | 35 | 70 | 289 |
| 31 | inbound OTM | 1.27E+8 | 0.25 | 11410 | 22 | 181 | 294 |
| 32 | outbound OTM | 1.27E+8 | 0.38 | 5293 | 33 | 70 | 276 |

Embodiments 15 to 26 use a two-bearing aft layout. These embodiments differ in using composite materials, different shaft geometries, and variable thickness profiles.

Embodiments 15 to 17 use a composite material instead of steel alloy. These embodiments differ in shaft geometry, with different L/D ratios ranging from 14 to 23.

Embodiments 18 to 20 use a material composite instead of a steel alloy. These embodiments also differ from each other in shaft geometry (e.g., L/D ratio). These also differ from Embodiments 15 to 17, in being longer and thinner, resulting in a higher range of L/D ratio, from 17 to 26.

Embodiments 21 to 23 use a steel alloy, vary the shaft geometry (length and/or diameter), and have a concave thickness profile. These differ from each other in terms of their effective thickness. These embodiments may be compared to Embodiments 24 to 26, which use composite materials, vary the shaft geometry (length and/or diameter), and have a concave thickness profile.

Embodiments 27 to 32 use different bearing layouts. Embodiments 27 to 29 use steel alloy and have varying geometry. Embodiments 30 to 32 use material composites and a concave thickness profile, in addition to varying geometry.

Based on the experimentation described above, the inventors identified embodiments with MSR between two hundred and three hundred (ft/sec)$^{-1}$ and OD redline speeds ranging from fifty to two hundred fifty ft/sec and with L/D ratio ranging from twelve to thirty-seven were possible and indicated noticeable improvements in subcritical range when the power turbine shaft incorporates the various aspects of the disclosure.

Table 5 summarizes examples of different operating ranges for embodiments, such as the embodiments listed in Table 4. For example, an embodiment can be configured with a L/D ranging between twelve and twenty may have an OD speed between one hundred and fifty and two hundred and fifty ft/sec, and a corresponding range of MSR between one hundred ninety and two hundred forty-five (ft/sec)$^{1/2}$. As another example, an embodiment can be configured with a L/D ranging between sixteen and thirty may have an OD speed between seventy-five and one hundred seventy-five ft/sec, and a corresponding range of MSR between two hundred twelve and two hundred sixty (ft/sec)$^{1/2}$. As still another example, an embodiment can be configured with a L/D ranging between twenty-six and thirty-seven may have an OD speed between sixty and ninety ft/sec, and a corresponding range of MSR between two hundred forty-seven and two hundred eighty-seven (ft/sec)$^{1/2}$. These low, nominal, and high ranges as summarized in Table 5 are general examples, and individual embodiments may exceed these values.

TABLE 5

| Example Limits and Ranges | L/D (in/in) | OD Speed (ft/sec) | MSR (ft/sec)$^{1/2}$ |
|---|---|---|---|
| Low limit | 12 | 250 | 190 |
|  | 20 | 150 | 245 |
| Nominal limit | 16 | 175 | 212 |
|  | 30 | 75 | 260 |
| High Limit | 26 | 90 | 247 |
|  | 37 | 60 | 287 |

In view of the foregoing objectives, in at least certain embodiments, a propulsion system is configured to define an MSR greater than one hundred ninety (ft/sec)$^{1/2}$, such as greater than two hundred (ft/sec)$^{1/2}$, such as at least two hundred thirty-five (ft/sec)$^{1/2}$, up to at least three hundred (ft/sec)$^{1/2}$.

In view of the foregoing objectives, in at least certain embodiments, a propulsion system is configured to define an L/D ratio greater than twelve, such as greater than sixteen, such as at least twenty-six, up to at least thirty-seven.

In view of the foregoing objectives, in at least certain embodiments, a propulsion system is configured to define an OD redline speed greater than sixty ft/sec, such as greater than seventy five ft/sec, such as at least one hundred and fifty ft/sec, up to at least two hundred and fifty ft/sec.

Based on the teachings in this disclosure, and without limiting the disclosure to only those embodiments explicitly shown, it will be understood how both the manner and the degree to which a modification of shaft length, diameter, material composition, bearings configuration, and thickness profile affects the MSR, and, additionally, the competing requirements, or requirements for a turbomachine architecture (e.g., available spacing/packaging, clearance, sump location, lubrication, etc.) for a given MSR.

The gearbox assembly (e.g., any of the gearbox assemblies detailed herein) also affects the MSR. For example, vibrations of the gearbox assembly can excite the low-speed shaft (e.g., at the first-order bending mode) such that the vibrations of the gearbox assembly cause the low-speed shaft to vibrate even when the low-speed shaft is operating subcritical. Similarly, vibrations of the low-speed shaft can excite the gearbox assembly such that the vibrations of the low-speed shaft cause the gearbox assembly to vibrate, thereby potentially straining the mountings of the gearbox assembly beyond a designed limit. In this way, changes in the gearbox assembly affect a vibratory response of the gearbox assembly through the couplings of the gearbox assembly and the engine static structure and/or through the couplings of the gearbox assembly and the low-speed shaft, or vice-versa. The present disclosure details how both the manner and the degree to which a modification of the gearbox assembly affects the MSR, given the competing requirements for a turbomachine architecture (e.g., available spacing/packaging, clearance, sump location, lubrication, etc.) for a given MSR.

Figure 8B:
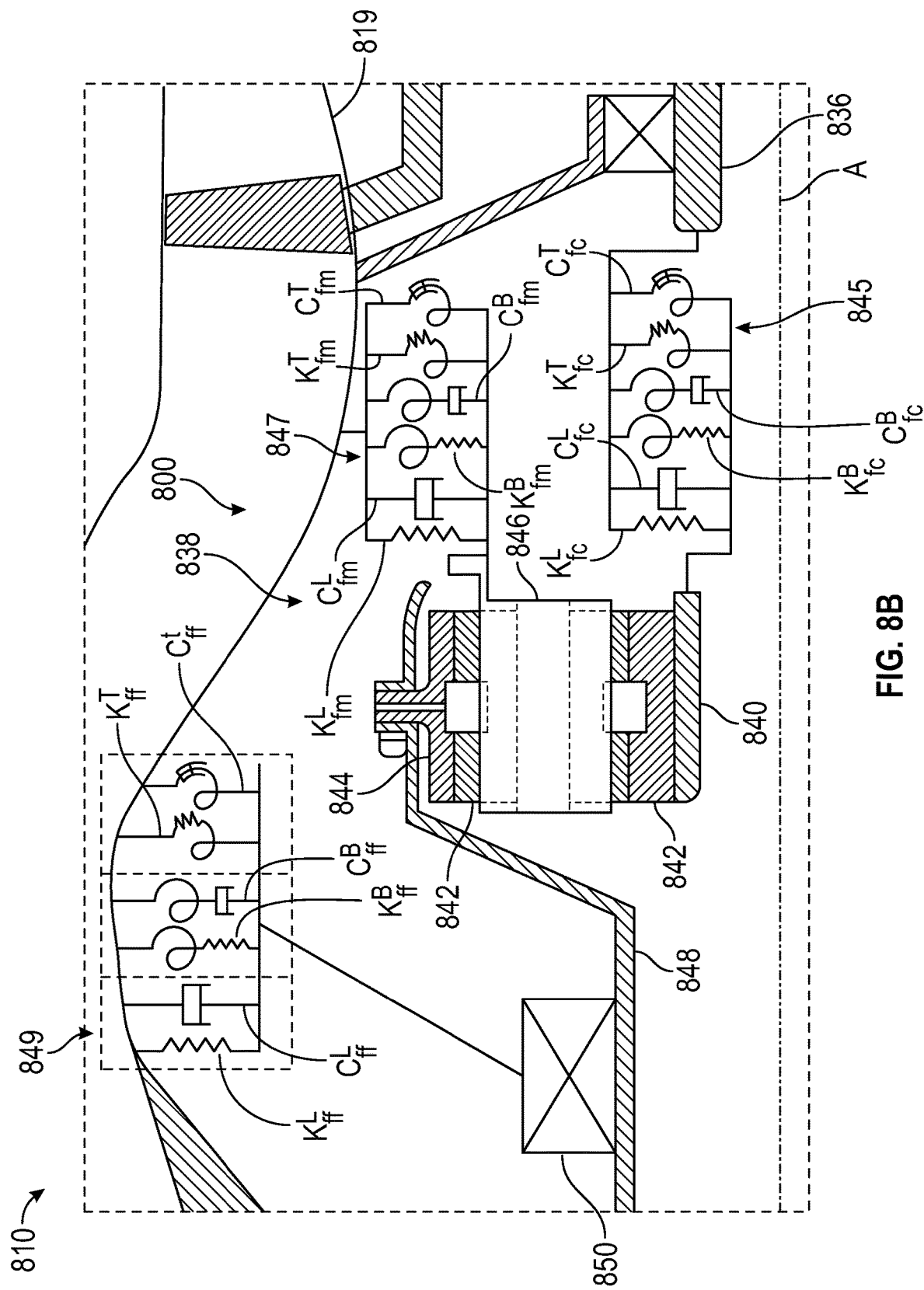
FIG. 8B shows a schematic, cross-sectional view of the gearbox assembly of FIG. 8A, translated into a representative vibratory system.

FIGS. 8A and 8B illustrate enlarged, schematic cross-sectional views of a gearbox assembly 838 with a mounting assembly 800 for a gas turbine engine 810, taken at a centerline axis 812 of the gas turbine engine 810. A low-speed shaft 836 is shown schematically in FIG. 8A and extends beyond the cut view of FIG. 8A to illustrate the length $L_{MSR}$ of the low-speed shaft 836. The length of the low-speed shaft 836 is detailed above. The gearbox assembly 838 can be utilized as any of the gearbox assemblies and the gas turbine engine 810 can be any of the gas turbine engines detailed herein. The mounting assembly 800 shown is that for a star configuration gearbox, described in more detail to follow. The gearbox assembly 838 includes a sun gear 840, a plurality of planet gears 842, and a ring gear 844. A low-pressure turbine (e.g., any of the low-pressure turbines detailed herein) drives the low-speed shaft 836, which is coupled to the sun gear 840 of the gearbox assembly 838. The sun gear 840 of the gearbox assembly 838 is coupled via a flex coupling 845 to the rotating low-speed shaft 836.

Radially outwardly of the sun gear 840, and intermeshing therewith, is the plurality of planet gears 842 that are coupled together by a planet carrier 846. The planet carrier 846 of the gearbox assembly 838 is coupled, via a flex mount 847, to an engine static structure 819. The planet carrier 846 constrains the plurality of planet gears 842 while allowing each planet gear of the plurality of planet gears 842 to rotate about its own axis. Radially outwardly of the plurality of planet gears 842, and intermeshing therewith, is the ring gear 844, which is an annular ring gear 844. The ring gear 844 is coupled via a fan shaft 848 to a fan (e.g., any of the fans or fan assemblies detailed herein) in order to drive rotation of the fan about the centerline axis 812 of the gas turbine engine 810. The fan shaft 848 is coupled to a fan frame 849 via a fan bearing 850. The fan frame 849 couples the rotating ring gear 844 of the gearbox assembly 838 and, thus, the rotating fan shaft 848, to the engine static structure 819. The flex coupling 845, the flex mount 847, and the fan frame 849 define the mounting assembly 800 for the gearbox assembly 838. As described herein, the flex coupling 845, the flex mount 847, and the fan frame 849 may be referred to as mounting members.

Although not depicted in FIGS. 8A and 8B for clarity, each of the sun gear 840, the plurality of planet gears 842, and the ring gear 844 includes teeth about their periphery to intermesh with the other gears. In the example of FIGS. 8A and 8B, the gearbox assembly 838 is a star configuration. That is, the ring gear 844 rotates, while the planet carrier 846 is fixed and stationary. The planet carrier 846 constrains the plurality of planet gears 842 such that the plurality of planet gears 842 do not together rotate around the sun gear 840, while also enabling each planet gear of the plurality of planet gears 842 to rotate about its own axis. That is, since the plurality of planet gears 842 mesh with both the rotating ring gear 844 as well as the rotating sun gear 840, each of the plurality of planet gears 842 rotate about their own axes to drive the ring gear 844 to rotate about the centerline axis 812 due to the rotation of the sun gear 840. The rotation of the ring gear is 844 conveyed to the fan through the fan shaft 848.

FIG. 8B illustrates the mounting assembly 800 of FIG. 8A translated into a representative vibratory system where each of the flex coupling 845, the flex mount 847, and the fan frame 849 are shown by representative structural properties of the members, the representative structural properties being the structural stiffness (K) and the damping (C) of the respective members of the mounting assembly 800. As shown, each of the flex coupling 845, the flex mount 847, and the fan frame 849 includes the representative structural properties (structural stiffness and damping) in each of the lateral direction, the bending direction, and the torsional direction.

For example, FIG. 8B represents the gearbox supporting structure in terms of structural properties characterizing the nature of the coupling between the gearbox assembly 838 and the flex coupling 845. The flex coupling 845 may be represented in terms of a flex coupling lateral stiffness $K_{fc}^L$, a flex coupling bending stiffness $K_{fc}^B$, a flex coupling torsional stiffness $K_{fc}^T$, a flex coupling lateral damping $C_{fc}^L$, a flex coupling bending damping $C_{fc}^B$, and a flex coupling torsional damping $C_{fc}^T$. In this way, the flex coupling 845 acts as a dashpot damper that mechanically dampens vibrations through the flex coupling 845 from the gearbox assembly 838 and/or from the low-speed shaft 836 (e.g., the midshaft).

FIG. 8B represents the gearbox supporting structure in terms of structural properties characterizing the nature of the coupling between the gearbox assembly 838 and the flex mount 847. The flex mount 847 may be represented in terms of a flex mount lateral stiffness $K_{fm}^L$, a flex mount bending stiffness $K_{fm}^B$, a flex mount torsional stiffness $K_{fm}^T$, a flex mount lateral damping $C_{fm}^L$, a flex mount bending damping $C_{fm}^B$, and a flex mount torsional damping $C_{fm}^T$. In this way, the flex mount 847 acts as a dashpot damper that mechanically dampens vibrations through the flex mount 847 from the gearbox assembly 838 to the engine static structure 819.

FIG. 8B represents the gearbox supporting structure in terms of structural properties characterizing the nature of the coupling between the gearbox assembly 838 and the fan frame 849. The fan frame 849 may be represented in terms of a fan frame lateral stiffness $K_{ff}^L$, a fan frame bending stiffness $K_{ff}^B$, a fan frame torsional stiffness $K_{ff}^T$, a fan frame lateral damping $C_{ff}^L$, a fan frame bending damping $C_{ff}^B$, and a fan frame torsional damping $C_{ff}^T$. In this way, the fan frame 849 acts as a dashpot damper that mechanically dampens vibrations through the fan frame 849 from the gearbox assembly 838 to the engine static structure 819.

Figure 9A:
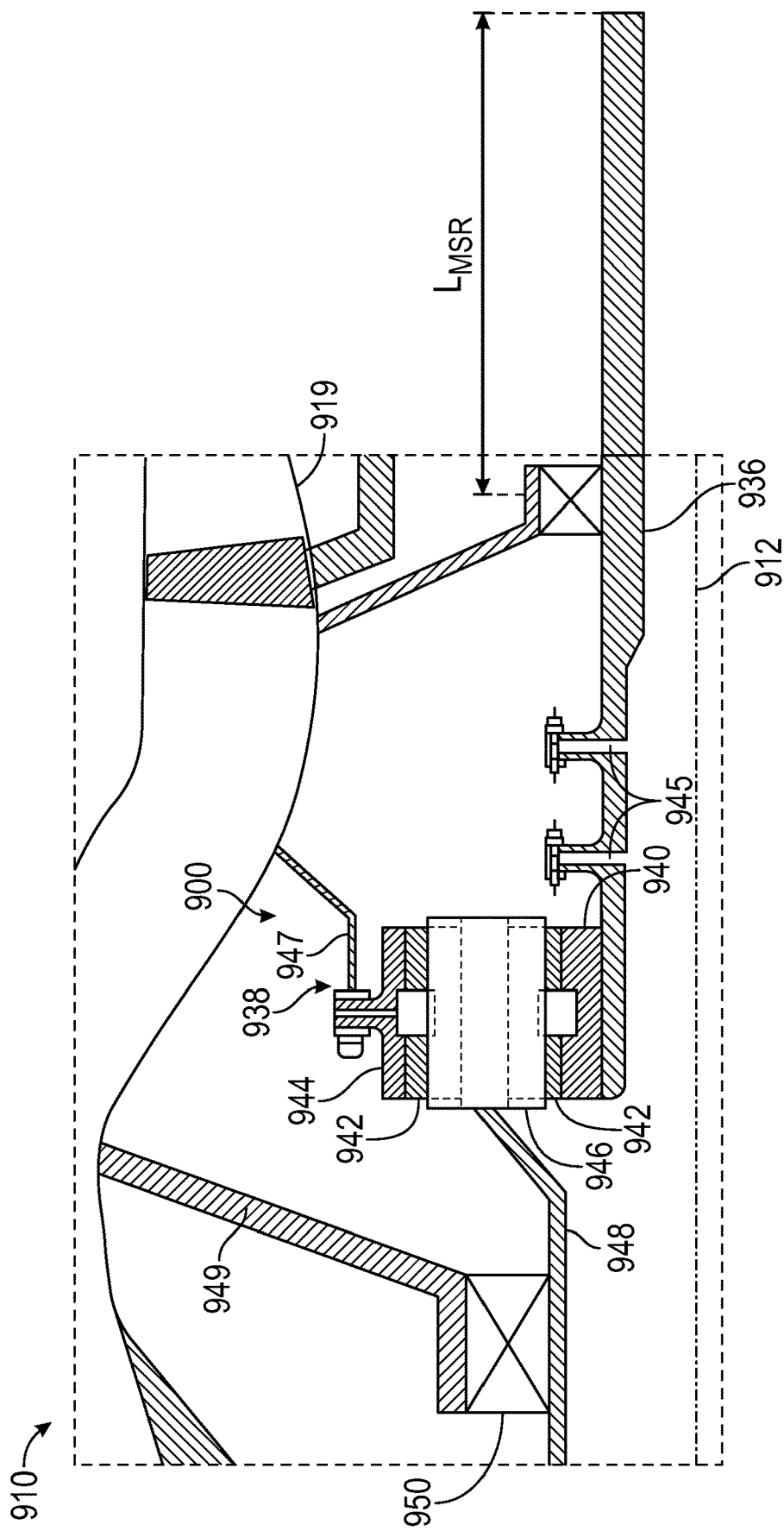
FIG. 9A shows an enlarged, schematic, cross-sectional view of a gearbox assembly of a gas turbine engine, taken along a centerline axis of the gas turbine engine, according to another embodiment.
Figure 9B:
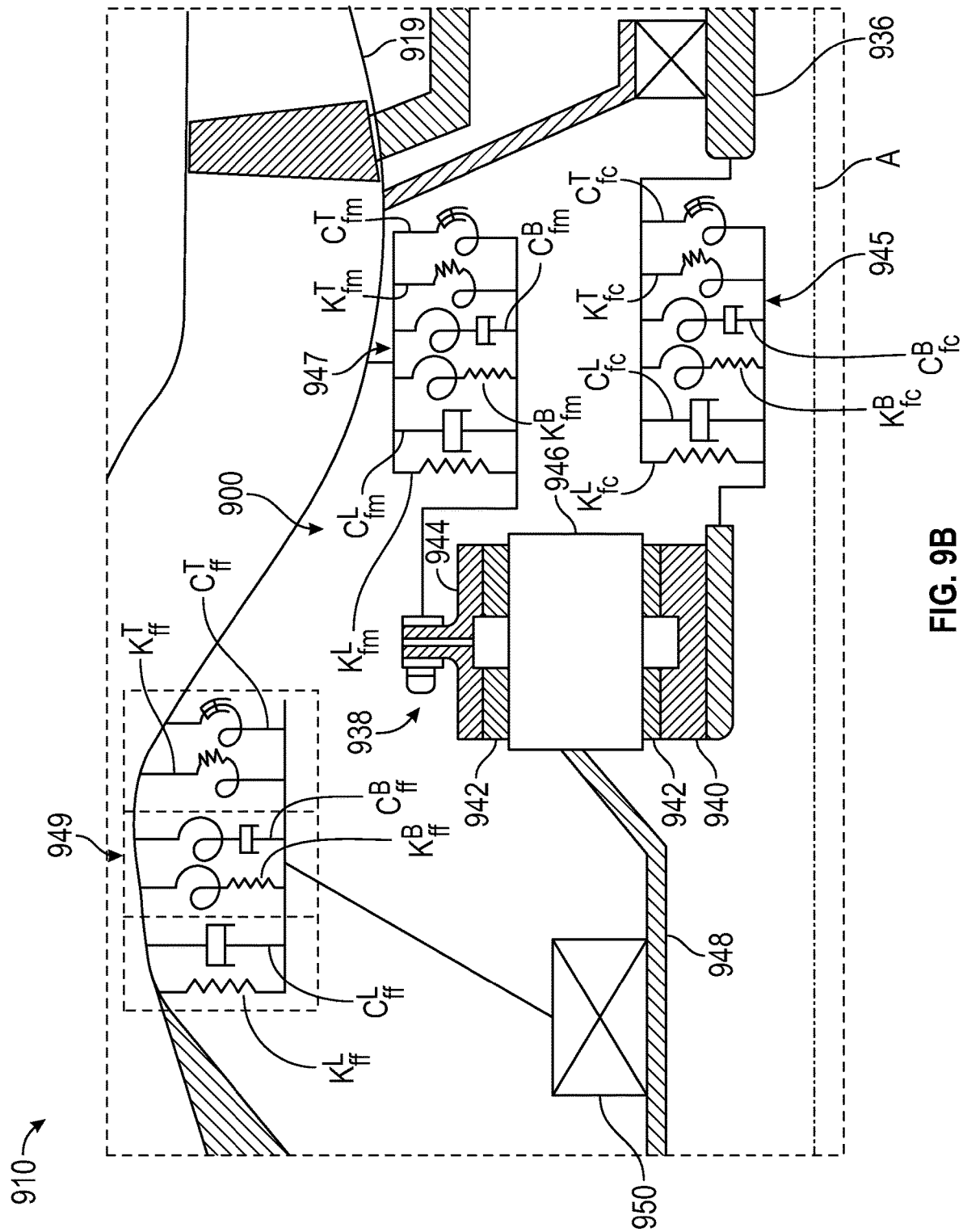
FIG. 9B shows a schematic, cross-sectional view of the gearbox assembly of FIG. 9A, translated into a representative vibratory system.

FIGS. 9A and 9B illustrate enlarged, schematic side cross-sectional views of a gearbox assembly 938 with a mounting assembly 900 for a gas turbine engine 910, taken at a centerline axis 912 of the gas turbine engine 910. A low-speed shaft 936 is shown schematically in FIG. 9A and extends beyond the cut view of FIG. 9A to illustrate the length $L_{MSR}$ of the low-speed shaft 936. The gearbox assembly 938 can be utilized as any of the gearbox assemblies detailed herein and the gas turbine engine 910 can be any of the gas turbine engines detailed herein. The mounting assembly 900 shown is that for a planetary configuration gearbox, described in more detail to follow. Similar to the gearbox assembly 838 of FIGS. 8A and 8B, the gearbox assembly 938 includes a sun gear 940, a plurality of planet gears 942, and a ring gear 944. A low-pressure turbine drives the low-speed shaft 936, which is coupled to the sun gear 940 of the gearbox assembly 938. The sun gear 940 is coupled via a flex coupling 945 to the low-speed shaft 936. The plurality of planet gears 942 are coupled together by a planet carrier 946. In the embodiment of FIGS. 9A and 9B, the planet carrier 946 is coupled, via a fan shaft 948, to a fan (e.g., any of the fans or fan assemblies detailed herein) to drive rotation of the fan about the centerline axis 912. The fan shaft 948 is coupled to a fan frame 949 via a fan bearing 950. The ring gear 944 is coupled via a flex mount 947 to an engine static structure 919. The flex coupling 945, the flex mount 947, and the fan frame 949 define the mounting assembly 900 for the gearbox assembly 938. As described herein, the flex coupling 945, the flex mount 947, and the fan frame 949 may be referred to as mounting members.

In the embodiment of FIGS. 9A and 9B, the gearbox assembly 938 is a planetary configuration. That is, the ring gear 944 is static (being fixedly mounted via the flex mount 947 to the engine static structure 919), while the planet carrier 946 and the plurality of planet gears 942 therein, rotate about the centerline axis 912. The planet carrier 946 constrains the plurality of planet gears 942 such that the plurality of planet gears 942 rotate together around the sun gear 940, while also enabling each planet gear of the plurality of planet gears 942 to rotate about its own axis. The rotation of the planet carrier 946 is conveyed to the fan through the fan shaft 948.

FIG. 9B illustrates the mounting assembly 900 of FIG. 9A translated into a representative vibratory system where each of the flex coupling 945, the flex mount 947, and the fan frame 949 are shown by representative structural properties of the members, the representative structural properties being the structural stiffness (K) and the damping (C) of the respective members of the mounting assembly 900. As shown, each of the flex coupling 945, the flex mount 947, and the fan frame 949 includes the representative structural properties (structural stiffness and damping) in each of the lateral direction, the bending direction, and the torsional direction.

For example, FIG. 9B represents the gearbox supporting structure in terms of structural properties characterizing the nature of the coupling between the gearbox assembly 938 and the flex coupling 945. The flex coupling 945 may be represented in terms of a flex coupling lateral stiffness $K_{fc}^L$, a flex coupling bending stiffness $K_{fc}^B$, a flex coupling torsional stiffness $K_{fc}^T$, a flex coupling lateral damping $C_{fc}^L$, a flex coupling bending damping $C_{fc}^B$, and a flex coupling torsional damping $C_{fc}^T$. In this way, the flex coupling 945 acts as a dashpot damper that mechanically dampens vibrations through the flex coupling 945 from the gearbox assembly 938 and/or from the low-speed shaft 936 (e.g., the midshaft).

FIG. 9B represents the gearbox supporting structure in terms of structural properties characterizing the nature of the coupling between the gearbox assembly 938 and the flex mount 947. The flex mount 947 may be represented in terms of a flex mount lateral stiffness $K_{fm}^L$, a flex mount bending stiffness $K_{fm}^B$, a flex mount torsional stiffness $K_{fm}^T$, a flex mount lateral damping $C_{fm}^L$, a flex mount bending damping $C_{fm}^B$, and a flex mount torsional damping $C_{fm}^T$. In this way, the flex mount 947 acts as a dashpot damper that mechanically dampens vibrations through the flex mount 947 from the gearbox assembly 938 to the engine static structure 919.

FIG. 9B represents the gearbox supporting structure in terms of structural properties characterizing the nature of the coupling between the gearbox assembly 938 and the fan frame 949. The fan frame 949 may be represented in terms of a fan frame lateral stiffness $K_{ff}^L$, a fan frame bending stiffness $K_{ff}^B$, a fan frame torsional stiffness $K_{ff}^T$, a fan frame lateral damping $C_{ff}^L$, a fan frame bending damping $C_{ff}^B$, and a fan frame torsional damping $C_{ff}^T$. In this way, the fan frame 949 acts as a dashpot damper that mechanically dampens vibrations through the fan frame 949 from the gearbox assembly 938 to the engine static structure 919.

The gearbox mounting systems and configurations in FIGS. 8A and 9A can be translated into a representative vibratory system, as shown in FIGS. 8B and 9B, respectively. Each interface to the gear box, whether a fan frame, flex mount, or flex coupling has geometric qualities that translate to lateral, bending, and torsional stiffness and damping elements. For example, the flex mount support system may have relatively thin-walled undulating supports engineered to possess specific values for stiffness and damping. Support wall thickness and support member span or extent play a critical role in determining stiffness and damping values. Thinner members certainly allow for lower values stiffness quantities and shorter spans or member lengths contribute to higher values stiffness properties. Similarly, the two flex mount flex elements on the input shaft use member thickness and outer diameter to control stiffness and damping. As member thickness decreases and diaphragm diameter increases, stiffness properties decrease in the mounting location. For the fan frame support, it is good practice to design this mounting element and location to be as stiff as possible while minimizing weight. The fan support frame needs a high degree of stiffness due to potential fan overloads that can occur; like in a blade out failure scenario. Therefore, the design approach for the flex mount and flex element lateral and bending stiffness values are desired to be notably softer than the fan support frame, which allows for the gearbox system to follow the fan frame support movement while generating low reaction forces and moments at the flex mount and flex coupling mounting locations. Conversely, the torsional stiffness of the flex mount and flex coupling mounting elements is desired to be design as stiff as possible since these elements are in the main torque transmission torque path with the fan.

The flex coupling, the flex mount, and the fan frame of FIGS. 8A and 9A permit the gearbox assembly (e.g., the gearbox assembly 838 and/or the gearbox assembly 938) to move to absorb bending moments applied by the fan shaft and/or the low-speed shaft. For example, the stiffness (K) and the damping (C) (e.g., the bending stiffness, the lateral stiffness, and the torsional stiffness, as well as the bending damping, the lateral damping, and the torsional bending) of the gearbox assembly (e.g., the gearbox assembly 838 of FIGS. 8A and 8B and/or the gearbox assembly of 938 of FIGS. 9A and 9B), can be selected to absorb the bending moments such that the effects of the vibratory response of the gearbox assembly on the low-speed shaft can be tuned such that the vibrations of the gearbox assembly during operation do not excite the low-speed shaft at the first-order bending mode when the low-speed shaft is operating at, or near, its critical speed, as detailed further below.

Figure 10:
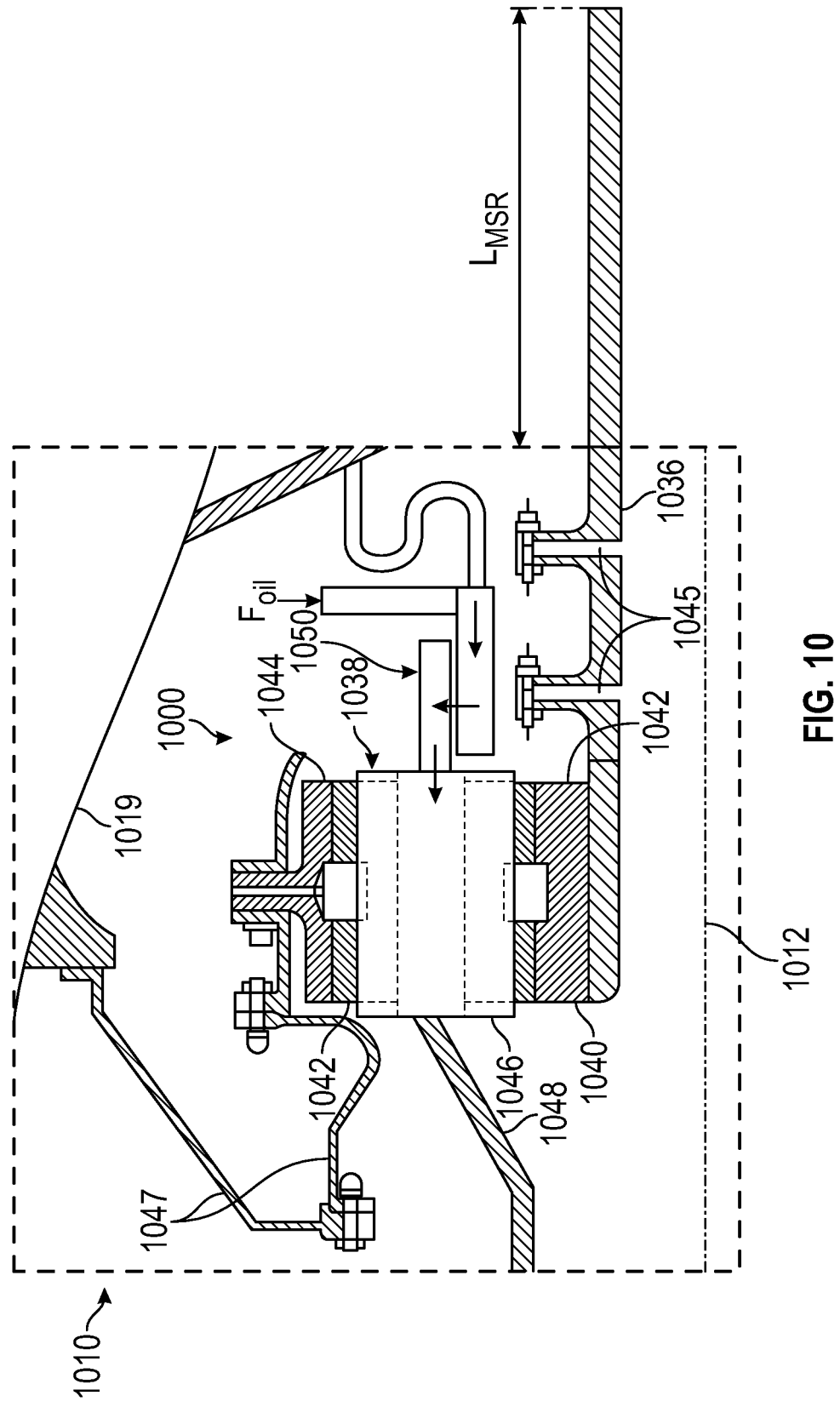
FIG. 10 shows a schematic, cross-sectional view of a gearbox assembly of a gas turbine engine with an oil transfer device.

FIG. 10 illustrates an enlarged, schematic side view of a gearbox assembly 1038 with a mounting assembly 1000 for a gas turbine engine 1010, taken at a centerline axis 1012 of the gas turbine engine 1010. A low-speed shaft 1036 is shown schematically in FIG. 10 and extends beyond the cut view of FIG. 10 to illustrate the length $L_{MSR}$ of the low-speed shaft 1036. The mounting assembly 1000 is that for a planetary configuration, as described with respect to FIGS. 9A and 9B. That is, a ring gear 1044 is coupled with a flex mount 1047 to an engine static structure 1019. The plurality of planet gears 1042 is constrained within a planet carrier 1046, which is coupled to a fan shaft 1048, and a sun gear 1040 is coupled with a flex coupling 1045 to the low-speed shaft 1036. Although not shown in FIG. 10, the fan shaft 1048 may be coupled with a fan frame to the engine static structure 1019, such as described with respect to FIGS. 9A and 9B.

The gearbox assembly 1038 can include an oil transfer device 1050. The oil transfer device 1050 allows an oil flow of lubricant (e.g., oil) to flow into the gearbox assembly 1038 and to lubricate the plurality of planet gears 1042, which in turn lubricates the sun gear 1040 and the ring gear 1044. Although shown with respect to a planetary configuration, the oil transfer device 1050 may be provided in a gearbox assembly having a star configuration (e.g., as shown and described with respect to FIGS. 8A and 8B).

FIGS. 11A to 11C illustrate degrees of freedom associated with structural stiffness K and damping coefficient C. These degrees of freedom characterize the most significant directions of movement affecting the respective stiffness or damping properties of the component as it interacts with the gearbox and engine frame(s) supporting it under loading conditions. The structural stiffness K and the damping coefficient C representations allowed the inventors to quantify the structural dynamic behavior of these degrees of freedom in a sufficiently accurate and representative manner, accounting for all factors in the component design that effects load transmission into the gearbox, thereby effecting the length $L_{MSR}$ of the low-speed shaft.

In FIGS. 11A to 11C, the Z-axis coincides with the centerline axis of the gas turbine engine (as shown in FIGS. 1 to 3) and extends in the axial direction A (FIGS. 1 to 3), the Y-axis extends perpendicular to the Z-axis in the radial direction R (FIGS. 1 to 3), and the X-axis extends perpendicular to the Z-axis in the circumferential direction C (e.g., into and out of the page in FIGS. 1 to 3).

In FIG. 11A, the lateral stiffness $K^L$ and the lateral damping $C^L$ affect the lateral stiffness and the lateral damping of the respective mounting component (e.g., the flex mount, the fan frame, and the flex coupling). This results in the lateral stiffness $K^L$ and the lateral damping $C^L$ affecting the movement of the respective component in the lateral direction. The lateral direction includes the linear motion of the component in a Y-axis radial direction 1100 and an X-axis circumferential direction 1110.

In FIG. 111B, the bending stiffness $K^B$ and the bending damping $C^B$ affect the bending stiffness and the bending damping of the respective mounting component (e.g., the flex mount, the fan frame, and the flex coupling). This results in the bending stiffness $K^B$ and the bending damping $C^B$ affecting the rotational movement of the respective component in the bending direction. The bending direction includes the bending or rotational motion of the component in a yaw direction 1120 and a pitch direction 1130.

In FIG. 11C, the torsional stiffness $K^T$ and the torsional damping $C^T$ affect the torsional stiffness and the torsional damping of the respective mounting component (e.g., the flex mount, the fan frame, and the flex coupling). This results in the torsional stiffness $K^T$ and the torsional damping $C^T$ affecting the rotational movement of the respective component in a torsional direction 1140 about the engine centerline (e.g., about the centerline axis or Z-axis). This represents the load path of the gears and the torque of the respective component with respect to the fan (e.g., any of the fans or fan assemblies detailed herein).

Figures 12A, 12B:
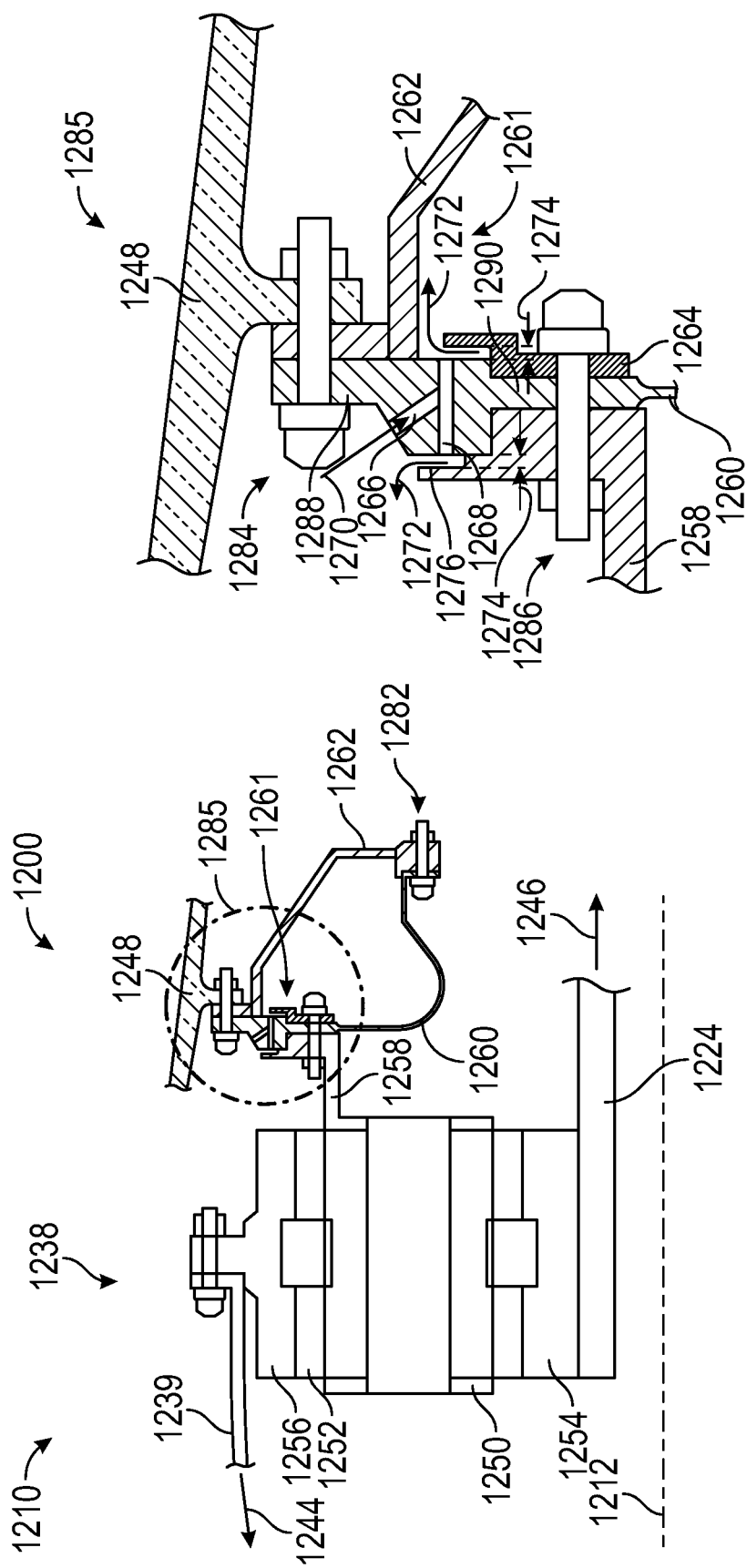
FIG. 12A shows an enlarged, schematic, cross-sectional side view of a gearbox assembly with a mounting assembly for a gas turbine engine, taken at a centerline axis of the gas turbine engine.
FIG. 12B shows an enlarged, schematic, partial cross-sectional side view of a portion of the mounting assembly of FIG. 12A.

FIG. 12A illustrates an enlarged, schematic cross-sectional side view of a gearbox assembly 1238 with a mounting assembly 1200 for a gas turbine engine 1210, taken at a centerline axis 1212 of the gas turbine engine 1210. The gearbox assembly 1238 can be utilized as any of the gearbox assemblies detailed herein and the gas turbine engine 1210 can be any of the gas turbine engines detailed herein. The mounting assembly 1200 shown is that for a star configuration gearbox, as detailed above. The gearbox assembly 1238 includes a planet carrier 1250 that carries or houses a plurality of planet gears 1252. A ring gear 1256 is connected to a fan shaft 1239 as shown by arrow 1244. The plurality of planet gears 1252 rotate within the ring gear 1256 and are driven by a sun gear 1254 that is connected to a low-speed shaft 1224 as shown by arrow 1246. The rotation of the low-speed shaft 1224 is transmitted through the planet gears 1252 to the ring gear 1256 which rotates the fan shaft 1239, and, thus, rotates a fan (e.g., any of the fans or fan assemblies detailed herein).

The planet carrier 1250 includes a carrier arm 1258 that is connected to a first end of a flex mount 1260 at a connection 1286 (FIG. 12B). The first end of the flex mount 1260 includes a deflection limiter 1261, as shown in more detail in FIG. 12B. The flex mount 1260 is connected at a second end to a torque cone 1262 at a connection 1282 (FIG. 12A). The torque cone 1262 and the first end of the flex mount 1260 are connected to each other and an engine static structure 1248 at a connection 1284 (FIG. 12B). The torque cone 1262 includes a generally frusto-conical section between a first end at the connection 1282 and a second end at the connection 1284. The design of the torque cone and the flex mount are only one embodiment of the supporting structure for the planet carrier. The mounting system can include a different design and form based on application requirements.

FIG. 12B shows an enlarged, schematic, cross-sectional side view of a portion of the mounting assembly 1200 at detail 1285 in FIG. 12A. Referring to FIG. 12B, the deflection limiter 1261 includes an outer rim 1288 that is stationary due to its connection 1284 to the engine static structure 1248 and an inner rim 1290 that can oscillate or vibrate at the connection 1286 to the carrier arm 1258. For example, the outer rim 1288 and the inner rim 1290 extend axially and are spaced from each other such that a gap 1268 is formed between the outer rim 1288 and the inner rim 1290. The gap 1268 has a clearance 1280 (FIG. 12D) that defines a size of the gap 1268 in the radial direction. The outer rim 1288 and the inner rim 1290 are annular.

During operation, the gearbox assembly 1238 vibrates as the gears rotate and torque is transferred from the low-speed shaft 1224 to the fan shaft 1239 through the gearbox assembly 1238. For example, the fan shaft 1239 can apply bending moments through the gearbox assembly 1238, and the flex mount 1260 can absorb the bending moments. The vibration may cause the gearbox assembly 1238 to deflect in the axial direction (e.g., lateral deflection), the radial direction (e.g., radial deflection), and/or the circumferential direction (e.g., torsional deflection). The deflection limiter 1261 prevents the gearbox assembly 1238 from being displaced or being deflected beyond a threshold level. For example, as the gearbox assembly 1238 deflects in the radial direction, the inner rim 1290 moves radially towards the outer rim 1288. As the gearbox assembly 1238 continues to move in the radial direction, the inner rim 1290 will continue to move towards the outer rim 1288 until the inner rim 1290 contacts the outer rim 1288, thereby preventing the gearbox assembly 1238 from being deflected beyond the threshold level. The threshold level can be adjusted by adjusting the clearance 1280 (FIG. 12D) of the gap 1268. For example, the threshold level is decreased by setting the inner rim 1290 closer to the outer rim 1288 (e.g., decreasing the size of the gap 1268), and the threshold level is increased by setting the inner rim 1290 further away from the outer rim 1288 (e.g., increasing the size of the gap 1268). Thus, the deflection limiter 1261 can be tuned to achieve a desired maximum deflection of the gearbox assembly 1238. The deflection limiter 1261 can also similarly limit deflections in the axial and circumferential directions, as detailed further below with respect to FIG. 12E. In this way, the deflection limiter 1261 can be tuned to prevent the deflections of the gearbox assembly 1238 from exciting the low-speed shaft, thereby affecting the MSR.

In some embodiments, the first end of the flex mount 1260 includes an oil feed passage 1266 for feeding oil (as shown by arrow 1270) into the gap 1268, also referred to as a damper land in such embodiments. In such embodiments, the deflection limiter 1261 also functions as a damper, also referred to as a squeeze film damper (SFD). The oil is provided to the gap 1268 through the oil feed passage 1266. The gap 1268 provides a control volume for the damper and includes the clearance 1280 (FIG. 12D), also referred to as a squeeze film damper clearance in such embodiments. The carrier arm 1258 includes an end seal 1276, and an end seal 1264 is connected to the flex mount 1260 and the carrier arm 1258 by the connection 1286. The end seals 1264, 1276 provide end seal clearances 1274 through which oil may expelled (as shown by arrows 1272) as the damper dissipates vibratory energy. The end seals 1264, 1276 can also limit deflections of the gearbox assembly 1238 in the axial direction. In embodiments that do not include a SFD, the end seals 1264, 1276 can be walls that prevent deflections of the gearbox assembly 1238 in the axial direction.

Figure 12D:
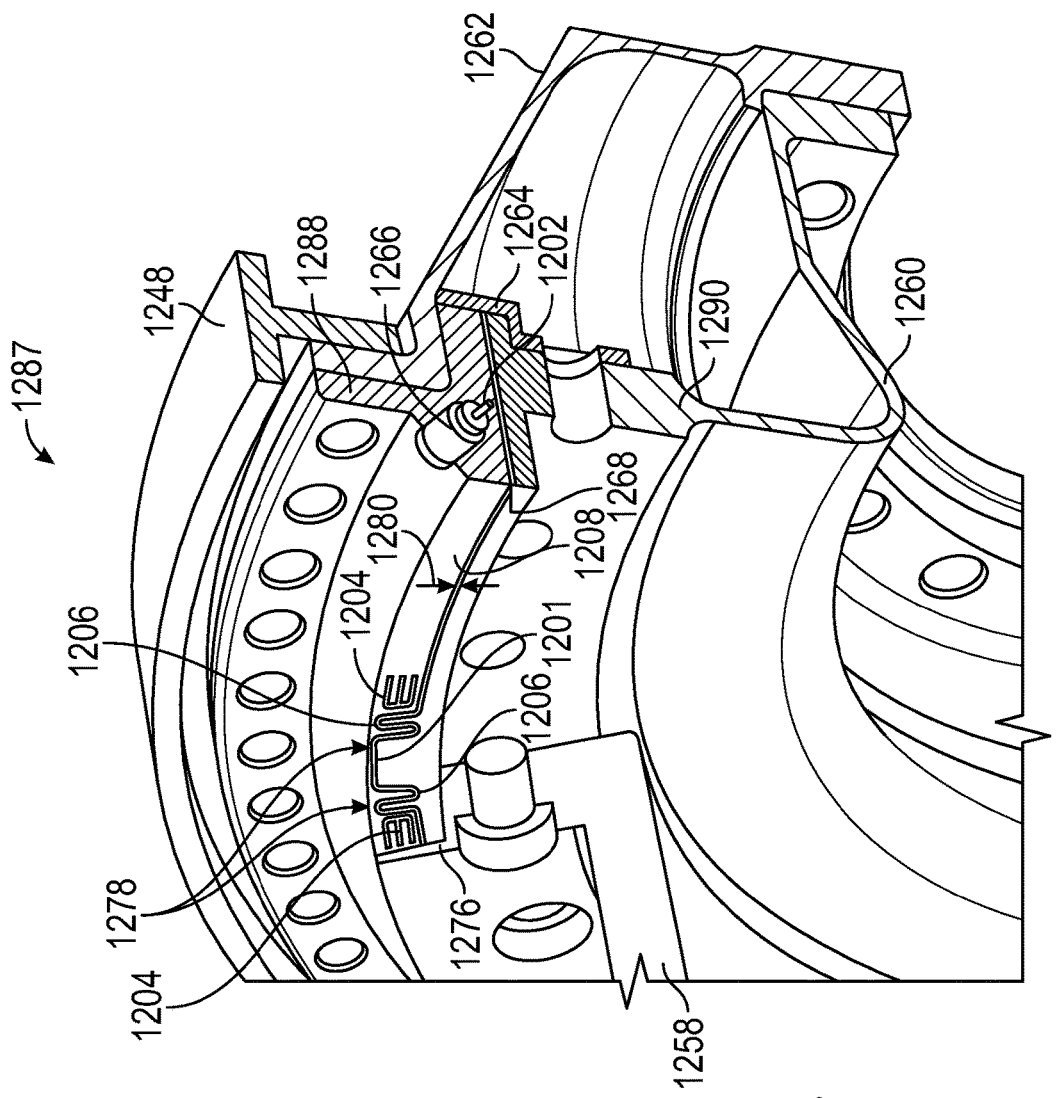
FIG. 12D shows an enlarged, schematic, partial cross-sectional view of the mounting assembly of FIG. 12C.
Figure 12C:
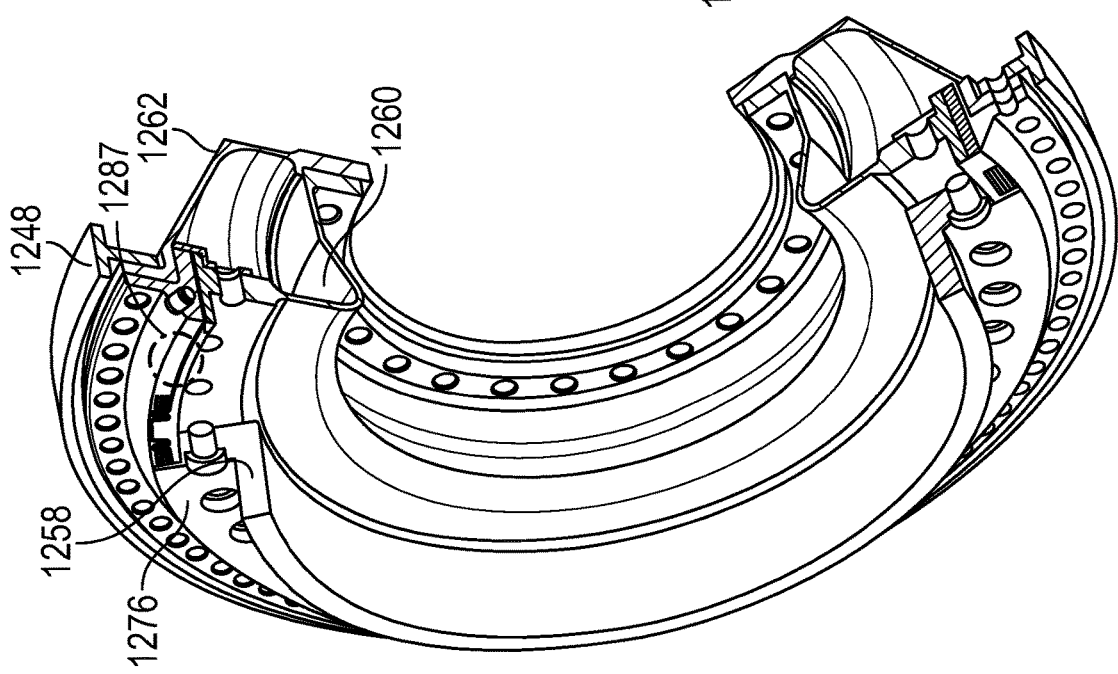
FIG. 12C shows a schematic, partial cross-sectional view of a ring gear assembly for the gearbox assembly of FIG. 12A.

Referring to FIGS. 12C and 12D, the integral damper formed by the outer rim 1288 and the inner rim 1290 of the flex mount 1260 includes springs 1278 integrally formed in the flex mount 1260. Each spring 1278 includes a radial flex element 1204 and a torsional flex element 1206. In this way, the springs 1278 help to damper vibrations in both the radial direction and the circumferential direction. The springs 1278 can be integrally formed in the flex mount 1260 by, for example, electric-discharge machining (EDM). The springs 1278 are provided circumferentially around the flex mount 1260. A squeeze film damper (SFD) segment 1208 is defined between each circumferentially spaced set of springs 1278. A stop 1201 is provided between SFD segments 1208 to reduce or limit excursions of the mounting assembly 1200 with respect to the engine static structure 1248.

Referring to FIGS. 12B and 12D, oil is fed into the gap 1268 which is bounded by the end seals 1264, 1276 on either side of the gap 1268. The end seal clearance 1274 (FIG. 12B) controls the damping levels in the damper in combination with a feed orifice diameter 1202 to the gap 1268. A significant vibration mode of the gearbox assembly 1238 (FIG. 12A) may be excited by three different rotating elements: 1) the low-speed shaft 1224 (FIG. 12A) imbalance; 2) the planet gear 1252 (FIG. 12A) imbalance; and 3) the fan shaft 1239 (FIG. 12A) imbalance. Other engine loads can also be transmitted to the gearbox assembly 1238 such as oscillating aerodynamic loads from the fan, transient maneuver loads, and torsional excitations for the gear train. The deflection limiter 1261 can mitigate or reduce these vibrations and will also reduce or minimize the dynamic forces transmitted to the engine structure.

Figure 12E:
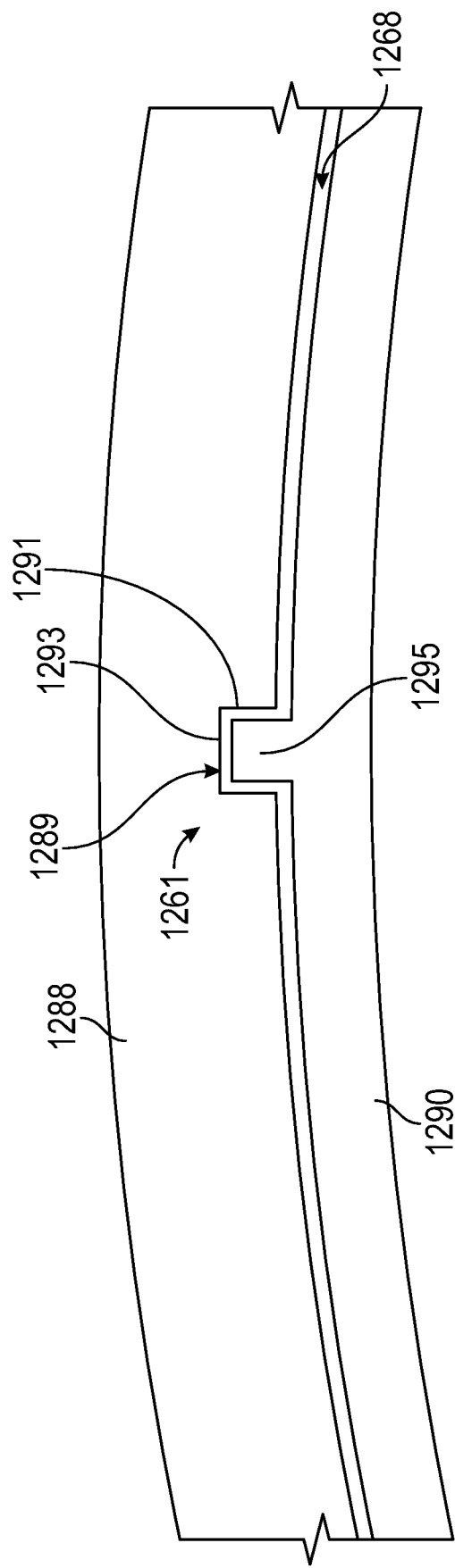
FIG. 12E shows an enlarged, schematic side view of the mounting assembly of FIG. 12C.

FIG. 12E is an enlarged, schematic side view of the mounting assembly 1200, taken at detail 1287 in FIG. 12C. FIG. 12E shows the deflection limiter 1261 includes one or more teeth 1295 that extend in the circumferential direction, extend in the radial direction, and extends in the axial direction (e.g., into the page in the view shown in FIG. 12E). The deflection limiter 1261 also includes one or more gaps 1289 through which the one or more teeth 1295 are disposed. The one or more gaps 1289 include a radially extending wall 1291 and a circumferentially extending wall 1293. While the one or more teeth 1295 are shown as extending from the inner rim 1290, the one or more teeth 1295 can extend from the outer rim 1288. Similarly, the one or more gaps 1289 are shown in the outer rim 1288 in FIG. 12E, but can be formed in the inner rim 1290.

During operation, the gearbox assembly 1238 (FIG. 12A) deflects in the radial direction, the axial direction, and/or the circumferential direction, as detailed above. When the gearbox assembly 1238 deflects radially, the inner rim 1290 and one or more teeth 1295 of the deflection limiter 1261 deflect toward the circumferentially extending wall 1293, and contact the circumferentially extending wall 1293 to limit the deflection in the radially direction. Similarly, when the gearbox assembly 1238 deflects circumferentially, the inner rim 1290 and the one or more teeth 1295 deflect toward the radially extending wall 1291, and contact the radially extending wall 1291 to limit the deflection in the circumferential direction. The one or more teeth 1295 can similarly limit deflection in the axial direction when the gearbox assembly 1238 deflects axially.

Figure 13:
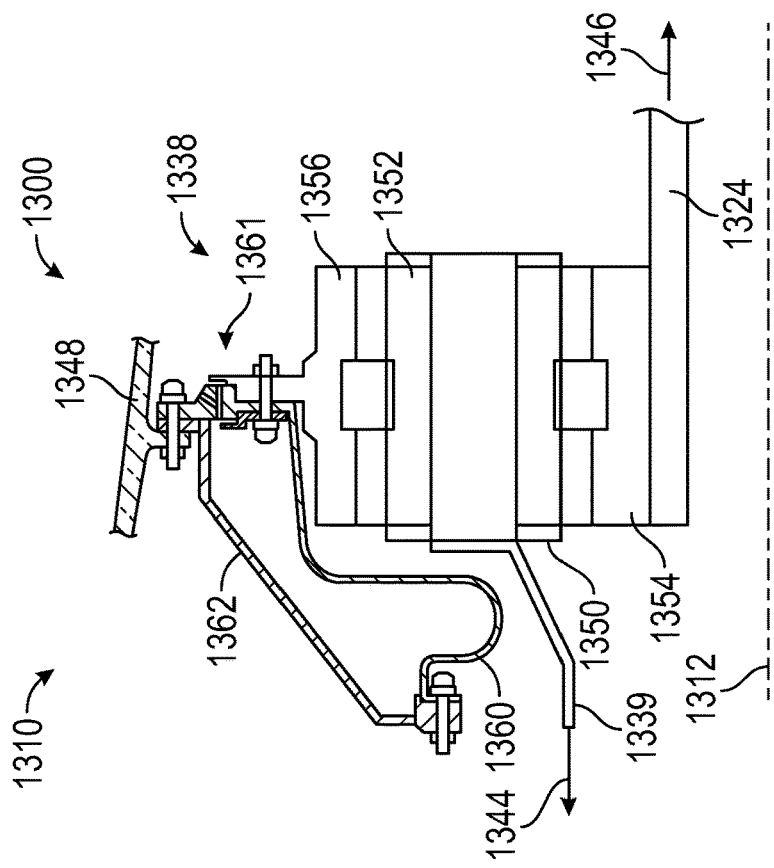
FIG. 13 shows an enlarged, schematic cross-sectional side view of a gearbox assembly with a mounting assembly for a gas turbine engine, taken at a centerline axis of the gas turbine engine, according to another embodiment.

FIG. 13 is an enlarged, schematic, cross-sectional side view of a gearbox assembly 1338 with a mounting assembly 1300 for a gas turbine engine 1310, taken at a centerline axis 1312 of the gas turbine engine 1310, according to another embodiment. The gearbox assembly 1338 can be utilized as any of the gearbox assemblies detailed herein and the gas turbine engine 1310 can be any of the gas turbine engines detailed herein. The mounting assembly 1300 shown is that for a planetary configuration gearbox, as detailed. The gearbox assembly 1338 includes a planet carrier 1350 that carries or houses a plurality of planet gears 1352. In the planetary configuration, the planet carrier 1350 is connected to a fan shaft 1339 as shown by arrow 1344. A ring gear 1356 is stationary in the planetary configuration, and a flex mount 1360 of the mounting assembly 1300 is connected to the ring gear 1356. The plurality of planet gears 1352 rotate within the ring gear 1356 and are driven by a sun gear 1354 that is connected to a low-speed shaft 1324 as shown by arrow 1346. The rotation of the low-speed shaft 1324 is transmitted through the planet gears 1352 to the planet carrier 1350 which rotates the fan shaft 1339, and, thus, rotates a fan (e.g., any of the fans or fan assemblies detailed herein). The mounting assembly 1300 also includes a torque cone 1362 and a deflection limiter 1361 that coupled the gearbox assembly 1338 to an engine static structure 1348, as detailed above.

Figure 14:
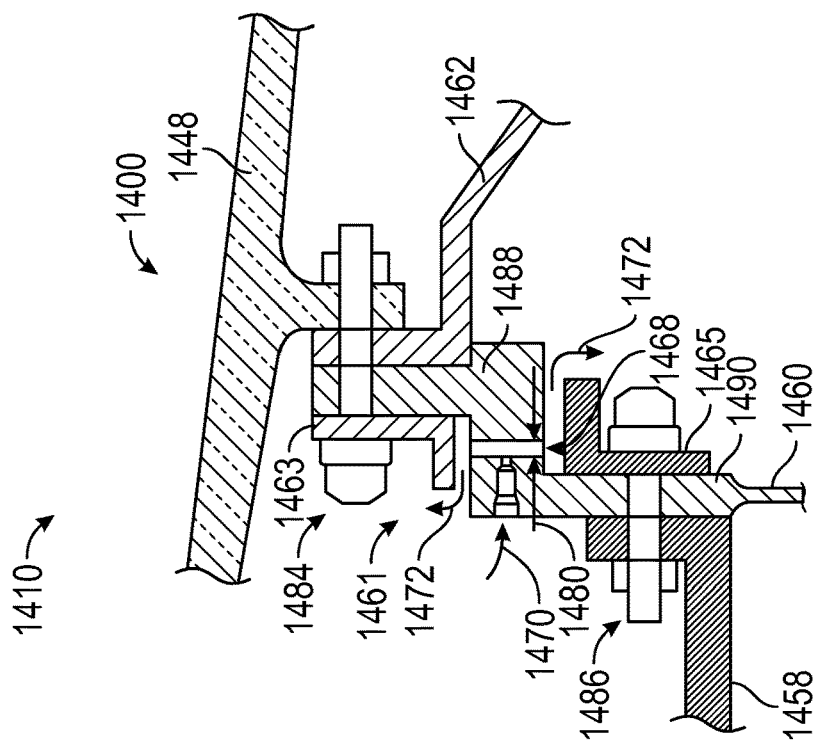
FIG. 14 shows an enlarged, schematic partial cross-sectional side view of a portion of a mounting assembly, according to another embodiment.

FIG. 14 is an enlarged, schematic, partial cross-sectional side view of a mounting assembly 1400 for a gearbox assembly of a gas turbine engine 1410, taken at a centerline axis of the gas turbine engine, according to the present disclosure. The mounting assembly 1400 includes a flex mount 1460 and a torque cone 1462 and can be coupled to a planet carrier or to a ring gear of the gearbox assembly for coupling the gearbox assembly to an engine static structure 1448. The mounting assembly 1400 includes a deflection limiter 1461 including an outer rim 1488 that is stationary due to a connection 1484 to the engine static structure 1448 and an inner rim 1490 that can oscillate or vibrate at a connection 1486 to a carrier arm 1458. For example, the outer rim 1488 and the inner rim 1490 extend radially and are spaced from each other such that a gap 1468 is formed between the outer rim 1488 and the inner rim 1490. The gap 1468 has a clearance 1480 that defines a size of the gap 1468 in the axial direction. In this way, the deflection limiter 1461 operates similarly to the deflection limiter 1261 of FIG. 12B, but the inner rim 1490 deflects axially towards the outer rim 1488 to prevent deflections in the axial direction.

The deflection limiter 1461 can also function as a damper similar to the deflection limiter 1261 (FIG. 12B). For example, the deflection limiter 1461 can include a first end seal 1463 and a second end seal 1465 and the gap 1468 can receive oil (as shown by arrow 1470) therein and expel oil (as shown by arrow 1472) therefrom such that a squeeze film damper is provided.

Figure 15:
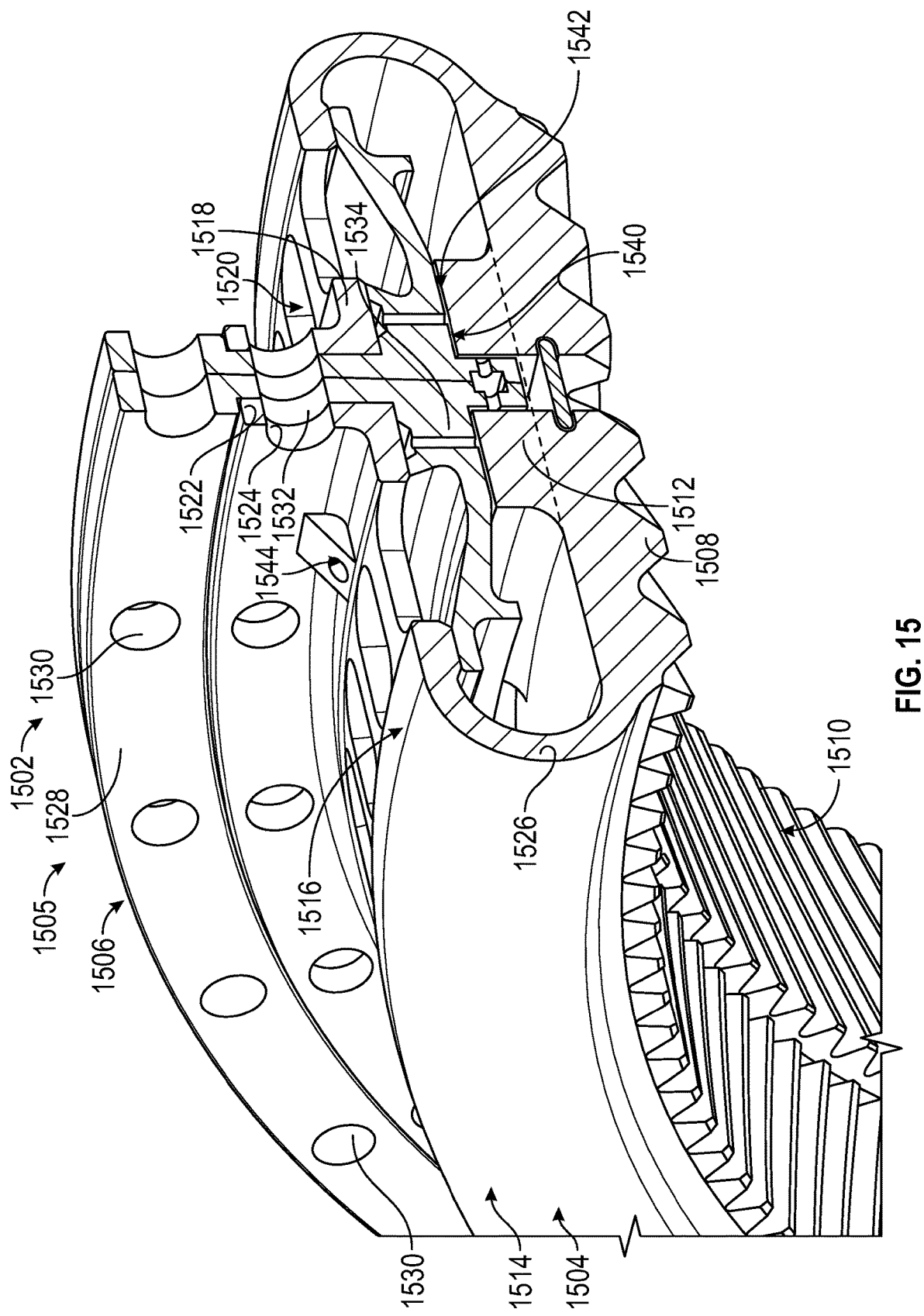
FIG. 15 shows an enlarged, schematic partial cross-sectional view of a ring gear assembly for a gas turbine engine.

FIG. 15 is an enlarged, schematic, partial cross-sectional view of a ring gear assembly 1502, according to the present disclosure. The ring gear assembly 1502 is depicted as a dual ring gear/damper housing, also referred to as a ring gear 1504. The ring gear 1504 can be utilized as any of the ring gears detailed herein. The ring gear assembly 1502 includes a damper 1505 having a damper housing 1506. The ring gear 1504 is connected to the damper housing 1506. The ring gear 1504 includes a geared wall 1508 that includes a plurality of ring gear teeth 1510. The plurality of ring gear teeth 1510 are bihelical gear teeth. A detailed description of bihelical gear teeth is provided below. The plurality of ring gear teeth 1510 can include any type of gear teeth, such as, for example, spur gear teeth, helical gear teeth, or the like. The ring gear 1504 also includes a damper housing engagement wall 1512 extending radially outward from the geared wall 1508. The ring gear 1504 also includes a flexible damping wall 1514 connected to the geared wall 1508, and a damper housing attachment member 1516. The damper housing attachment member 1516 includes a longitudinal wall 1518 radially spaced apart from the geared wall 1508 and extending in an axial direction from the flexible damping wall 1514. The longitudinal wall 1518 can include a plurality of ring gear scavenge openings 1520 extending therethrough to allow a lubricant (e.g., oil) to flow therethrough. The damper housing attachment member 1516 further includes a damper housing connecting wall 1522 connected with the longitudinal wall 1518 and extending outward therefrom in a radial direction. The damper housing connecting wall 1522 includes a plurality of connecting openings 1524 therethrough for connecting the ring gear 1504 to the damper housing 1506.

The flexible damping wall 1514 is shown as being a generally semi-circular tubular-shaped wall that extends circumferentially, and that connects to the geared wall 1508 and to the longitudinal wall 1518 of the damper housing attachment member 1516. The flexible damping wall 1514 has a flexible damping wall thickness 1526. The generally semi-circular tubular-shape of the flexible damping wall 1514 provides for radial flexure and damping of the geared wall 1508 during operation of the gearbox assembly, and the flexible damping wall thickness 1526 is a parameter provides a predetermined radial stiffness based on radial loads anticipated to be imparted to the geared wall 1508 by the planet gears (e.g., any of the planet gears detailed herein) during operation of the gearbox assembly.

The damper housing 1506 includes a damper housing radial wall 1528 extending in the radial direction and extending circumferentially. The damper housing radial wall 1528 includes a plurality of frame mounting openings 1530 for mounting the ring gear assembly 1502 to an engine static structure (e.g., any of the engine static structures detailed herein) via a plurality of fasteners (omitted for clarity). In this way, the ring gear assembly 1502 is utilized in a gearbox assembly having a planetary configuration (e.g., a rotating planet carrier while the ring gear 1504 remains stationary). The damper housing radial wall 1528 also includes a plurality of ring gear mounting openings 1532 for connecting the ring gear 1504 to the damper housing 1506 via fasteners (omitted for clarity) provided through the connecting openings 1524 of the ring gear 1504 and the ring gear mounting openings 1532.

The damper housing 1506 further includes a damper housing ring gear engagement wall 1534 extending radially inward from the damper housing radial wall 1528 and extending in the axial direction and in the circumferential direction. The damper housing ring gear engagement wall 1534 engages the longitudinal wall 1518 so as to provide support to the longitudinal wall 1518 in a radially inward direction.

The ring gear assembly 1502 also includes a deflection limiter 1540 that includes a gap 1542. The deflection limiter 1540 functions substantially similarly as the deflection limiter 1261 of FIGS. 12A to 12D to limit deflections of the ring gear 1504 in the axial direction, the radial direction, and/or in the circumferential direction. In some embodiments, the deflection limiter 1540 can also include and operate as an integral damper (e.g., a squeeze film damper).

Figure 16A:
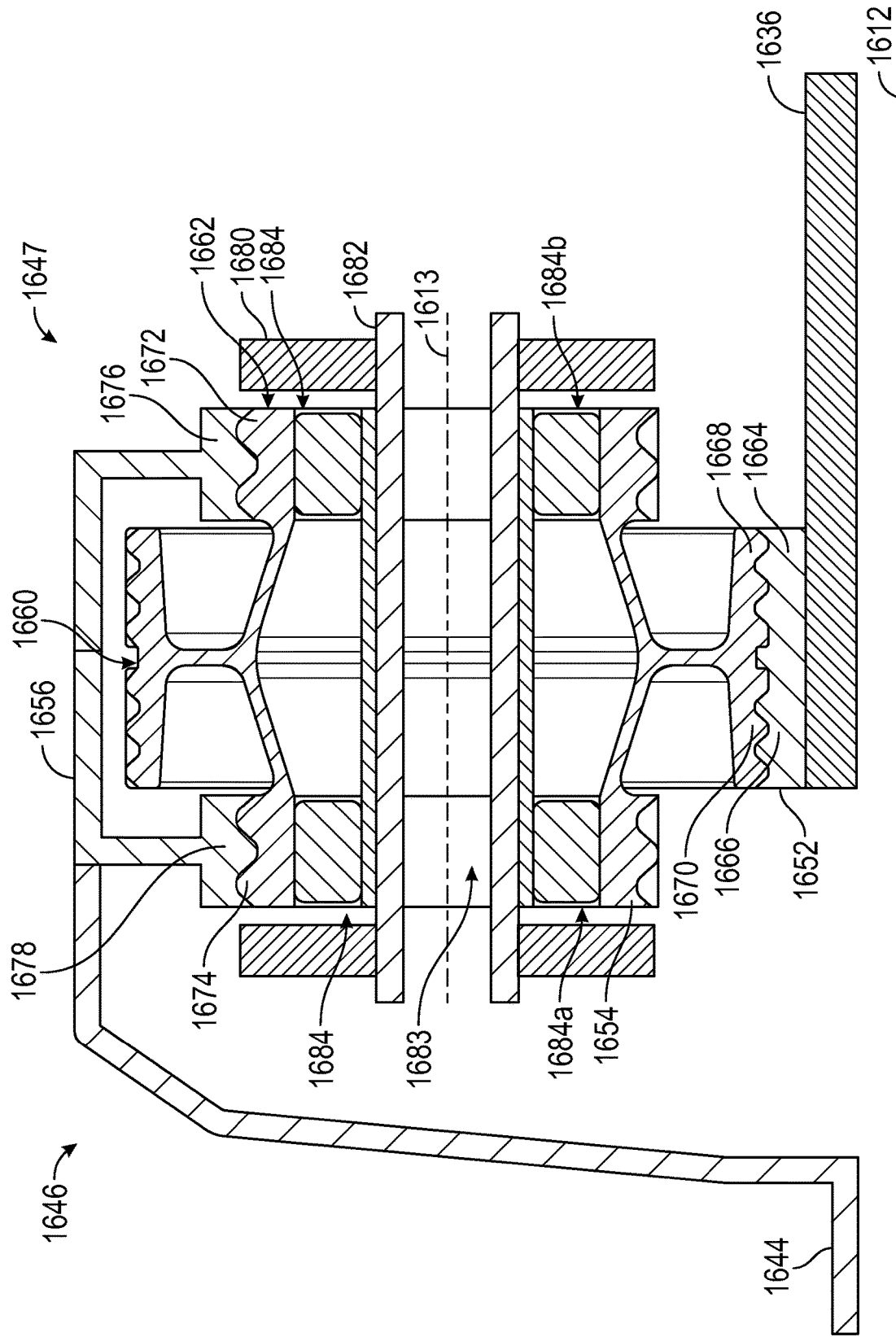
FIG. 16A shows a schematic, cross-sectional side view of a gearbox assembly for a gas turbine engine, taken along a centerline axis of the gas turbine engine.

Components inside of the gearbox assembly, such as the gears or the bearings, can also affect the vibrational response of the gearbox assembly. FIG. 16A is a schematic, cross-sectional side view of a gearbox assembly 1646 for a gas turbine engine, taken along a centerline axis 1612 of the gas turbine engine, according to the present disclosure. The gearbox assembly 1646 can be utilized as any of the gearbox assemblies and in any of the gas turbine engines detailed herein, but is particularly useful for gearbox assemblies having a gear ratio of more than 4:1, or of 4:1 to 12:1, or of 7:1 to 12:1, or of 4:1 and 10:1, or of 5:1 and 8:1. The gearbox assembly 1646 in FIG. 16A is suited for use with gas turbine engines that have large fan blades, such as the open fan configuration of FIG. 3. The gearbox assembly 1646 in FIG. 16A is one embodiment of the gearbox 355 in FIG. 3.

The gearbox assembly 1646 includes an epicyclic gear assembly 1647 in a compound symmetrical arrangement. The epicyclic gear assembly 1647 includes a sun gear 1652, a plurality of planet gears 1654 (only one of which is visible in FIG. 16A), and a ring gear 1656. For clarity, only a portion of the gears is shown. The gearbox assembly 1646 is a star type (e.g., star configuration) or a rotating ring gear type gearbox assembly (e.g., the ring gear 1656 is rotating and a planet carrier 1680 is fixed and stationary). In such an arrangement, the fan (e.g., any of the fans or fan assemblies detailed herein) is driven by the ring gear 1656. In this way, the ring gear 1656 is an output of the gearbox assembly 1646. However, other suitable types of gearbox assemblies may be employed. In one non-limiting embodiment, the gearbox assembly 1646 may be a planetary arrangement, in which the ring gear 1656 is held fixed, with the planet carrier 1680 allowed to rotate. In such an arrangement, the fan is driven by the planet carrier 1680. In this way, the plurality of planet gears 1654 are the output of the gearbox assembly 1646.

An input shaft 1636 is coupled to the sun gear 1652. The input shaft 1636 is coupled to the power turbine section of the gas turbine engine (e.g., via a low-speed shaft). The input shaft 1636 is coupled to the low-speed shaft, having mid-shaft length $L_{MSR}$, as detailed above. The ring gear 1656 is coupled via an output shaft 1644 to the fan and rotates to drive rotation of the fan about the centerline axis 1612. For example, the output shaft 1644 is coupled to a fan shaft (e.g., any of the fan shafts detailed herein) of the fan. In some embodiments, the output shaft 1644 and the fan shaft are formed as a single integral component.

Each of the plurality of planet gears 1654 is a compound gear that includes a first stage planet gear 1660 and a second stage planet gear 1662 coupled together. The first stage planet gear 1660 includes a greater diameter than a diameter of the second stage planet gear 1662. In some embodiments, the diameter of the first stage planet gear 1660 is equal to or less than the diameter of the second stage planet gear 1662.

The diameters of the first stage planet gear 1660 and the second stage planet gear 1662 can be selected to change a gear ratio split between the first stage planet gear 1660 and the second stage planet gear 1662. Each of the sun gear 1652, the plurality of planet gears 1654, and the ring gear 1656 comprises teeth about their periphery to intermesh with the other gears. For example, each of the sun gear 1652, the plurality of planet gears 1654, and the ring gear 1656 are bihelical gears with first and second sets of helical teeth that are all inclined at the same acute angle relative to a planet gear axis. The helical teeth of a planet gear 1654 are further detailed below with respect to FIG. 16B. The sun gear 1652 comprises a first set of sun gear teeth 1664 and a second set of sun gear teeth 1666. Each of the first stage planet gears 1660 includes a first set of planet gear teeth 1668 and a second set of planet gear teeth 1670, and each of the second stage planet gears 1662 includes a third set of planet gear teeth 1672 and a fourth set of planet gear teeth 1674. The ring gear 1656 includes a first set of ring gear teeth 1676 and a second set of ring gear teeth 1678. The sun gear 1652, the plurality of planet gears 1654, and the ring gear 1656 may include any type of gear, such as, for example, spur gears (e.g., gear teeth that are straight cut and are not set at an angle relative to the planet gear axis), or the like.

The first set of planet gear teeth 1668 and the second set of planet gear teeth 1670 of the first stage planet gear 1660 mesh with the first set of sun gear teeth 1664 and the second set of sun gear teeth 1666 of the sun gear 1652, respectively. The third set of planet gear teeth 1672 of the second stage planet gear 1662 meshes with the first set of ring gear teeth 1676 of the ring gear 1656. The fourth set of planet gear teeth 1674 of the second stage planet gear 1662 meshes with the second set of ring gear teeth 1678 of the ring gear 1656.

Each of the planet gears 1654 of the plurality of planet gears 1654 includes a pin 1682 about which a respective planet gear 1654 rotates. The pin 1682 is coupled to the planet carrier 1680 and is disposed within a bore 1683 of a respective planet gear 1654. Lubricant (e.g., oil) is provided between the pin 1682 and a respective planet gear 1654 such that the planet gear 1654 rotates with respect to the pin 1682. The second stage planet gear 1662 is supported by one or more roller bearings 1684 that are disposed within the bore 1683. FIG. 16A shows the one or more roller bearings 1684 include two roller bearings 1684 including a first roller bearing 1684a and a second roller bearing 1684b. A respective planet gear 1654, however, can include any number of roller bearings 1684, as desired. The second roller bearing 1684b is located aft of the first roller bearing 1684a. In this way, the first roller bearing 1684a is referred to as a forward roller bearing and the second roller bearing 1684b is referred to as an aft roller bearing. The roller bearings 1684 allow rotation of the planet gear 1654 with respect to the pin 1682.

The gearbox assembly 1646 includes a gear ratio that defines a ratio of the speed of the input gear (e.g., the sun gear 1652) to the speed of the output (e.g., the ring gear 1656) through the gearbox assembly 1646. Embodiments of the present disclosure detailed herein provide for increased gear ratios for a fixed gear envelope (e.g., with the same size ring gear), or alternatively, a smaller diameter ring gear may be used to achieve the same gear ratios. Thus, the embodiments disclosed herein allow for gear ratios suitable for large diameter engines, or for smaller diameter engines. A total gear ratio of the planet gear 1654 includes a first gear ratio of the first stage planet gear 1660 and a second gear ratio of the second stage planet gear 1662. The first gear ratio of the first stage planet gear 1660 is less than the second gear ratio of the second stage planet gear 1662. In some embodiments, the first gear ratio of the first stage planet gear 1660 is greater than or equal to the second gear ratio of the second stage planet gear 1662. In the embodiment of FIG. 16A, the total gear ratio of the planet gear 1654 is between seven (7:1) and twelve (12:1). The total gear ratio is selected based on engine size and power requirements and a selection of components for a particular gearbox assembly 1646. For example, the total gear ratio is based on the speed of the fan (e.g., the tip speed of the fan) and the speed of the low-pressure turbine (e.g., based on the number of stages of the low-pressure turbine).

Figure 16B:
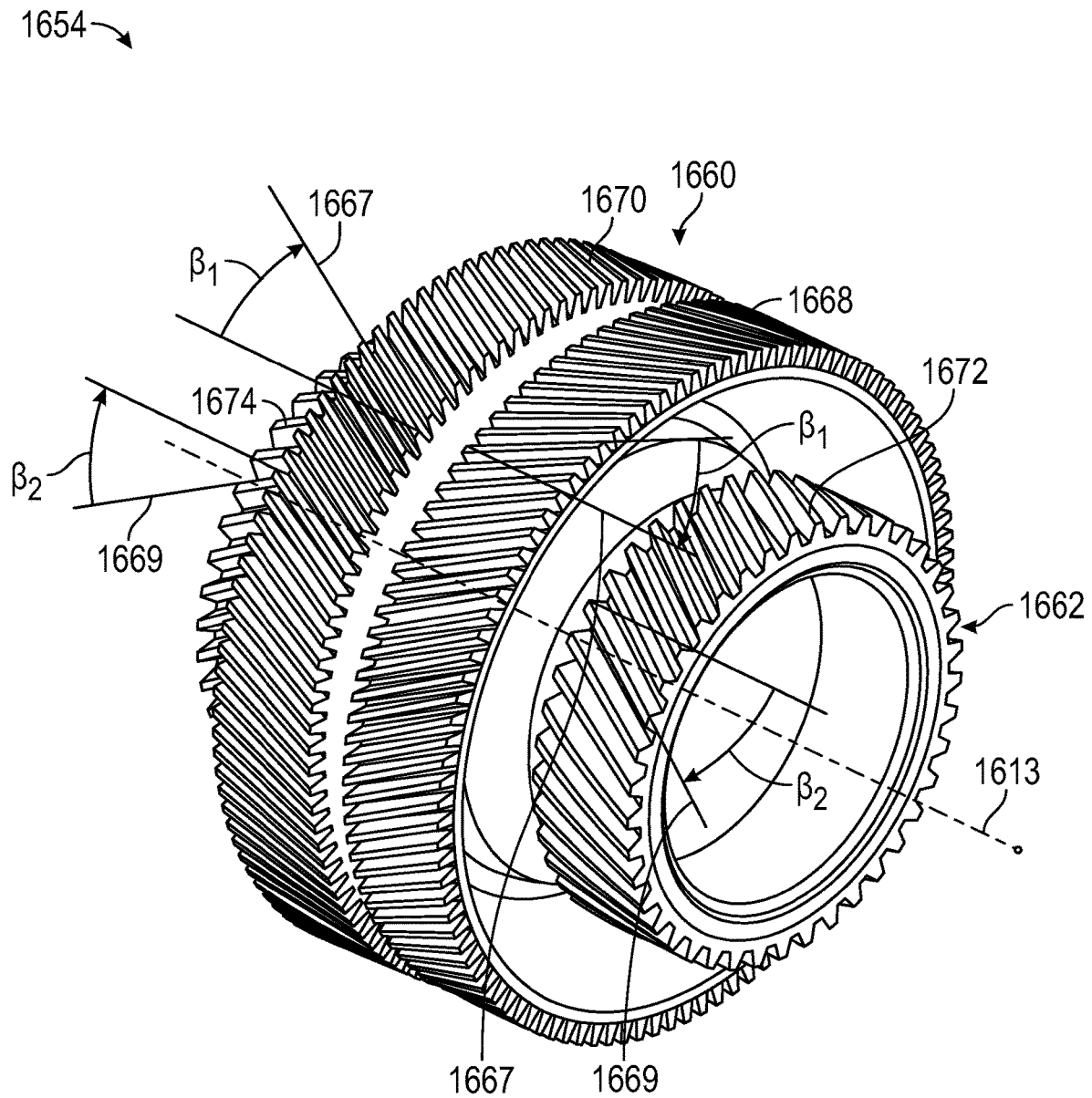
FIG. 16B shows a schematic view of a planet gear with a first stage planet gear and a second stage planet gear.

FIG. 16B is a schematic view of a planet gear 1654 with a first stage planet gear 1660 and a second stage planet gear 1662, according to the present disclosure. While the planet gear is described herein, the following description is applicable to any of the gears of the gearbox assembly 1646 (FIG. 16A). The planet gear 1654 is a bihelical gear, also referred to as a double helical gear, in which the gear teeth are arranged in a "herringbone" pattern. Because each of the gear meshes (sun-to-planet and planet-to-ring) has a bihelical gear tooth profile, there is no relative movement possible parallel to an axis 1613 between the planet gear 1654 and the sun gear or the ring gear, or in other words there is no axial compliance between these elements. In this way, such an arrangement of the gear teeth provides for a stiffer mesh between the gears of the gearbox assembly as compared to gear teeth having a spur type (e.g., parallel with the axis 1613) arrangement.

Each planet gear tooth of the first set of planet gear teeth 1668 and the second set of planet gear teeth 1670 defines a first helix axis 1667 along a length of each respective gear tooth of the first stage planet gear 1660. The first set of planet gear teeth 1668 are mirrored with respect to the second set of planet gear teeth 1670. The first helix axis 1667 is normal to an end face of each respective gear tooth of the first stage planet gear 1660. The first helix axis 1667 is disposed at a first helix angle $\beta_1$ with respect to the axis 1613 (e.g., with respect to the axis of rotation of the gear). The greater the first helix angle $\beta_1$, the greater the stiffness of the mesh between the gears. However, increasing the first helix angle B1 is limited due to geometry and heat treatment of the gear teeth, tooling, and/or the resulting axial load. Thus, the first helix angle $\beta_1$ is in a range of twenty-two point five degrees (22.5°) to thirty-two point five degrees (32.5°) to balance the requirement for an increased stiffness in the mesh with the above considerations of the geometry and heat treatment, the tooling, and/or the resulting axial load. Preferably, the first helix angle $\beta_1$ is thirty degrees (30°) to provide a greater stiffness in the mesh, while accounting for the considerations above for gearboxes with gear ratios above 7:1. The first helix angle $\beta_1$ can be changed to change a stiffness of the mesh between the gears.

Each planet gear tooth of the third set of planet gear teeth 1672 and the second set of planet gear teeth 1674 of the second stage planet gear 1662 defines a second helix axis 1669 along a length of each respective gear tooth of the second stage planet gear 1662. The third set of planet gear teeth 1672 are mirrored with respect to the fourth set of planet gear teeth 1674. The second helix axis 1669 is normal to an end face of each respective gear tooth of the second stage planet gear 1662. The second helix axis 1669 is disposed at a second helix angle $\beta_2$ with respect to the axis 1613 (e.g., with respect to the axis of rotation of the gear). The second helix angle $\beta_2$ is in a range of twenty-two point five degrees (22.5°) to thirty-two point five degrees (32.5°). Preferably, the first helix angle $\beta_2$ is thirty degrees (30°), as detailed above. The second helix angle $\beta_2$ can be changed to change a stiffness of the mesh between the gears. The second helix angle $\beta_2$ is the same as the first helix angle $\beta_1$ to balance loads on the planet gear 1654 during operation. In some embodiments, the second helix angle $\beta_2$ is different than the first helix angle $\beta_1$.

The stiffness of the gears in the gearbox assembly affect the vibrations of the gearbox assembly, thereby effecting vibrations from the gearbox assembly to the low-speed shaft, and, thus, the length $L_{MSR}$ of the low-speed shaft and the MSR. For example, vibrations in the gearbox assembly (e.g., from the gears) propagate through the gearbox assembly, thereby vibrating the gearbox assembly, and the vibrations can propagate through to the low-speed shaft. Accordingly, the gear teeth type and an angle (e.g., the helix angle) of the gear teeth can be selected to achieve a particular vibrational response in the gearbox assembly so as to avoid exciting the low-speed shaft when the low-speed shaft is operating subcritical, as detailed further below.

Figure 17:
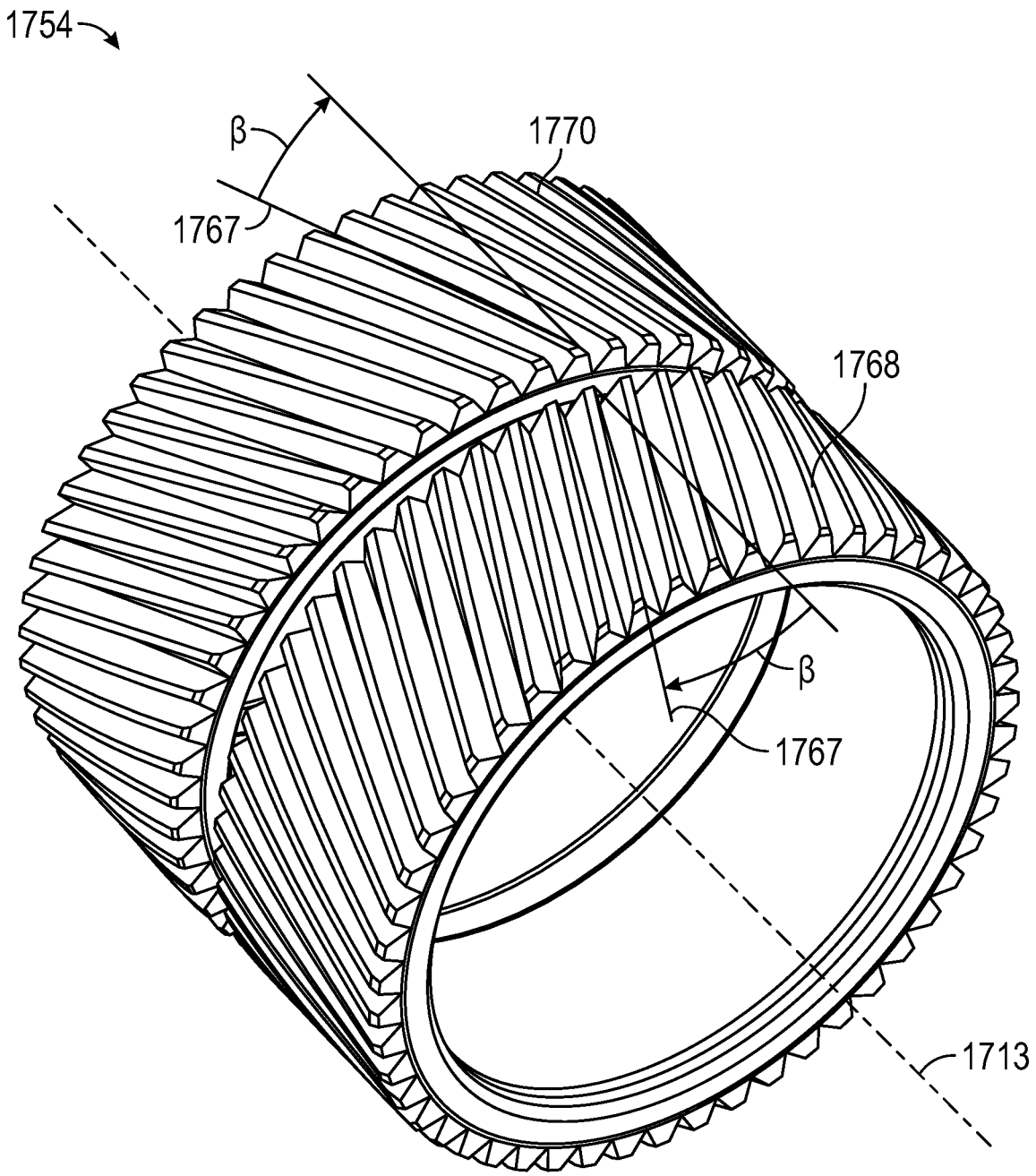
FIG. 17 shows a schematic view of a planet gear having a single stage for a gearbox assembly.

FIG. 17 is a schematic view of a planet gear 1754 having a single stage for a gearbox assembly (e.g., any of the gearbox assemblies detailed herein), according to the present disclosure. The single stage gear can be used in gearbox assemblies for gas turbine engines having lower gear ratios (e.g., less than 7:1). While the planet gear is described herein, the following description is applicable to any of the gears of the gearbox assembly. The planet gear 1754 is a bihelical gear, similar to the planet gear 1654 of FIG. 16B. The planet gear 1754 includes a first set of planet gear teeth 1768 and a second set of planet gear teeth 1770. The first set of planet gear teeth 1768 are mirrored with respect to the second set of planet gear teeth 1770 such that the gear teeth are in a "herringbone" pattern.

Each planet gear tooth of the first set of planet gear teeth 1768 and the second set of planet gear teeth 1770 defines a helix axis 1767 along a length of each respective gear tooth of the planet gear 1754. The helix axis 1767 is normal to an end face of each respective gear tooth of the planet gear 1754. The helix axis 1767 is disposed at a helix angle $\beta$ with respect to an axis 1713 (e.g., with respect to the axis of rotation of the gear) of the planet gear 1754. The helix angle $\beta$ is in a range of twenty-two point five degrees (22.5°) to thirty-two point five degrees (32.5°). Preferably, the helix angle $\beta$ is twenty-five degrees (25°) to increase the stiffness of the mesh while accounting for the considerations above for gearboxes with a gear ratio less than 7:1. The helix angle $\beta$ can be changed to change a stiffness of the mesh between the gears. The helix angle $\beta$ can be changed to change a stiffness of the gears, and, therefore, a vibratory response in the gearbox assembly, as detailed above.

Figure 18:
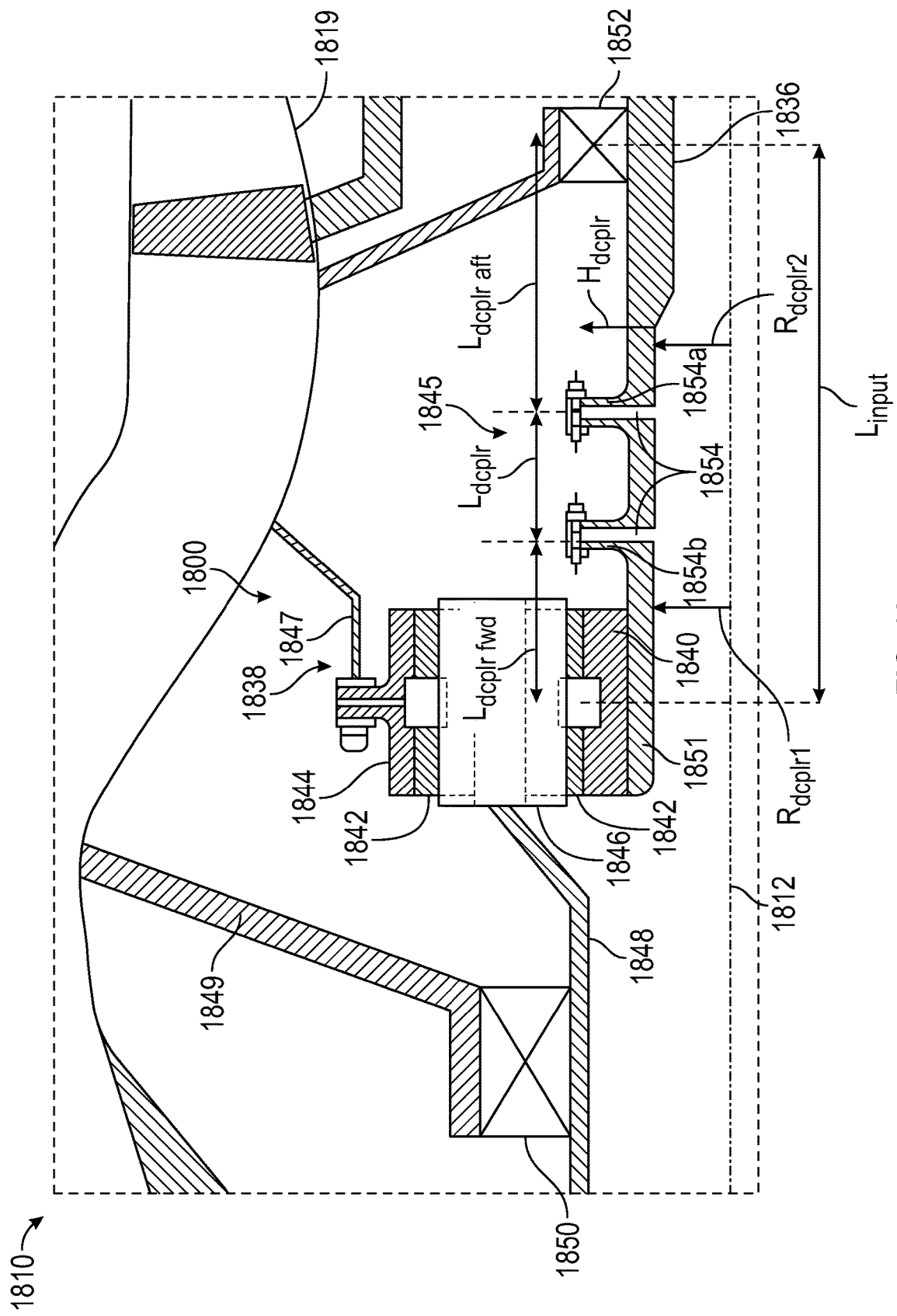
FIG. 18 shows an enlarged, schematic side cross-sectional view of a gearbox assembly with a mounting assembly for a gas turbine engine, taken at a centerline axis of the gas turbine engine.

FIG. 18 illustrates an enlarged, schematic side cross-sectional view of a gearbox assembly 1838 with a mounting assembly 1800 for a gas turbine engine 1810, taken at a centerline axis 1812 of the gas turbine engine 1810. The gearbox assembly 1838 can be utilized as any of the gearbox assemblies and the gas turbine engine 1810 can be any of the gas turbine engines detailed herein. The gearbox assembly 1838 is substantially similar to the gearbox assembly 938 of FIGS. 9A and 9B and includes a planetary configuration. For example, the gearbox assembly 1838 includes a sun gear 1840, a plurality of planet gears 1842, a ring gear 1844, a low-speed shaft 1836 coupled to the sun gear 1840. The sun gear 1840 is coupled via a flex coupling 1845 to the low-speed shaft 1836. The plurality of planet gears 1842 are coupled together by a planet carrier 1846. In the embodiment of FIG. 18, the planet carrier 1846 is coupled, via a fan shaft 1848, to a fan (e.g., any of the fans or fan assemblies detailed herein) to drive rotation of the fan about the centerline axis 1812. The fan shaft 1848 is coupled to a fan frame 1849 via a fan bearing 1850. The ring gear 1844 is coupled via a flex mount 1847 to an engine static structure 1819. The flex coupling 1845, the flex mount 1847, and the fan frame 1849 define the mounting assembly 1800 for the gearbox assembly 1838. As described herein, the flex coupling 1845, the flex mount 1847, and the fan frame 1849 may be referred to as mounting members.

In FIG. 18, the flex coupling 1845 is part of an input shaft 1851 that extends from a forward bearing 1852 of the low-speed shaft 1836 to the sun gear 1840 (e.g., to an axially center of the sun gear 1840). The flex coupling 1845 is also referred to as a decoupler, and includes one or more flex plates 1854 that absorb and reduce deflections and vibrations from propagating from the gearbox assembly 1838 to the low-speed shaft 1836 or from the low-speed shaft 1836 to the gearbox assembly 1838. In the embodiment shown in FIG. 18, the one or more flex plates 1854 include a first flex plate 1854a and a second flex plate 1854b spaced axially from each other along the input. The one or more flex plates 1854 can include any number of flex plates located at any axial position along the input, as desired. The flex plates 1854 are integral with the flex coupling 1845 and include axial gaps that absorb the deflections in an axial direction so that propagation of the deflections through the flex coupling 1845 is reduced. Accordingly, the flex coupling 1845 can be tuned or can be changed to achieve a particular desired vibrational frequency response such that vibrations of the gearbox assembly 1838 do not excite the low-speed shaft 1836 when the redline speed is subcritical.

The input shaft 1851 includes an input shaft length $L_{input}$ that extends axially from the forward bearing 1852 to the sun gear 1840 (e.g., an axial center of the sun gear 1840). The input shaft length $L_{input}$ is equal to an aft decoupler length $L_{dcplr\_aft}$, a decoupler length $L_{dcplr}$, and a forward decoupler length $L_{dcplr\_fwd}$ added together. The aft decoupler length $L_{dcplr\_aft}$ extends from the forward bearing 1852 to the first flex plate 1854a, the decoupler length $L_{dcplr}$ extends from the first flex plate 1854a to the second flex plate 1854b, and the forward flex length $L_{dcplr\_fwd}$ extends from the second flex plate 1854b to the sun gear 1840 (e.g., to an axially center of the sun gear 1840). The flex coupling 1845 also includes a decoupler height $H_{dcplr}$ and one or more decoupler radii. The decoupler height is a height of the flex plates 1854 in the radial direction from the input shaft 1851. The one or more decoupler radii is an inner radius of the input shaft 1851. The one or more decoupler radii include a first decoupler radius $R_{dcplr1}$ and a second decoupler radius $R_{dcplr2}$. In the embodiment of FIG. 18, the first decoupler radius $R_{dcplr1}$ is equal to the second decoupler radius $R_{dcplr2}$ such that the input shaft 1851 has a constant inner radius. In some embodiments the first decoupler radius $R_{dcplr1}$ is different than the second decoupler radius $R_{dcplr2}$ such that the input shaft 1851 has a variable inner radius (e.g., the inner radius of the input shaft 1851 changes along the axial direction).

In consideration of midshaft operating speeds, whether during an aircraft maximum thrust at takeoff, redline or cruise operating condition, it is desirable to have any anticipated dynamic loading of the gearbox caused by midshaft motion to not act as to amplify or excite fundamental or principle mode(s) of the gearbox through the sun gear—midshaft coupling. It is also desirable to avoid a dynamic excitation communicated through the sun gear/midshaft coupling and influenced by modal characteristics (represented generally by model frequency $F_{GBX}$) of the gearbox assembly to act as to excite fundamental mode(s) of the midshaft. To achieve this end result, it is desirable to have a decoupler moment stiffness $KM_{dcplr}$ of the flex coupling 1845 and a decoupler shear stiffness $KS_{dcplr}$ of the flex coupling 1845 (e.g., a moment stiffness and a shear stiffness at the sun gear-midshaft coupling) being such as to neither cause significant excitation of a fundamental midshaft mode, nor a dynamic excitation from the midshaft communicated at this coupling to cause significant excitation of a fundamental mode of the gearbox assembly. The decoupler moment stiffness $KM_{dcplr}$ is an overturning moment stiffness of the flex coupling 1845 (e.g., a torque of the flex coupling 1845 applied radially on the flex coupling 1845), including the decoupler moment stiffness of the first flex plate 1854a and the decoupler moment stiffness of the second flex plate 1854b. The decoupler shear stiffness $KS_{dcplr}$ is a stiffness of the flex coupling 1845 (e.g., between the first flex plate 1854a and the second flex plate 1854b) in the axial direction. The stiffness of the flex coupling 1845 (e.g., the decoupler moment stiffness $KM_{dcplr}$ and the decoupler shear stiffness $KS_{dcplr}$) should be selected so as to not amplify midshaft properties or so as not excite the gearbox assembly 1838 by midshaft dynamic behavior during engine operation.

Various rig tests and measurements taken to simulate engine operational conditions, accounting for any differences between a dynamic response for a recently fielded engine and an engine after several operational cycles, revealed common patterns in dynamic behavior for midshaft-gearbox interactions to inform the design of the flex coupling 1845 to avoid the modal coupling between gearbox and midshaft explained above. It was found that a decoupler moment stiffness $KM_{dcplr}$ of the flex coupling 1845 in a range of 50 klb*in/rad to 200 klb*in/rad, and a decoupler shear stiffness $KS_{dcplr}$ of the flex coupling 1845 in a range of 100 klb/in to 500 klb/in, should substantially avoid intolerable or sustained dynamic amplification of the gearbox assembly 1838 or the midshaft (e.g., the low-speed shaft) when there is excitation of either the gearbox assembly 1838 or the midshaft during engine operations. In this way, the flex coupling 1845 prevents the gearbox assembly 1838 from dynamically exciting the midshaft, and prevents the midshaft from dynamically exciting the gearbox assembly 1838. The decoupler moment stiffness $KM_{dcplr}$ of the flex coupling 1845 is expressed in klb*in/rad, and the decoupler shear stiffness $KS_{dcplr}$ of the flex coupling 1845 is expressed in klb/in. In view of the foregoing, the decoupler moment stiffness $KM_{dcplr}$ of the flex coupling 1845 and the decoupler shear stiffness $KS_{dcplr}$ of the flex coupling 1845 are desired to satisfy the relationships (2) and (3), respectively:

$$KM_{dcplr} = \frac{E * K_m * R_{dcplr}^4}{H_{dcplr}} \qquad (2)$$

$$KS_{dcplr} = \frac{E * K_m * R_{dcplr}^4}{L_{dcplr}^2} \qquad (3)$$

In the relationships (2) and (3), E is the Young's modulus for the particular material of the flex coupling 1845 expressed in lb/in$^2$, $K_m$ is a correction factor for the decoupler moment stiffness $KM_{dcplr}$ and for the decoupler shear moment $KS_{dcplr}$ to account for various different materials that the flex coupling 1845 could be made of, $R_{dcplr}$ is the decoupler radius (e.g., the first decoupler radius $R_{dcplr1}$ and/or the second decoupler radius $R_{dcplr2}$) expressed in inches, $H_{dcplr}$ is the decoupler height (e.g., of the one or more flex plates 1854) expressed in inches, and $L_{dcplr}$ is a length of the flex coupling 1845 (e.g., an axial length that extends from the first flex plate 1854a to the second flex plate 1854b) expressed in inches. The material of flex coupling 1845 can include, for example, metal alloys, titanium, steel, or the like. The $K_m$ correction factor is a constant and is in a range of $0.13 \times 10^{-3}$ to $0.27 \times 10^{-3}$.

The decoupler moment stiffness is a function of an aft decoupler moment stiffness $KM_{dcplr\_aft}$ of the first flex plate 1854a and/or a forward decoupler moment stiffness $KM_{dcplr\_fwd}$ of the second flex plate 1854b. The aft decoupler moment stiffness $KM_{dcplr\_aft}$ is approximately equal to the forward decoupler moment stiffness $KM_{dcplr\_fwd}$. In some embodiments, the aft decoupler moment stiffness KMaft is different than the forward decoupler moment stiffness KMfwd. For example, the forward decoupler moment stiffness $KM_{dcplr\_fwd}$ can be two to three (2 to 3) times the aft decoupler moment stiffness $KM_{dcplr\_aft}$. In some embodiments, the aft decoupler moment stiffness $KM_{dcplr\_aft}$ is two to three (2 to 3) times the forward decoupler moment stiffness $KM_{dcplr\_fwd}$.

The stiffness of the flex coupling 1845 can be modified to produce significant changes in the critical speed. Embodiments are listed in TABLE 6. These embodiments were considered as possible designs that could modify the effective stiffness of the flex coupling 1845 in such a way to be compatible with engine architecture and without requiring modifications or limitations on the targeted operating range for a subcritical shaft.

TABLE 6

| Emb. | Description | $L_{MSR}$ (in) | $D_{MSR}$ (in) | E/rho (in$^{-1}$) | Teff (in) | Mode (RPM) | $L_{MSR}/D_{MSR}$ | Redline ODR Speed (ft/sec) | MSR (ft/sec)$^{1/2}$ |
|---|---|---|---|---|---|---|---|---|---|
| 33 | 4-bearing system, including bottle boring, with a gearbox having 200 klb/in effective shear stiffness | 60.6 | 2.80 | 1.30E+08 | 0.32 | 9208 | 22 | 111 | 231 |
| 34 | 4-bearing system, including bottle boring, | 60.6 | 2.80 | 1.30E+08 | 0.32 | 10238 | 22 | 123 | 244 |

TABLE 6-continued

| Emb. | Description | $L_{MSR}$ (in) | $D_{MSR}$ (in) | E/rho (in$^{-1}$) | Teff (in) | Mode (RPM) | $L_{MSR}/D_{MSR}$ | Redline ODR Speed (ft/sec) | MSR (ft/sec)$^{1/2}$ |
|---|---|---|---|---|---|---|---|---|---|
| | with a gearbox having 500 klb/in effective shear stiffness | | | | | | | | |
| 35 | 4-bearing system, including bottle boring, with a gearbox having 200 klb/in effective shear stiffness and 50 klb*in/rad effective moment stiffness | 60.6 | 2.80 | 1.30E+08 | 0.32 | 9467 | 22 | 114 | 235 |
| 36 | 4-bearing system, including bottle boring, with a gearbox having 500 klb/in effective shear stiffness and 200 klb*in/rad effective moment stiffness | 60.6 | 2.80 | 1.30E+08 | 0.32 | 11587 | 22 | 140 | 259 |

Embodiments 33, 34, 35, and 36 all use a steel alloy material composition. Embodiments 33 to 36 all use a four-bearing system, and all have a convex thickness profile similar to the example of FIG. 6C, having been manufactured with a bottle boring manufacturing technique. These embodiments include the same bearing arrangement, but differ from each other in terms of stiffness (e.g., decoupler shear stiffness and/or decoupler moment stiffness). The values shown in TABLE 6 illustrate that embodiments 34 and 36 achieve a greater stiffness (e.g., the decoupler shear stiffness and/or the decoupler moment stiffness) than embodiments 33 and 35, respectively, generally resulting in substantially higher redline speeds and correspondingly higher MSR.

To further achieve the end result of avoiding a dynamic excitation communicated through the sun gear-midshaft coupling, it is desirable to have an effective gearbox assembly stiffness $K_{GBX}$ (representing the combined stiffness properties of the gearbox couplings and mounts, the deflection limiters, dampers, and the gears of the gearbox assembly in the lateral direction, the bending direction, and/or the torsional direction, as detailed above) and mass $M_{GBX}$ representation of the gearbox assembly at the sun-gear midshaft coupling being such as to neither cause significant excitation of a fundamental midshaft mode, nor a dynamic excitation from the midshaft communicated at this coupling to cause significant excitation of a fundamental mode of the gearbox assembly, wherein the associated modal frequency of the gearbox assembly mode at the sun gear—midshaft coupling is represented by the term $(K_{GBX}/M_{GBX})^{1/2}$. The fundamental modal properties of the gearbox assembly, $F_{GBX}$, should not therefore act as to amplify midshaft properties or be excitable by midshaft dynamic behavior during engine operation.

Various rig tests and measurements taken to simulate engine operational conditions, accounting for any differences between a dynamic response for a recently fielded engine and an engine after several operational cycles, revealed common patterns in dynamic behavior for midshaft-gearbox interactions to inform the design of gearbox assemblies to avoid the modal coupling between gearbox and midshaft explained above. It was found that a gearbox assembly mode $F_{GBX}$ less than ninety five percent (95%), or greater than one hundred five percent (105%) of the midshaft mode $F_{MIDSHAFT}$ (i.e., the bending mode associated with the midshaft critical speed) should substantially avoid intolerable or sustained dynamic amplification of gearbox or midshaft primary modes (i.e., $F_{GBX}$, $F_{MIDSHAFT}$ respectively) when there is excitation of either these modes during engine operations. In this way, the gearbox assembly mode $F_{GBX}$ is prevented from affecting the midshaft mode $F_{MIDSHAFT}$. The redline speed for a midshaft as expressed in Hertz is $(MSR/(L_{MSR}/D_{MSR}))^2*12/(\pi D_{MSR})$, where $L_{MSR}$ is the length L of the midshaft and $D_{MSR}$ is the outer diameter D of the midshaft. The gearbox assembly mode $F_{GBX}$ in Hertz, in radians/sec as it influences the mid-shaft behavior, or the midshaft affecting gearbox dynamic behavior, is $$\sqrt{\frac{K_{GBX}}{M_{GBX}}}/2\pi,$$

where $K_{GBX}$ is the gearbox assembly stiffness and $M_{GBX}$ is the gearbox assembly mass representation at the sun gear—midshaft coupling. In view of the foregoing, the desired gearbox assembly modal properties at the sun gear—midshaft coupling are desired to satisfy either of the relationships (4) and (5):

$$11.4\,(MSR/(L_{MSR}/D_{MSR}))^\wedge 2/(\pi D_{MSR}) > \sqrt{\frac{K_{GBX}}{M_{GBX}}}/2\pi \quad (4)$$

$$12.6\,(MSR/(L_{MSR}/D_{MSR}))^\wedge 2/(\pi D_{MSR}) < \sqrt{\frac{K_{GBX}}{M_{GBX}}}/2\pi \quad (5)$$

Figure 19A:
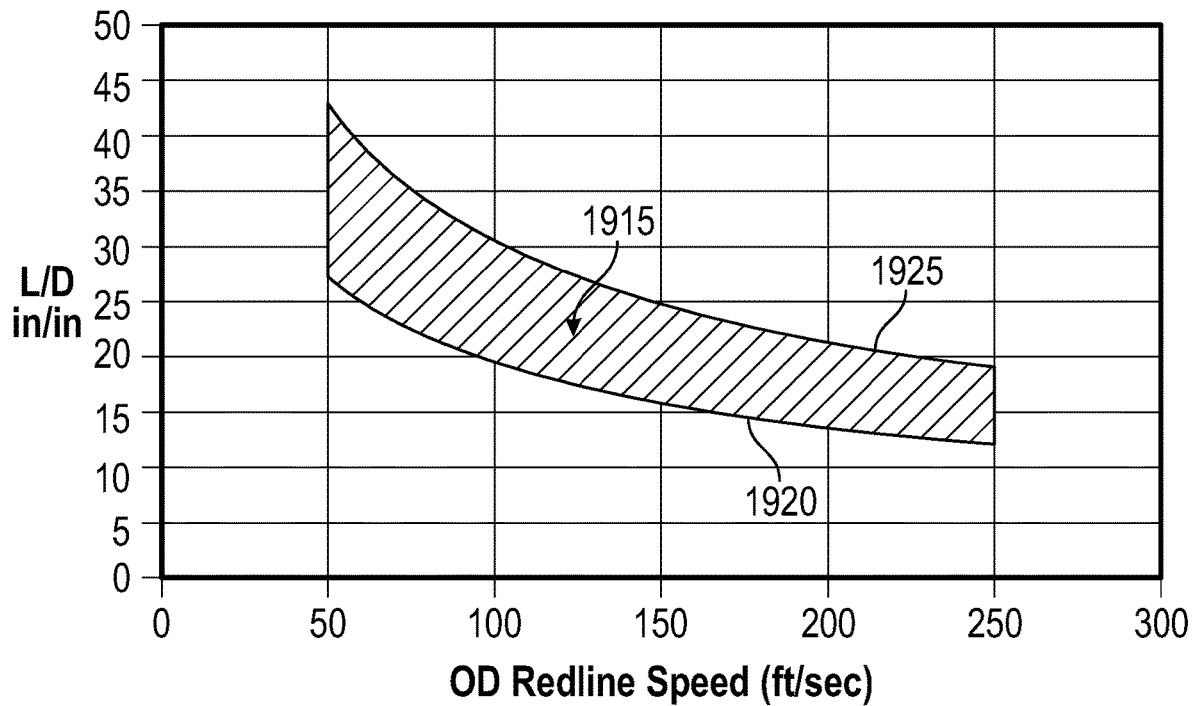
FIG. 19A shows a plot depicting a range of a midshaft rating relative to a range of outer diameter redline speeds.

FIG. 19A illustrates examples of ranges and/or values for a midshaft rating, with respect to OD speed at redline. The plot indicates values for the midshaft rating (MSR). Specifically, FIG. 19A shows a range 1915 defined by MSR between 200 (ft/sec)$^{-1}$ (curve 1920) and 300 (ft/sec)$^{-1}$ (curve 1925), for redline speeds from fifty to two hundred and fifty feet per second.

Figure 19B:
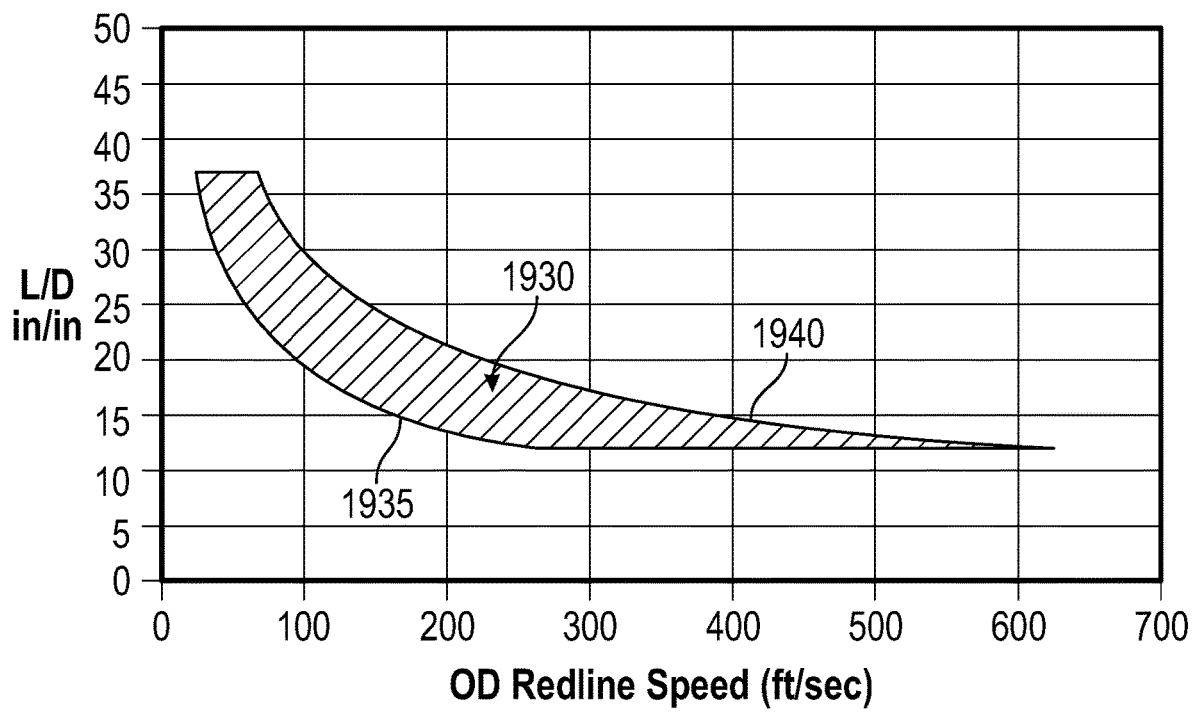
FIG. 19B shows a plot depicting a range of a midshaft rating relative to a range of length-diameter ratios.

FIG. 19B illustrates ranges and/or values for a midshaft rating, with respect to L/D ratio. The plot indicates values for the midshaft rating (MSR). Specifically, FIG. 19B shows a range 1930 defined by MSR between 200 (ft/sec)$^{-1}$ (curve 1935) and 300 (ft/sec)$^{-1}$ (curve 1940), for L/D ratios from twelve to thirty-seven.

Further aspects of the present disclosure are provided by the subject matter of the following clauses.

A turbomachine engine includes a core engine having one or more compressor sections, one or more turbine sections that includes a power turbine, and a combustion chamber in flow communication with the compressor sections and turbine sections. The turbomachine engine also includes a shaft that is coupled to the power turbine and that is characterized by a midshaft rating (MSR) between two hundred (ft/sec)$^{1/2}$ and three hundred (ft/sec)$^{1/2}$, and a redline speed between fifty and two hundred fifty feet per second (ft/sec).

A turbomachine engine includes a core engine having one or more compressor sections, one or more turbine sections that includes a power turbine, and a combustion chamber in flow communication with the compressor sections and turbine sections. The turbomachine engine also includes a shaft that is coupled to the power turbine and that is characterized by a midshaft rating (MSR) between two hundred (ft/sec)$^{1/2}$ and three hundred (ft/sec)$^{1/2}$, a length L, an outer diameter D, and a ratio of L/D between twelve and thirty-seven.

The turbomachine engine of any preceding clause, wherein the turbomachine engine is configured to operate up to a redline speed without passing through a critical speed associated with a first-order bending mode of the shaft.

The turbomachine engine of any preceding clause, wherein the turbomachine engine is configured to operate up to the redline speed without passing through a critical speed associated with a first-order bending mode of the shaft.

The turbomachine engine of any preceding clause, wherein the MSR is between one hundred ninety (ft/sec)$^{1/2}$ and two hundred forty-five (ft/sec)$^{1/2}$.

The turbomachine engine of any preceding clause, wherein the MSR is between two hundred twelve (ft/sec)$^{1/2}$ and two hundred sixty (ft/sec)$^{1/2}$.

The turbomachine engine of any preceding clause, wherein the MSR is between two hundred forty-seven (ft/sec)$^{1/2}$ and two hundred ninety (ft/sec)$^{1/2}$.

The turbomachine engine of any preceding clause, wherein the redline speed is between sixty and ninety ft/sec.

The turbomachine engine of any preceding clause, wherein the redline speed is between seventy-five and one hundred seventy-five ft/sec.

The turbomachine engine of any preceding clause, wherein the redline speed is between one hundred fifty and two hundred fifty ft/sec.

The turbomachine engine of any preceding clause, wherein the ratio of L/D is between twelve and twenty.

The turbomachine engine of any preceding clause, wherein the ratio of L/D is between sixteen and thirty.

The turbomachine engine of any preceding clause, wherein the ratio of L/D is between twenty-six and thirty-seven.

The turbomachine engine of any preceding clause, wherein the shaft is a composite shaft made of at least two different materials.

The turbomachine engine of any preceding clause, wherein the shaft has a length L and a reduced mass density at a midpoint along the length L.

The turbomachine engine of any preceding clause, wherein the shaft has a reduced mass density at a midpoint along the length L.

The turbomachine engine of any preceding clause, wherein the shaft is a hollow convex shaft with a reduced wall thickness at the midpoint, a variable inner diameter, and a constant outer diameter.

The turbomachine engine of any preceding clause, wherein the shaft is a hollow convex shaft with a reduced wall thickness at the midpoint, a constant inner diameter, and a variable outer diameter.

The turbomachine engine of any preceding clause, wherein the shaft is coupled to the power turbine at a first mounting point, and wherein the shaft is also coupled to one of the compressor sections at a second mounting point.

The turbomachine engine of any preceding clause, wherein the shaft is supported by at least a first bearing and a second bearing.

The turbomachine engine of any preceding clause, wherein the shaft has a length L that is measured as the distance between the first bearing and the second bearing.

The turbomachine engine of any preceding clause, wherein the length L is measured as the distance between the first bearing and the second bearing.

The turbomachine engine of any preceding clause, wherein at least one bearing is a duplex bearing that has an overturning moment capability.

The turbomachine engine of any preceding clause, wherein each bearing is one of a ball bearing and a roller bearing.

The turbomachine engine of any preceding clause, wherein the first bearing is positioned between the first mounting point and the second mounting point, and wherein the second mounting point is positioned between the first bearing and the second bearing.

The turbomachine engine of any preceding clause, wherein the first bearing and the second bearing support the shaft in an inbound configuration in which the first bearing and the second bearing are positioned between the first mounting point and the second mounting point.

The turbomachine engine of any preceding clause, wherein the first bearing and the second bearing support the shaft in an outbound configuration in which the first mounting point and the second mounting point are positioned between the first bearing and the second bearing.

The turbomachine engine of any preceding clause, wherein the shaft is further supported by a third bearing and a fourth bearing.

The turbomachine engine of any preceding clause, wherein the first bearing and the second bearing are a first pair of duplex bearings, and the third bearing and the fourth bearing are a second pair of duplex bearings, wherein the first pair of duplex bearings and the second pair of duplex bearings support the shaft in an inbound overturning moment configuration in which the first pair of duplex bearings and the second pair of duplex bearings are positioned between the first mounting point and the second mounting point.

The turbomachine engine of any preceding clause, wherein the first bearing and the second bearing are a first pair of duplex bearings, and the third bearing and the fourth bearing are a second pair of duplex bearings, wherein the first pair of duplex bearings and the second pair of duplex bearings support the shaft in an outbound overturning moment configuration in which the first mounting point and the second mounting point are positioned between the first pair of duplex bearings and the second pair of duplex bearings.

The turbomachine engine of any preceding clause, wherein the first bearing, the second bearing, the third bearing, and the fourth bearing support the shaft in a four-bearing straddle configuration in which the first bearing and the second bearing are positioned between the first mounting point and the second mounting point, and the first mounting point and the second mounting point are positioned between the third bearing and the fourth bearing.

The turbomachine engine of any preceding clause, wherein the first bearing, the second bearing, the third bearing, and the fourth bearing support the shaft in a four-bearing outbound configuration in which the first mounting point and the second mounting point are positioned between a first group of bearings comprising the first bearing and the second bearing, and a second group of bearings comprising the third bearing and the fourth bearing.

In another aspect, a method includes using a turbomachine engine with a core having one or more compressor sections, one or more turbine sections that includes a power turbine, and a combustion chamber in flow communication with the compressor sections and turbine sections. The method also includes driving a shaft that is coupled to the power turbine and that is characterized by a midshaft rating (MSR) between two hundred $(ft/sec)^{1/2}$ and three hundred $(ft/sec)^{1/2}$, and a redline speed between fifty and two hundred fifty feet per second (ft/sec).

In another aspect, a method includes using a turbomachine engine with a core having one or more compressor sections, one or more turbine sections that includes a power turbine, and a combustion chamber in flow communication with the compressor sections and turbine sections. The method also includes driving a shaft that is coupled to the power turbine and that is characterized by a midshaft rating (MSR) between two hundred $(ft/sec)^{1/2}$ and three hundred $(ft/sec)^{1/2}$, a length L, an outer diameter D, and a ratio of L/D between twelve and thirty-seven.

The method of any preceding clause, wherein the turbomachine engine is configured to operate up to a redline speed without passing through a critical speed associated with a first-order bending mode of the shaft.

The method of any preceding clause, wherein the turbomachine engine is configured to operate up to the redline speed without passing through a critical speed associated with a first-order bending mode of the shaft.

The method of any preceding clause, wherein the MSR is between one hundred ninety $(ft/sec)^{1/2}$ and two hundred forty-five $(ft/sec)^{1/2}$.

The method of any preceding clause, wherein the MSR is between two hundred twelve $(ft/sec)^{1/2}$ and two hundred sixty $(ft/sec)^{1/2}$.

The method of any preceding clause, wherein the MSR is between two hundred forty-seven $(ft/sec)^{1/2}$ and two hundred ninety $(ft/sec)^{1/2}$.

The method of any preceding clause, wherein the redline speed is between sixty and ninety ft/sec.

The method of any preceding clause, wherein the redline speed is between seventy-five and one hundred seventy-five ft/sec.

The method of any preceding clause, wherein the redline speed is between one hundred fifty and two hundred fifty ft/sec.

The method of any preceding clause, wherein the ratio of L/D is between twelve and twenty.

The method of any preceding clause, wherein the ratio of L/D is between sixteen and thirty.

The method of any preceding clause, wherein the ratio of L/D is between twenty-six and thirty-seven.

The method of any preceding clause, wherein the shaft is a composite shaft made of at least two different materials.

The method of any preceding clause, wherein the shaft has a length L and a reduced mass density at a midpoint along the length L.

The method of any preceding clause, wherein the shaft has a reduced mass density at a midpoint along the length L.

The method of any preceding clause, wherein the shaft is a hollow convex shaft with a reduced wall thickness at the midpoint, a variable inner diameter, and a constant outer diameter.

The method of any preceding clause, wherein the shaft is a hollow convex shaft with a reduced wall thickness at the midpoint, a constant inner diameter, and a variable outer diameter.

The method of any preceding clause, wherein the shaft is coupled to the power turbine at a first mounting point, and wherein the shaft is also coupled to one of the compressor sections at a second mounting point.

The method of any preceding clause, wherein the shaft is supported by at least a first bearing and a second bearing.

The method of any preceding clause, wherein the shaft has a length L that is measured as the distance between the first bearing and the second bearing.

The method of any preceding clause, wherein the length L is measured as the distance between the first bearing and the second bearing.

The method of any preceding clause, wherein at least one bearing is a duplex bearing that has an overturning moment capability.

The method of any preceding clause, wherein each bearing is one of a ball bearing and a roller bearing.

The method of any preceding clause, wherein the first bearing is positioned between the first mounting point and the second mounting point, and wherein the second mounting point is positioned between the first bearing and the second bearing.

The method of any preceding clause, wherein the first bearing and the second bearing support the shaft in an inbound configuration in which the first bearing and the second bearing are positioned between the first mounting point and the second mounting point.

The method of any preceding clause, wherein the first bearing and the second bearing support the shaft in an outbound configuration in which the first mounting point and the second mounting point are positioned between the first bearing and the second bearing.

The method of any preceding clause, wherein the shaft is further supported by a third bearing and a fourth bearing.

The method of any preceding clause, wherein the first bearing and the second bearing are a first pair of duplex bearings, and the third bearing and the fourth bearing are a second pair of duplex bearings, wherein the first pair of duplex bearings and the second pair of duplex bearings support the shaft in an inbound overturning moment configuration in which the first pair of duplex bearings and the second pair of duplex bearings are positioned between the first mounting point and the second mounting point.

The method of any preceding clause, wherein the first bearing and the second bearing are a first pair of duplex bearings, and the third bearing and the fourth bearing are a second pair of duplex bearings, wherein the first pair of duplex bearings and the second pair of duplex bearings support the shaft in an outbound overturning moment configuration in which the first mounting point and the second mounting point are positioned between the first pair of duplex bearings and the second pair of duplex bearings.

The method of any preceding clause, wherein the first bearing, the second bearing, the third bearing, and the fourth bearing support the shaft in a four-bearing straddle configuration in which the first bearing and the second bearing are positioned between the first mounting point and the second mounting point, and the first mounting point and the second mounting point are positioned between the third bearing and the fourth bearing.

The method of any preceding clause, wherein the first bearing, the second bearing, the third bearing, and the fourth bearing support the shaft in a four-bearing outbound configuration in which the first mounting point and the second mounting point are positioned between a first group of bearings comprising the first bearing and the second bearing, and a second group of bearings comprising the third bearing and the fourth bearing.

A turbomachine engine comprising a fan section having a fan shaft, a core engine including one or more compressor sections, one or more turbine sections that includes a power turbine, and a combustion chamber in flow communication with the compressor sections and turbine sections, a low-speed shaft coupled to the power turbine and having a midshaft that extends from a forward bearing to an aft bearing, the low-speed shaft being characterized by a midshaft rating (MSR) between two hundred $(ft/sec)^{1/2}$ and three hundred $(ft/sec)^{1/2}$, the low-speed shaft having a redline speed between fifty and two hundred fifty feet per second (ft/sec), and the turbomachine engine being configured to operate up to the redline speed without passing through a critical speed associated with a first-order bending mode of the low-speed shaft, and a gearbox assembly that couples the fan shaft to the low-speed shaft, the gearbox assembly being characterized by a gearbox assembly mode that is less than 95% of a midshaft mode of the midshaft or greater than 105% of the midshaft mode.

The turbomachine engine of the preceding clause, the MSR being between one hundred ninety $(ft/sec)^{1/2}$ and two hundred forty-five $(ft/sec)^{1/2}$.

The turbomachine engine of any preceding clause, the MSR being between two hundred twelve $(ft/sec)^{1/2}$ and two hundred sixty $(ft/sec)^{1/2}$.

The turbomachine engine of any preceding clause, the MSR being between two hundred forty-seven $(ft/sec)^{1/2}$ and two hundred ninety $(ft/sec)^{1/2}$.

The turbomachine engine of any preceding clause, further comprising a flex mount that couples the gearbox assembly to an engine static structure of the turbomachine engine.

The turbomachine engine of any preceding clause, further comprising a fan frame that couples the fan shaft to an engine static structure, the fan frame connecting to the engine static structure forward of the one or more compressor sections.

The turbomachine engine of any preceding clause, further comprising a flex coupling that couples the gearbox assembly to the low-speed shaft.

The turbomachine engine of any preceding clause, the flex coupling being characterized by a decoupler moment stiffness in a range of 50 klb*in/rad to 200 klb*in/rad.

The turbomachine engine of any preceding clause, the flex coupling being characterized by a decoupler shear stiffness in a range of 100 klb/in to 500 klb/in.

The turbomachine engine of any preceding clause, the gearbox assembly including a deflection limiter that limits deflections of the gearbox assembly beyond a threshold level.

The turbomachine engine of any preceding clause, the deflection limiter limiting deflections of the gearbox assembly in an axial direction, a radial direction, and/or a circumferential direction.

The turbomachine engine of any preceding clause, the deflection limiter including one or more teeth and one or more gaps having one or more walls, the one or more teeth contacting the one or more walls to limit deflections of the gearbox assembly.

The turbomachine engine of any preceding clause, the one or more teeth extending in the circumferential direction, in the radial direction, and in the axial direction.

The turbomachine engine of any preceding clause, the one or more walls including a radially extending wall and a circumferentially extending wall.

The turbomachine engine of any preceding clause, the gearbox assembly including one or more dampers that damper vibrations of the gearbox assembly.

The turbomachine engine of any preceding clause, the one or more dampers including a squeeze film damper.

The turbomachine engine of any preceding clause, the one or more dampers including a dashpot damper.

The turbomachine engine of any preceding clause, wherein the gearbox assembly including a plurality of gears including a sun gear, a plurality of planet gears, and a ring gear.

The turbomachine engine of any preceding clause, the plurality of gears being helical gears.

The turbomachine engine of any preceding clause, the helical gears including a helix angle in a range of 22.5° to 32.5°.

The turbomachine engine of any preceding clause, the decoupler moment stiffness being equal to $$\frac{E * K_m * R_{dcplr}^4}{H_{dcplr}},$$

E being a Young's modulus of a material of the flex coupling, $K_m$ being a correction factor, $R_{dcplr}$ being a decoupler radius of the flex coupling, and $H_{dcplr}$ being a decoupler height of the flex coupling.

The turbomachine engine of any preceding clause, $K_m$ being in a range of $0.13\times10^3$ to $0.27\times10^{-3}$.

The turbomachine engine of any preceding clause, the decoupler shear stiffness being equal to $$\frac{E*K_m*R_{dcplr}^4}{L_{dcplr}^2},$$

wherein E being a Young's modulus of a material of the flex coupling, $K_m$ being a correction factor, $R_{dcplr}$ being a decoupler radius of the flex coupling, and $L_{dcplr}$ being a decoupler length of the flex coupling.

The turbomachine engine of any preceding clause, $K_m$ being in a range of $0.13\times10^3$ to $0.27\times10^{-3}$.

The turbomachine engine of any preceding clause, the turbomachine engine being an unducted fan engine.

The turbomachine engine of any preceding clause, the turbomachine engine being a ducted fan engine.

The turbomachine engine of any preceding clause, the gearbox assembly having a gear ratio of 4:1 to 12:1, or 7:1 to 12:1, or 4:1 to 10:1, or 5:1 to 9:1, or 6:1 to 9:1.

The turbomachine engine of any preceding clause, the gearbox assembly having a gear ratio of 3:1 to 4:1, 3:5 to 4:1, 3.25:1 to 3.5:1, or 4:1 to 5:1.

The turbomachine engine of any preceding clause, the gearbox assembly further including an oil transfer device that allows an oil flow of lubricant to flow into the gearbox assembly to lubricate the plurality of gears.

The turbomachine engine of any preceding clause, the deflection limiter including an outer rim and an inner rim, the inner rim moving towards the outer rim as the gearbox assembly deflects.

The turbomachine engine of any preceding clause, the deflection limiter located at the flex mount.

The turbomachine engine of any preceding clause, the flex mount coupled to the planet carrier.

The turbomachine engine of any preceding clause, the flex mount coupled to the ring gear.

The turbomachine engine of any preceding clause, the flex mount being coupled to the engine static structure by a torque cone.

The turbomachine engine of any preceding clause, the flex mount including an end seal.

The turbomachine engine of any preceding clause, the damper further comprising one or more springs.

The turbomachine engine of any preceding clause, the one or more springs including a radial flex element that dampers vibrations in the radial direction and a torsional flex element that dampens vibrations in the circumferential direction.

The turbomachine engine of any preceding clause, the inner rim and the outer rim being arranged such that the inner rim deflects radially towards the outer rim.

The turbomachine engine of any preceding clause, the inner rim and the outer rim being arranged such that the inner rim deflects axially towards the outer rim.

The turbomachine engine of any preceding clause, the ring gear including a damper having a flexible damping wall.

The turbomachine engine of any preceding clause, the plurality of planet gears including compound planet gears including a first stage planet gear and a second stage planet gear.

The turbomachine engine of any preceding clause, the first stage planet gear having a first helix angle in a range of 22.5° to 32.5°, and the second stage planet gear having a second helix angle in a range of 22.5° to 32.5°.

The turbomachine engine of any preceding clause, the plurality of planet gears including single stage planet gears.

The turbomachine engine of any preceding clause, the helix angle being thirty degrees (30°).

The turbomachine engine of any preceding clause, the gearbox assembly being decoupled from the low-speed shaft.

The turbomachine engine of any preceding clause, the flex coupling including a one or more flex plates that absorb deflections in the axial direction.

The turbomachine engine of any preceding clause, the one or more flex plates including a first flex plate and a second flex plate.

The turbomachine engine of any preceding clause, further comprising an electric machine.

The turbomachine engine of any preceding clause, the electric machine being coupled to the low-pressure shaft.

The turbomachine engine of any preceding clause, the electric machine being located aft of the power turbine.

The turbomachine engine of any preceding clause, the electric machine being an electric motor.

The turbomachine engine of any preceding clause, the electric machine being an electric generator.

The turbomachine engine of any preceding clause, the electric machine including a rotor and a stator, the rotor rotating with respect to the stator.

The turbomachine engine of any preceding clause, the rotor being coupled to the low-pressure shaft.

The turbomachine engine of any preceding clause, the rotor rotating with the low-pressure shaft.

The turbomachine engine of any preceding clause, the electric machine being a motor-generator.

A method includes using a turbomachine engine with a fan section having a fan shaft, and a core engine having one or more compressor sections, one or more turbine sections that includes a power turbine, and a combustion chamber in flow communication with the compressor sections and turbine sections. The method also includes driving a low-speed shaft that is coupled to the power turbine and that has a midshaft that extends from a forward bearing to an aft bearing, and that is characterized by a midshaft rating (MSR) between two hundred $(ft/sec)^{1/2}$ and three hundred $(ft/sec)^{1/2}$, and a redline speed between fifty and two hundred fifty feet per second (ft/sec). The method further comprises operating the low-speed shaft at a linear speed up to the redline speed without passing through a critical speed associated with a first-order bending mode of the low-speed shaft, and the low-speed shaft has a midshaft that extends from a forward bearing to an aft bearing. The turbomachine further includes a gearbox assembly that couples the fan shaft to the low-speed shaft, the gearbox assembly characterized by a gearbox assembly mode less than 95% of a midshaft mode of the midshaft or greater than 105% of the midshaft mode.

The method of the preceding clause, the turbomachine engine being the turbomachine engine of any preceding clause.

The method of any preceding clause, further comprising driving the low-speed shaft with an electric machine.

The method of any preceding clause, further comprising driving the low-speed shaft to generate electric power in an electric machine.

The method of any preceding clause, further comprising driving a rotor of the electric machine with the low-speed shaft.

Although the foregoing description is directed to certain embodiments, other variations and modifications will be apparent to those skilled in the art, and may be made without departing from the spirit or scope of the disclosure. Moreover, features described in connection with one embodiment may be used in conjunction with other embodiments, even if not explicitly stated above.

The invention claimed is:

1. A turbomachine engine comprising:
a fan section having a fan shaft;
a core engine including one or more compressor sections, one or more turbine sections that includes a power turbine, and a combustion chamber in flow communication with the compressor sections and turbine sections;
a low-speed shaft coupled to the power turbine and characterized by a midshaft rating (MSR) between two hundred (ft/sec)$^{1/2}$ and three hundred (ft/sec)$^{1/2}$, wherein the low-speed shaft has a redline speed between fifty and two hundred fifty feet per second (ft/sec), and the turbomachine engine is configured to operate up to the redline speed without passing through a critical speed associated with a first-order bending mode of the low-speed shaft;
a gearbox assembly that couples the fan shaft to the low-speed shaft; and
a flex coupling that couples the gearbox assembly to the low-speed shaft, the flex coupling including one or more flex plates that include gaps that absorb deflections in the low-speed shaft.

2. The turbomachine engine of claim 1, wherein the MSR is between two hundred (ft/sec)$^{1/2}$ and two hundred forty-five (ft/sec)$^{1/2}$.

3. The turbomachine engine of claim 1, wherein the MSR is between two hundred twelve (ft/sec)$^{1/2}$ and two hundred sixty (ft/sec)$^{1/2}$.

4. The turbomachine engine of claim 1, wherein the MSR is between two hundred thirty-one (ft/sec)$^{1/2}$ and two hundred fifty-nine (ft/sec)$^{1/2}$.

5. The turbomachine engine of claim 1, wherein the MSR is between two hundred forty-seven (ft/sec)$^{1/2}$ and two hundred eighty-seven (ft/sec)$^{1/2}$.

6. The turbomachine engine of claim 1, wherein the redline speed is in a range of one hundred eleven (ft/sec) to one hundred forty (ft/sec).

7. The turbomachine engine of claim 1, wherein the low-speed shaft includes a forward bearing, and the one or more flex plates are positioned on the low-speed shaft axially between the forward bearing and the gearbox assembly.

8. The turbomachine engine of claim 1, wherein the flex coupling has a first decoupler radius and a second decoupler radius, the first decoupler radius and the second decoupler radius are each an inner radius of the low-speed shaft at the flex coupling, and the second decoupler radius is equal to the first decoupler radius.

9. The turbomachine engine of claim 1, wherein the flex coupling has a first decoupler radius and a second decoupler radius, the first decoupler radius and the second decoupler radius are each an inner radius of the low-speed shaft at the flex coupling, and the second decoupler radius is different than the first decoupler radius.

10. The turbomachine engine of claim 1, wherein the gaps of the one or more flex plates include axial gaps that absorb the deflections through the low-speed shaft in an axial direction.

11. The turbomachine engine of claim 1, wherein the gearbox assembly includes a plurality of gears including a sun gear, a plurality of planet gears, and a ring gear.

12. The turbomachine engine of claim 11, wherein the fan shaft is coupled to the ring gear such that rotation of the ring gear causes the fan shaft to rotate.

13. The turbomachine engine of claim 11, wherein the fan shaft is coupled to the plurality of planet gears such that rotation of the plurality of planet gears causes the fan shaft to rotate.

14. The turbomachine engine of claim 1, wherein the flex coupling is characterized by a decoupler shear stiffness in a range of 100 klb/in to 500 klb/in, and the decoupler shear stiffness is given by:

$$\frac{E * K_m * R_{dcplr}^4}{L_{dcplr}^2}$$

where E is a Young's modulus of the flex coupling, $K_m$ is a correction factor in a range of $0.13 \times 10^{-3}$ to $0.27 \times 10^{-3}$, $R_{dcplr}$ is an inner radius of the low-speed shaft at the flex coupling, and $L_{dcplr}$ is an axial length of the flex coupling.

15. The turbomachine engine of claim 14, wherein the one or more flex plates include a first flex plate and a second flex plate, and $L_{dcplr}$ is an axial length from the first flex plate to the second flex plate.

16. The turbomachine engine of claim 1, wherein the flex coupling is characterized by a decoupler moment stiffness in a range of 50 klb*in/rad to 200 klb*in/rad, and the decoupler moment stiffness is given by:

$$\frac{E * K_m * R_{dcplr}^4}{H_{dcplr}},$$

where E is a Young's modulus of the flex coupling, $K_m$ is a correction factor in a range of $0.13 \times 10^{-3}$ to $0.27 \times 10^{-3}$, $R_{dcplr}$ is a decoupler radius of the flex coupling from a longitudinal centerline axis of the turbomachine engine, and $H_{dcplr}$ is a radial height of the one or more flex plates from the low-speed shaft.

17. The turbomachine engine of claim 16, wherein the one or more flex plates include a first flex plate and a second flex plate aft of the first flex plate, and the decoupler moment stiffness is a function of an aft decoupler moment stiffness of the first flex plate and a forward decoupler moment stiffness of the second flex plate.

18. The turbomachine engine of claim 17, wherein the aft decoupler moment stiffness is equal to the forward decoupler moment stiffness.

19. The turbomachine engine of claim 17, wherein the aft decoupler moment stiffness is different than the forward decoupler moment stiffness.

20. A turbomachine engine comprising:
a fan section having a fan shaft;
a core engine including one or more compressor sections, one or more turbine sections that includes a power turbine, and a combustion chamber in flow communication with the compressor sections and turbine sections;
a low-speed shaft coupled to the power turbine and having a midshaft that extends from a forward bearing to an aft bearing, the low-speed shaft being characterized by a midshaft rating (MSR) between two hundred thirty-one (ft/sec)$^{1/2}$ and two hundred fifty-nine (ft/sec)$^{1/2}$, wherein the low-speed shaft has a redline speed between one hundred eleven (ft/sec) and one hundred forty (ft/sec), and the turbomachine engine is configured to operate up to the redline speed without passing through a critical speed associated with a first-order bending mode of the low-speed shaft;

a gearbox assembly that couples the fan shaft to the low-speed shaft; and a flex coupling that couples the gearbox assembly to the low-speed shaft, the flex coupling including one or more flex plates that include axial gaps that absorb deflections through the low-speed shaft in an axial direction, and the one or more flex plates being positioned on the low-speed shaft axially between the forward bearing and the gearbox assembly.

* * * * *